United States Patent
Busskamp et al.

(10) Patent No.: US 12,448,602 B2
(45) Date of Patent: Oct. 21, 2025

(54) INDUCED PHOTORECEPTOR CELLS AND METHODS FOR THEIR PRODUCTION

(71) Applicant: Rheinische Friedrich-Wilhelms-Universitat Bonn, Bonn (DE)

(72) Inventors: Volker Busskamp, Bonn (DE); Marta Zuzic, Bonn (DE); Anka Kempe, Dresden (DE)

(73) Assignee: Rheinische Friedrich-Wilhelms-Universitat Bonn, Bonn (DE)

( * ) Notice: Subject to any disclaimer, the term of this patent is extended or adjusted under 35 U.S.C. 154(b) by 991 days.

(21) Appl. No.: 17/435,235

(22) PCT Filed: Mar. 2, 2020

(86) PCT No.: PCT/EP2020/055401
§ 371 (c)(1),
(2) Date: Aug. 31, 2021

(87) PCT Pub. No.: WO2020/178222
PCT Pub. Date: Sep. 10, 2020

(65) Prior Publication Data
US 2022/0056402 A1 Feb. 24, 2022

(30) Foreign Application Priority Data

Mar. 4, 2019 (EP) .................................... 19160600
Apr. 23, 2019 (EP) .................................... 19170478

(51) Int. Cl.
C12N 5/0793 (2010.01)
A61K 35/30 (2015.01)
A61P 27/02 (2006.01)

(52) U.S. Cl.
CPC .............. *C12N 5/062* (2013.01); *A61K 35/30* (2013.01); *A61P 27/02* (2018.01)

(58) Field of Classification Search
CPC .......... C12N 5/062; A61P 27/02; A61K 35/30
See application file for complete search history.

(56) References Cited

PUBLICATIONS

Bin-Bin, et al., PLOS ONE (2014) 9(11): 1-10 (Year: 2014).*
Ohtomo, et al., Amino Acids (2008) 34: 155-161 (Year: 2008).*
Huang, et al., Mol Cell Biochem (2018) 438:67-76 (Year: 2018).*
Int'l Search Report for PCT/EP2020/055401, dated May 12, 2020.

(Continued)

*Primary Examiner* — Evelyn Y Pyla
*Assistant Examiner* — Katherine R Small
(74) *Attorney, Agent, or Firm* — MaxGoLaw PLLC

(57) ABSTRACT

A method for producing induced photoreceptor cells from an initial cell is provided, the method includes providing one or more transcription factors (TFs) including at least GON4L to the initial cell. In some versions, the initial cell is a human induced pluripotent stem cell (iPSC). In other embodiments the method includes providing the TFs OTX2 and/or NEUROD1 to the initial cell. Cells produced and obtainable by the method are also provided, the use of these cells as a medicament in the treatment of retinopathy, vectors for inducing the photoreceptor cells and combinations of transcription factors intended for this use.

18 Claims, 12 Drawing Sheets

Specification includes a Sequence Listing.

(56) References Cited

PUBLICATIONS

Bin-Bin Xie, et al., "Differentiation of Retinal Ganglion Cells and Photoreceptor Precursors from Mouse Induced Pluripotent Stem Cells Carrying an Atoh7/Math5 Lineage Reporter", PLOS ONE, vol. 9, No. 11, Nov. 17, 2014.

Yuko Seko, et al., "Derivation of human differential photoreceptor cells from adult human dermal fibroblasts by defined combinations of CRX, RAX, OTX2 and NEUROD", GENES TO CELLS, vol. 19, No. 3, Jan. 24, 2014 (Jan. 24, 2014), pp. 198-208.

Feng Wang, et al., "A missense mutation in HKI leads to autosomal dominant retinitis pigmentosa", Investigative ophthalmology & visual science, Oct. 14, 2014 (Oct. 14, 2014), pp. 7159-7164.

N. Agarwal, et al., "GON4L Drive Cancer Growth through a YYI-Androgen Receptor-CD24 Axis", Cancer Research, vol. 76, No. 17, Jun. 16, 2016 (Jun. 16, 2016), pp. 5175-5185.

\* cited by examiner

Fig. 6

| cell | qPCR photoreceptor gene panel | | | | | | Transcription factors | |
|---|---|---|---|---|---|---|---|---|
| | OTX2 | CRX | RCVRN | RHO | OPN1SW | OPN1LW | Biased group | TF library |
| 1 | + | + | | | | | NEUROD1 + OTX2 | GON4L |
| 2 | + | + | | | | | NR2E1 + SOX2 + OTX2 | GON4L |
| 3 | + | + | | | | | SOX2 + THRB | GON4L |
| 4 | + | + | | | | | NEUROD1 | GON4L |
| 5 | + | + | + | | | | OTX2 | GON4L |
| 6 | + | + | + | | | | SIX6 + OTX2 | GON4L |
| 7 | + | + | + | | | | SIX6 + NRL | GON4L |
| 8 | + | + | + | | | | OTX2 + PAX6 + RORB | GON4L |
| 9 | + | + | + | | | | SIX6 | GON4L |
| 10 | + | + | + | | | | NEUROD1 + OTX2 | GON4L |
| 11 | + | + | + | | | | SIX6 | GON4L |
| 12 | + | + | + | | + | | SIX6+PAX6 | GON4L |

A

B

A

B

SEQUENCE LISTING

<160> NUMBER OF SEQ ID NOS: 13

<210> SEQ ID NO 1
<211> LENGTH: 1098
<212> TYPE: PRT
<213> ORGANISM: Homo sapiens
<220> FEATURE:
<223> OTHER INFORMATION: human GON4L protein GenBank: AAI 17558.1

<400> SEQUENCE: 1

Met Tyr Pro Glu Leu Leu Pro Val Cys Ser Leu Lys Ala Lys Asn Pro
1               5                   10                  15

Gln Asp Lys Ile Val Phe Thr Lys Ala Glu Asp Asn Leu Leu Ala Leu
            20                  25                  30

Gly Leu Lys His Phe Glu Gly Thr Glu Phe Pro Asn Pro Leu Ile Ser
        35                  40                  45

Lys Tyr Leu Leu Thr Cys Lys Thr Ala His Gln Leu Thr Val Arg Ile
    50                  55                  60

Lys Asn Leu Asn Met Asn Arg Ala Pro Asp Asn Ile Ile Lys Phe Tyr
65                  70                  75                  80

```
Lys Lys Thr Lys Gln Leu Pro Val Leu Gly Lys Cys Glu Glu Ile
             85                  90                  95

Gln Pro His Gln Trp Lys Pro Pro Ile Glu Arg Glu Glu His Arg Leu
            100                 105                 110

Pro Phe Trp Leu Lys Ala Ser Leu Pro Ser Ile Gln Glu Glu Leu Arg
            115                 120                 125

His Met Ala Asp Gly Ala Arg Glu Val Gly Asn Met Thr Gly Thr Thr
        130                 135                 140

Glu Ile Asn Ser Asp Arg Ser Leu Glu Lys Asp Asn Leu Glu Leu Gly
145                 150                 155                 160

Ser Glu Ser Arg Tyr Pro Leu Leu Pro Lys Gly Val Val Leu Lys
                165                 170                 175

Leu Lys Pro Val Ala Thr Arg Phe Pro Arg Lys Ala Trp Arg Gln Lys
            180                 185                 190

Arg Ser Ser Val Leu Lys Pro Leu Leu Ile Gln Pro Ser Pro Ser Leu
    195                 200                 205

Gln Pro Ser Phe Asn Pro Gly Lys Thr Pro Ala Arg Ser Thr His Ser
    210                 215                 220

Glu Ala Pro Pro Ser Lys Met Val Leu Arg Ile Pro His Pro Ile Gln
225                 230                 235                 240

Pro Ala Thr Val Leu Gln Thr Val Pro Gly Val Pro Leu Gly Val
                245                 250                 255

Ser Gly Gly Glu Ser Phe Glu Ser Pro Ala Ala Leu Pro Ala Val Pro
            260                 265                 270

Pro Glu Ala Arg Thr Ser Phe Pro Leu Ser Glu Ser Gln Thr Leu Leu
        275                 280                 285

Ser Ser Ala Pro Val Pro Lys Val Met Leu Pro Ser Leu Ala Pro Ser
    290                 295                 300

Lys Phe Arg Lys Pro Tyr Val Arg Arg Pro Ser Lys Arg Gly
305                 310                 315                 320

Val Lys Ala Ser Pro Cys Met Lys Pro Ala Pro Val Ile His His Pro
                325                 330                 335

Ala Ser Val Ile Phe Thr Val Pro Ala Thr Thr Val Lys Ile Val Ser
            340                 345                 350

Leu Gly Gly Gly Cys Asn Met Ile Gln Pro Val Asn Ala Ala Val Ala
        355                 360                 365

Gln Ser Pro Gln Thr Ile Pro Ile Thr Thr Leu Leu Val Asn Pro Thr
    370                 375                 380

Ser Phe Pro Cys Pro Leu Asn Gln Ser Leu Val Ala Ser Ser Val Ser
385                 390                 395                 400

Pro Leu Ile Val Ser Gly Asn Ser Val Asn Leu Pro Ile Pro Ser Thr
                405                 410                 415

Pro Glu Asp Lys Ala His Val Asn Val Asp Ile Ala Cys Ala Val Ala
            420                 425                 430

Asp Gly Glu Asn Ala Phe Gln Gly Leu Glu Pro Lys Leu Glu Pro Gln
        435                 440                 445

Glu Leu Ser Pro Leu Ser Ala Thr Val Phe Pro Lys Val Glu His Ser
    450                 455                 460

Pro Gly Pro Pro Leu Ala Asp Ala Glu Cys Gln Gly Leu Ser Glu
465                 470                 475                 480

Asn Ser Ala Cys Arg Trp Thr Val Val Lys Thr Glu Glu Gly Arg Gln
                485                 490                 495
```

```
Ala Leu Glu Pro Leu Pro Gln Gly Ile Gln Glu Ser Leu Asn Asn Pro
                500                 505                 510
Thr Pro Gly Asp Leu Glu Glu Ile Val Lys Met Glu Pro Glu Glu Ala
        515                 520                 525
Arg Glu Glu Ile Ser Gly Ser Pro Glu Arg Asp Ile Cys Asp Asp Ile
    530                 535                 540
Lys Val Glu His Ala Val Glu Leu Asp Thr Gly Ala Pro Ser Glu Glu
545                 550                 555                 560
Leu Ser Ser Ala Gly Glu Val Thr Lys Gln Thr Val Leu Gln Lys Glu
                565                 570                 575
Glu Glu Arg Ser Gln Pro Thr Lys Thr Pro Ser Ser Ser Gln Glu Pro
        580                 585                 590
Pro Asp Glu Gly Thr Ser Gly Thr Asp Val Asn Lys Gly Ser Ser Lys
    595                 600                 605
Asn Ala Leu Ser Ser Val Asp Pro Glu Val Arg Leu Ser Ser Pro Pro
    610                 615                 620
Gly Lys Pro Glu Asp Ser Ser Val Asp Gly Gln Ser Val Gly Thr
625                 630                 635                 640
Pro Val Gly Pro Glu Thr Gly Gly Glu Lys Asn Gly Pro Glu Glu Glu
                645                 650                 655
Glu Glu Glu Asp Phe Asp Asp Leu Thr Gln Asp Glu Glu Asp Glu Met
        660                 665                 670
Ser Ser Ala Ser Glu Glu Ser Val Leu Ser Val Pro Glu Leu Gln Glu
    675                 680                 685
Thr Met Glu Lys Leu Thr Trp Leu Ala Ser Glu Arg Arg Met Ser Gln
    690                 695                 700
Glu Gly Glu Ser Glu Glu Asn Ser Gln Glu Glu Asn Ser Glu Pro
705                 710                 715                 720
Glu Glu Glu Glu Glu Glu Ala Glu Gly Met Glu Ser Leu Gln Lys
                725                 730                 735
Glu Asp Glu Met Thr Asp Glu Ala Val Gly Asp Ser Ala Glu Lys Pro
        740                 745                 750
Pro Thr Phe Ala Ser Pro Glu Thr Ala Pro Glu Val Glu Thr Ser Arg
    755                 760                 765
Thr Pro Pro Gly Glu Ser Ile Lys Ala Gly Lys Gly Arg Asn Asn
    770                 775                 780
His Arg Ala Arg Asn Lys Arg Gly Ser Arg Ala Arg Ala Ser Lys Asp
785                 790                 795                 800
Thr Ser Lys Leu Leu Leu Leu Tyr Asp Glu Asp Ile Leu Glu Arg Asp
                805                 810                 815
Pro Leu Arg Glu Gln Lys Asp Leu Ala Phe Ala Gln Ala Tyr Leu Thr
        820                 825                 830
Arg Val Arg Glu Ala Leu Gln His Ile Pro Gly Lys Tyr Glu Asp Phe
    835                 840                 845
Leu Gln Val Ile Tyr Glu Phe Glu Ser Ser Thr Gln Arg Arg Thr Ala
850                 855                 860
Val Asp Leu Tyr Lys Ser Leu Gln Ile Leu Leu Gln Asp Trp Pro Gln
865                 870                 875                 880
Leu Leu Lys Asp Phe Ala Ala Phe Leu Leu Pro Glu Gln Ala Leu Ala
                885                 890                 895
Cys Gly Leu Phe Glu Glu Gln Gln Ala Phe Glu Lys Ser Arg Lys Phe
        900                 905                 910
Leu Arg Gln Leu Glu Ile Cys Phe Ala Glu Asn Pro Ser His His Gln
```

```
            915                 920                 925
Lys Ile Ile Lys Val Leu Gln Gly Cys Ala Asp Cys Leu Pro Gln Glu
    930                 935                 940

Ile Thr Glu Leu Lys Thr Gln Met Trp Gln Leu Leu Lys Gly His Asp
945                 950                 955                 960

His Leu Gln Asp Glu Phe Ser Ile Phe Phe Asp His Leu Arg Pro Ala
                965                 970                 975

Ala Ser Arg Met Gly Asp Phe Glu Glu Ile Asn Trp Thr Glu Glu Lys
            980                 985                 990

Glu Tyr Glu Phe Asp Gly Phe Glu Glu Val Ala Leu Pro Asp Val Glu
        995                 1000                1005

Glu Glu Glu Glu Pro Pro Lys Ile Pro Thr Ala Ser Lys Asn Lys Arg
    1010                1015                1020

Lys Lys Glu Ile Gly Val Gln Asn His Asp Lys Glu Thr Glu Trp Pro
1025                1030                1035                1040

Asp Gly Ala Lys Asp Cys Ala Cys Ser Cys His Glu Gly Gly Pro Asp
                1045                1050                1055

Ser Lys Leu Lys Lys Ser Lys Arg Arg Ser Cys Ser His Cys Ser Ser
            1060                1065                1070

Lys Val Arg Lys Val Ser Arg Val Pro Arg Val Ser Glu Leu Leu Gly
        1075                1080                1085

Asp Cys Leu Leu Pro Arg Ile Val Pro Tyr
    1090                1095

<210> SEQ ID NO 2
<211> LENGTH: 2241
<212> TYPE: PRT
<213> ORGANISM: Homo sapiens
<220> FEATURE:
<223> OTHER INFORMATION: human GON4L isoform A, GenBank: AAR01260.1

<400> SEQUENCE: 2

Met Leu Pro Cys Lys Lys Arg Arg Thr Thr Val Thr Glu Ser Leu Gln
1               5                   10                  15

His Lys Gly Asn Gln Glu Glu Asn Asn Val Asp Leu Glu Ser Ala Val
            20                  25                  30

Lys Pro Glu Ser Asp Gln Val Lys Asp Leu Ser Ser Val Ser Leu Ser
        35                  40                  45

Trp Asp Pro Ser His Gly Arg Val Ala Gly Phe Glu Val Gln Ser Leu
    50                  55                  60

Gln Asp Ala Gly Asn Gln Leu Gly Met Glu Asp Thr Ser Leu Ser Ser
65                  70                  75                  80

Gly Met Leu Thr Gln Asn Thr Asn Val Pro Ile Leu Glu Gly Val Asp
                85                  90                  95

Val Ala Ile Ser Gln Gly Ile Thr Leu Pro Ser Leu Glu Ser Phe His
            100                 105                 110

Pro Leu Asn Ile His Ile Gly Lys Gly Lys Leu His Ala Thr Gly Ser
        115                 120                 125

Lys Arg Gly Lys Lys Met Thr Leu Arg Pro Gly Pro Val Thr Gln Glu
    130                 135                 140

Asp Arg Cys Asp His Leu Thr Leu Lys Glu Pro Phe Ser Gly Glu Pro
145                 150                 155                 160

Ser Glu Glu Val Lys Glu Glu Gly Gly Lys Pro Gln Met Asn Ser Glu
                165                 170                 175

Gly Glu Ile Pro Ser Leu Pro Ser Gly Ser Gln Ser Ala Lys Pro Val
```

```
              180             185             190
Ser Gln Pro Arg Lys Ser Thr Gln Pro Asp Val Cys Ala Ser Pro Gln
            195             200             205

Glu Lys Pro Leu Arg Thr Leu Phe His Gln Pro Glu Glu Ile Glu
    210             215             220

Asp Gly Gly Leu Phe Ile Pro Met Glu Glu Gln Asp Asn Glu Glu Ser
225             230             235             240

Glu Lys Arg Arg Lys Lys Lys Gly Thr Lys Arg Lys Arg Asp Gly
            245             250             255

Arg Gly Gln Glu Gly Thr Leu Ala Tyr Asp Leu Lys Leu Asp Asp Met
            260             265             270

Leu Asp Arg Thr Leu Glu Asp Gly Ala Lys Gln His Asn Leu Thr Ala
            275             280             285

Val Asn Val Arg Asn Ile Leu His Glu Val Ile Thr Asn Glu His Val
            290             295             300

Val Ala Met Met Lys Ala Ala Ile Ser Glu Thr Glu Asp Met Pro Met
305             310             315             320

Phe Glu Pro Lys Met Thr Arg Ser Lys Leu Lys Glu Val Val Glu Lys
            325             330             335

Gly Val Val Ile Pro Thr Trp Asn Ile Ser Pro Ile Lys Lys Ala Asn
            340             345             350

Glu Ile Lys Pro Pro Gln Phe Val Asp Ile His Leu Glu Glu Asp Asp
            355             360             365

Ser Ser Asp Glu Glu Tyr Gln Pro Asp Glu Glu Asp Glu Thr
            370             375             380

Ala Glu Glu Ser Leu Leu Glu Ser Asp Val Glu Ser Thr Ala Ser Ser
385             390             395             400

Pro Arg Gly Ala Lys Lys Ser Arg Leu Arg Gln Ser Ser Glu Met Thr
            405             410             415

Glu Thr Asp Glu Glu Ser Gly Ile Leu Ser Glu Ala Glu Lys Val Thr
            420             425             430

Thr Pro Ala Ile Arg His Ile Ser Ala Glu Val Val Pro Met Gly Pro
            435             440             445

Pro Pro Pro Lys Pro Lys Gln Thr Arg Asp Ser Thr Phe Met Glu
    450             455             460

Lys Leu His Ala Val Asp Glu Glu Leu Ala Ser Ser Pro Val Cys Met
465             470             475             480

Asp Ser Phe Gln Pro Met Asp Asp Ser Leu Ile Ala Phe Arg Thr Arg
            485             490             495

Ser Lys Met Pro Leu Lys Asp Val Pro Leu Gly Gln Leu Glu Ala Glu
            500             505             510

Leu Gln Ala Pro Asp Ile Thr Pro Asp Met Tyr Asp Pro Asn Thr Ala
            515             520             525

Asp Asp Glu Asp Trp Lys Met Trp Leu Gly Gly Leu Met Asn Asp Asp
            530             535             540

Val Gly Asn Glu Asp Glu Ala Asp Asp Asp Asp Pro Glu Tyr Asn
545             550             555             560

Phe Leu Glu Asp Leu Asp Glu Pro Asp Thr Glu Asp Phe Arg Thr Asp
            565             570             575

Arg Ala Val Arg Ile Thr Lys Lys Glu Val Asn Glu Leu Met Glu Glu
            580             585             590

Leu Phe Glu Thr Phe Gln Asp Glu Met Gly Phe Ser Asn Met Glu Asp
            595             600             605
```

```
Asp Gly Pro Glu Glu Glu Cys Val Ala Glu Pro Arg Pro Asn Phe
        610             615             620

Asn Thr Pro Gln Ala Leu Arg Phe Glu Glu Pro Leu Ala Asn Leu Leu
625             630             635             640

Asn Glu Gln His Arg Thr Val Lys Glu Leu Phe Glu Gln Leu Lys Met
            645             650             655

Lys Lys Ser Ser Ala Lys Gln Leu Gln Glu Val Glu Lys Val Lys Pro
        660             665             670

Gln Ser Glu Lys Val His Gln Thr Leu Ile Leu Asp Pro Ala Gln Arg
        675             680             685

Lys Arg Leu Gln Gln Gln Met Gln Gln His Val Gln Leu Leu Thr Gln
690             695             700

Ile His Leu Leu Ala Thr Cys Asn Pro Asn Leu Asn Pro Glu Ala Thr
705             710             715             720

Thr Thr Arg Ile Phe Leu Lys Glu Leu Gly Thr Phe Ala Gln Ser Ser
            725             730             735

Ile Ala Leu His His Gln Tyr Asn Pro Lys Phe Gln Thr Leu Phe Gln
            740             745             750

Pro Cys Asn Leu Met Gly Ala Met Gln Leu Ile Glu Asp Phe Ser Thr
        755             760             765

His Val Ser Ile Asp Cys Ser Pro His Lys Thr Val Lys Lys Thr Ala
770             775             780

Asn Glu Phe Pro Cys Leu Pro Lys Gln Val Ala Trp Ile Leu Ala Thr
785             790             795             800

Ser Lys Val Phe Met Tyr Pro Glu Leu Leu Pro Val Cys Ser Leu Lys
            805             810             815

Ala Lys Asn Pro Gln Asp Lys Ile Val Phe Thr Lys Ala Glu Asp Asn
        820             825             830

Leu Leu Ala Leu Gly Leu Lys His Phe Glu Gly Thr Glu Phe Pro Asn
    835             840             845

Pro Leu Ile Ser Lys Tyr Leu Leu Thr Cys Lys Thr Ala His Gln Leu
    850             855             860

Thr Val Arg Ile Lys Asn Leu Asn Met Asn Arg Ala Pro Asp Asn Ile
865             870             875             880

Ile Lys Phe Tyr Lys Lys Thr Lys Gln Leu Pro Val Leu Gly Lys Cys
            885             890             895

Cys Glu Glu Ile Gln Pro His Gln Trp Lys Pro Pro Ile Glu Arg Glu
            900             905             910

Glu His Arg Leu Pro Phe Trp Leu Lys Ala Ser Leu Pro Ser Ile Gln
        915             920             925

Glu Glu Leu Arg His Met Ala Asp Gly Ala Arg Glu Val Gly Asn Met
    930             935             940

Thr Gly Thr Thr Glu Ile Asn Ser Asp Arg Ser Leu Glu Lys Asp Asn
945             950             955             960

Leu Glu Leu Gly Ser Glu Ser Arg Tyr Pro Leu Leu Leu Pro Lys Gly
            965             970             975

Val Val Leu Lys Leu Lys Pro Val Ala Thr Arg Phe Pro Arg Lys Ala
            980             985             990

Trp Arg Gln Lys Arg Ser Ser Val Leu Lys Pro Leu Leu Ile Gln Pro
        995             1000            1005

Ser Pro Ser Leu Gln Pro Ser Phe Asn Pro Gly Lys Thr Pro Ala Arg
    1010            1015            1020
```

```
Ser Thr His Ser Glu Ala Pro Pro Ser Lys Met Val Leu Arg Ile Pro
1025                1030            1035            1040

His Pro Ile Gln Pro Ala Thr Val Leu Gln Thr Val Pro Gly Val Pro
            1045            1050            1055

Pro Leu Gly Val Ser Gly Gly Glu Ser Phe Glu Ser Pro Ala Ala Leu
        1060            1065            1070

Pro Ala Val Pro Pro Glu Ala Arg Thr Ser Phe Pro Leu Ser Glu Ser
    1075            1080            1085

Gln Thr Leu Leu Ser Ser Ala Pro Val Pro Lys Val Met Leu Pro Ser
    1090            1095            1100

Leu Ala Pro Ser Lys Phe Arg Lys Pro Tyr Val Arg Arg Pro Ser
1105            1110            1115            1120

Lys Arg Arg Gly Val Lys Ala Ser Pro Cys Met Lys Pro Ala Pro Val
            1125            1130            1135

Ile His His Pro Ala Ser Val Ile Phe Thr Val Pro Ala Thr Thr Val
            1140            1145            1150

Lys Ile Val Ser Leu Gly Gly Gly Cys Asn Met Ile Gln Pro Val Asn
        1155            1160            1165

Ala Ala Val Ala Gln Ser Pro Gln Thr Ile Pro Ile Thr Thr Leu Leu
    1170            1175            1180

Val Asn Pro Thr Ser Phe Pro Cys Pro Leu Asn Gln Ser Leu Val Ala
1185            1190            1195            1200

Ser Ser Val Ser Pro Leu Ile Val Ser Gly Asn Ser Val Asn Leu Pro
            1205            1210            1215

Ile Pro Ser Thr Pro Glu Asp Lys Ala His Val Asn Val Asp Ile Ala
        1220            1225            1230

Cys Ala Val Ala Asp Gly Glu Asn Ala Phe Gln Gly Leu Glu Pro Lys
    1235            1240            1245

Leu Glu Pro Gln Glu Leu Ser Pro Leu Ser Ala Thr Val Phe Pro Lys
    1250            1255            1260

Val Glu His Ser Pro Gly Pro Pro Leu Ala Asp Ala Glu Cys Gln Glu
1265            1270            1275            1280

Gly Leu Ser Glu Asn Ser Ala Cys Arg Trp Thr Val Val Lys Thr Glu
            1285            1290            1295

Glu Gly Arg Gln Ala Leu Glu Pro Leu Pro Gln Gly Ile Gln Glu Ser
        1300            1305            1310

Leu Asn Asn Pro Thr Pro Gly Asp Leu Glu Glu Ile Val Lys Met Glu
    1315            1320            1325

Pro Glu Glu Ala Arg Glu Glu Ile Ser Gly Ser Pro Glu Arg Asp Ile
1330            1335            1340

Cys Asp Asp Ile Lys Val Glu His Ala Val Glu Leu Asp Thr Gly Ala
1345            1350            1355            1360

Pro Ser Glu Glu Leu Ser Ser Ala Gly Glu Val Thr Lys Gln Thr Val
            1365            1370            1375

Leu Gln Lys Glu Glu Glu Arg Ser Gln Pro Thr Lys Thr Pro Ser Ser
        1380            1385            1390

Ser Gln Glu Pro Pro Asp Glu Gly Thr Ser Gly Thr Asp Val Asn Lys
    1395            1400            1405

Gly Ser Ser Lys Asn Ala Leu Ser Ser Met Asp Pro Glu Val Arg Leu
    1410            1415            1420

Ser Ser Pro Pro Gly Lys Pro Glu Asp Ser Ser Val Asp Gly Gln
1425            1430            1435            1440

Ser Val Gly Thr Pro Val Gly Pro Glu Thr Gly Gly Glu Lys Asn Gly
```

```
                  1445                1450                1455
Pro Glu Glu Glu Glu Glu Asp Phe Asp Asp Leu Thr Gln Asp Glu
        1460                1465                1470

Glu Asp Glu Met Ser Ser Ala Ser Glu Glu Ser Val Leu Ser Val Pro
        1475                1480                1485

Glu Leu Gln Glu Thr Met Glu Lys Leu Thr Trp Leu Ala Ser Glu Arg
    1490                1495                1500

Arg Met Ser Gln Glu Gly Glu Ser Glu Glu Asn Ser Gln Glu Glu
1505                1510                1515                1520

Asn Ser Glu Pro Glu Glu Glu Glu Glu Ala Glu Gly Met Glu
            1525                1530                1535

Ser Leu Gln Lys Glu Asp Glu Met Thr Asp Glu Ala Val Gly Asp Ser
        1540                1545                1550

Ala Glu Lys Pro Pro Thr Phe Ala Ser Pro Glu Thr Ala Pro Glu Val
        1555                1560                1565

Glu Thr Ser Arg Thr Pro Pro Gly Glu Ser Ile Lys Ala Ala Gly Lys
        1570                1575                1580

Gly Arg Asn Asn His Arg Ala Arg Asn Lys Arg Gly Ser Arg Ala Arg
1585                1590                1595                1600

Ala Ser Lys Asp Thr Ser Lys Leu Leu Leu Leu Tyr Asp Glu Asp Ile
            1605                1610                1615

Leu Glu Arg Asp Pro Leu Arg Glu Gln Lys Asp Leu Ala Phe Ala Gln
            1620                1625                1630

Ala Tyr Leu Thr Arg Val Arg Glu Ala Leu Gln His Ile Pro Gly Lys
            1635                1640                1645

Tyr Glu Asp Phe Leu Gln Val Ile Tyr Glu Phe Glu Ser Ser Thr Gln
            1650                1655                1660

Arg Arg Thr Ala Val Asp Leu Tyr Lys Ser Leu Gln Ile Leu Leu Gln
1665                1670                1675                1680

Asp Trp Pro Gln Leu Leu Lys Asp Phe Ala Ala Phe Leu Leu Pro Glu
            1685                1690                1695

Gln Ala Leu Ala Cys Gly Leu Phe Glu Glu Gln Gln Ala Phe Glu Lys
            1700                1705                1710

Ser Arg Lys Phe Leu Arg Gln Leu Glu Ile Cys Phe Ala Glu Asn Pro
        1715                1720                1725

Ser His His Gln Lys Ile Ile Lys Val Leu Gln Gly Cys Ala Asp Cys
        1730                1735                1740

Leu Pro Gln Glu Ile Thr Glu Leu Lys Thr Gln Met Trp Gln Leu Leu
1745                1750                1755                1760

Lys Gly His Asp His Leu Gln Asp Glu Phe Ser Ile Phe Phe Asp His
            1765                1770                1775

Leu Arg Pro Ala Ala Ser Arg Met Gly Asp Phe Glu Glu Ile Asn Trp
            1780                1785                1790

Thr Glu Glu Lys Glu Tyr Glu Phe Asp Gly Phe Glu Glu Val Ala Leu
        1795                1800                1805

Pro Asp Val Glu Glu Glu Glu Glu Pro Pro Lys Ile Pro Thr Ala Ser
        1810                1815                1820

Lys Asn Lys Arg Lys Lys Glu Ile Gly Val Gln Asn His Asp Lys Glu
1825                1830                1835                1840

Thr Glu Trp Pro Asp Gly Ala Lys Asp Cys Ala Cys Ser Cys His Glu
            1845                1850                1855

Gly Gly Pro Asp Ser Lys Leu Lys Lys Ser Lys Arg Arg Ser Cys Ser
            1860                1865                1870
```

```
His Cys Ser Ser Lys Val Cys Asp Ser Lys Ser Tyr Lys Ser Lys Glu
    1875                1880                1885

Pro His Glu Leu Val Gly Ser Ser Pro His Arg Glu Ala Ser Pro Met
    1890                1895                1900

Pro Gly Ala Lys Glu Ala Gly Gln Gly Lys Asp Met Met Glu Glu Glu
1905                1910                1915                1920

Ala Pro Glu Glu Arg Glu Ser Thr Glu Ala Thr Gln Ser Arg Thr Val
                1925                1930                1935

Arg Thr Thr Arg Lys Gly Glu Met Pro Val Ser Ala Gly Leu Ala Val
            1940                1945                1950

Gly Ser Thr Leu Pro Ser Pro Arg Glu Val Thr Val Thr Glu Arg Leu
        1955                1960                1965

Leu Leu Asp Gly Pro Pro Pro His Ser Pro Glu Thr Pro Gln Phe Pro
    1970                1975                1980

Pro Thr Thr Gly Ala Val Leu Tyr Thr Val Lys Arg Asn Gln Val Gly
1985                1990                1995                2000

Pro Glu Val Arg Ser Cys Pro Lys Ala Ser Pro Arg Leu Gln Lys Glu
                2005                2010                2015

Arg Glu Gly Gln Lys Ala Val Ser Glu Ser Glu Ala Leu Met Leu Val
            2020                2025                2030

Trp Asp Ala Ser Glu Thr Glu Lys Leu Pro Gly Thr Val Glu Pro Pro
        2035                2040                2045

Ala Ser Phe Leu Ser Pro Val Ser Ser Lys Thr Arg Asp Ala Gly Arg
    2050                2055                2060

Arg His Val Ser Gly Lys Pro Asp Thr Gln Glu Arg Trp Leu Pro Ser
2065                2070                2075                2080

Ser Arg Ala Arg Val Lys Thr Arg Asp Arg Thr Cys Pro Val His Glu
                2085                2090                2095

Ser Pro Ser Gly Ile Asp Thr Ser Glu Thr Ser Pro Lys Ala Pro Arg
            2100                2105                2110

Gly Gly Leu Ala Lys Asp Ser Gly Thr Gln Ala Lys Gly Pro Glu Gly
        2115                2120                2125

Glu Gln Gln Pro Lys Ala Ala Glu Ala Thr Val Cys Ala Asn Asn Ser
    2130                2135                2140

Lys Val Ser Ser Thr Gly Glu Lys Val Val Leu Trp Thr Arg Glu Ala
2145                2150                2155                2160

Asp Arg Val Ile Leu Thr Met Cys Gln Glu Gln Gly Ala Gln Pro Gln
                2165                2170                2175

Thr Phe Asn Ile Ile Ser Gln Gln Leu Gly Asn Lys Thr Pro Ala Glu
            2180                2185                2190

Val Ser His Arg Phe Arg Glu Leu Met Gln Leu Phe His Thr Ala Cys
        2195                2200                2205

Glu Ala Ser Ser Glu Asp Glu Asp Ala Thr Ser Thr Ser Asn Ala
    2210                2215                2220

Asp Gln Leu Ser Asp His Gly Asp Leu Leu Ser Glu Glu Glu Leu Asp
2225                2230                2235                2240

Glu

<210> SEQ ID NO 3
<211> LENGTH: 1529
<212> TYPE: PRT
<213> ORGANISM: Homo sapiens
<220> FEATURE:
<223> OTHER INFORMATION: human GON4L isoform B, GenBank: AAR01262.1
```

<400> SEQUENCE: 3

Met Leu Pro Cys Lys Lys Arg Arg Thr Thr Val Thr Glu Ser Leu Gln
1               5                   10                  15

His Lys Gly Asn Gln Glu Asn Asn Val Asp Leu Glu Ser Ala Val
            20                  25                  30

Lys Pro Glu Ser Asp Gln Val Lys Asp Leu Ser Ser Val Ser Leu Ser
            35                  40                  45

Trp Asp Pro Ser His Gly Arg Val Ala Gly Phe Glu Val Gln Ser Leu
    50                  55                  60

Gln Asp Ala Gly Asn Gln Leu Gly Met Glu Asp Thr Ser Leu Ser Ser
65                  70                  75                  80

Gly Met Leu Thr Gln Asn Thr Asn Val Pro Ile Leu Glu Gly Val Asp
                85                  90                  95

Val Ala Ile Ser Gln Gly Ile Thr Leu Pro Ser Leu Glu Ser Phe His
                100                 105                 110

Pro Leu Asn Ile His Ile Gly Lys Gly Lys Leu His Ala Thr Gly Ser
            115                 120                 125

Lys Arg Gly Lys Lys Met Thr Leu Arg Pro Gly Pro Val Thr Gln Glu
130                 135                 140

Asp Arg Cys Asp His Leu Thr Leu Lys Glu Pro Phe Ser Gly Glu Pro
145                 150                 155                 160

Ser Glu Glu Val Lys Glu Glu Gly Gly Lys Pro Gln Met Asn Ser Glu
                165                 170                 175

Gly Glu Ile Pro Ser Leu Pro Ser Gly Ser Gln Ser Ala Lys Pro Val
            180                 185                 190

Ser Gln Pro Arg Lys Ser Thr Gln Pro Asp Val Cys Ala Ser Pro Gln
    195                 200                 205

Glu Lys Pro Leu Arg Thr Leu Phe His Gln Pro Glu Glu Ile Glu
210                 215                 220

Asp Gly Gly Leu Phe Ile Pro Met Glu Glu Gln Asp Asn Glu Glu Ser
225                 230                 235                 240

Glu Lys Arg Arg Lys Lys Lys Gly Thr Lys Arg Lys Arg Asp Gly
                245                 250                 255

Arg Gly Gln Glu Gly Thr Leu Ala Tyr Asp Leu Lys Leu Asp Asp Met
            260                 265                 270

Leu Asp Arg Thr Leu Glu Asp Gly Ala Lys Gln His Asn Leu Thr Ala
    275                 280                 285

Val Asn Val Arg Asn Ile Leu His Glu Val Ile Thr Asn Glu His Val
            290                 295                 300

Val Ala Met Met Lys Ala Ala Ile Ser Glu Thr Glu Asp Met Pro Met
305                 310                 315                 320

Phe Glu Pro Lys Met Thr Arg Ser Lys Leu Lys Glu Val Val Glu Lys
                325                 330                 335

Gly Val Val Ile Pro Thr Trp Asn Ile Ser Pro Ile Lys Lys Ala Asn
            340                 345                 350

Glu Ile Lys Pro Pro Gln Phe Val Asp Ile His Leu Glu Glu Asp Asp
    355                 360                 365

Ser Ser Asp Glu Glu Tyr Gln Pro Asp Asp Glu Glu Asp Glu Thr
            370                 375                 380

Ala Glu Glu Ser Leu Leu Glu Ser Asp Val Glu Ser Thr Ala Ser Ser
385                 390                 395                 400

Pro Arg Gly Ala Lys Lys Ser Arg Leu Arg Gln Ser Ser Glu Met Thr

```
            405                 410                 415
Glu Thr Asp Glu Glu Ser Gly Ile Leu Ser Glu Ala Glu Lys Val Thr
            420                 425                 430

Ala Pro Ala Ile Arg His Ile Ser Ala Glu Val Val Pro Met Gly Pro
            435                 440                 445

Pro Pro Pro Lys Pro Lys Gln Thr Arg Asp Ser Thr Phe Met Glu
450                 455                 460

Lys Leu His Ala Val Asp Glu Glu Leu Ala Ser Ser Pro Val Cys Met
465                 470                 475                 480

Asp Ser Phe Gln Pro Met Asp Asp Ser Leu Ile Ala Phe Arg Thr Arg
            485                 490                 495

Ser Lys Met Pro Leu Lys Asp Val Pro Leu Gly Gln Leu Glu Ala Glu
            500                 505                 510

Leu Gln Ala Pro Asp Ile Thr Pro Asp Met Tyr Asp Pro Asn Thr Ala
            515                 520                 525

Asp Asp Glu Asp Trp Lys Met Trp Leu Gly Gly Leu Met Asn Asp Asp
530                 535                 540

Val Gly Asn Glu Asp Glu Ala Asp Asp Asp Asp Pro Glu Tyr Asn
545                 550                 555                 560

Phe Leu Glu Asp Leu Asp Glu Pro Asp Thr Glu Asp Phe Arg Thr Asp
            565                 570                 575

Arg Ala Val Arg Ile Thr Lys Lys Glu Val Asn Glu Leu Met Glu Glu
            580                 585                 590

Leu Phe Glu Thr Phe Gln Asp Glu Met Gly Phe Ser Asn Met Glu Asp
            595                 600                 605

Asp Gly Pro Glu Glu Glu Cys Val Ala Glu Pro Arg Pro Asn Phe
610                 615                 620

Asn Thr Pro Gln Ala Leu Arg Phe Glu Glu Pro Leu Ala Asn Leu Leu
625                 630                 635                 640

Asn Glu Gln His Arg Thr Val Lys Glu Leu Phe Glu Gln Leu Lys Met
            645                 650                 655

Lys Lys Ser Ser Ala Lys Gln Leu Gln Glu Val Glu Lys Val Lys Pro
            660                 665                 670

Gln Ser Glu Lys Val His Gln Thr Leu Ile Leu Asp Pro Ala Gln Arg
            675                 680                 685

Lys Arg Leu Gln Gln Gln Met Gln Gln His Val Gln Leu Leu Thr Gln
            690                 695                 700

Ile His Leu Leu Ala Thr Cys Asn Pro Asn Leu Asn Pro Glu Ala Thr
705                 710                 715                 720

Thr Thr Arg Ile Phe Leu Lys Glu Leu Gly Thr Phe Ala Gln Ser Ser
            725                 730                 735

Ile Ala Leu His His Gln Tyr Asn Pro Lys Phe Gln Thr Leu Phe Gln
            740                 745                 750

Pro Cys Asn Leu Met Gly Ala Met Gln Leu Ile Glu Asp Phe Ser Thr
            755                 760                 765

His Val Ser Ile Asp Cys Ser Pro His Lys Thr Val Lys Lys Thr Ala
            770                 775                 780

Asn Glu Phe Pro Cys Leu Pro Lys Gln Val Ala Trp Ile Leu Ala Thr
785                 790                 795                 800

Ser Lys Val Phe Met Tyr Pro Glu Leu Leu Pro Val Cys Ser Leu Lys
            805                 810                 815

Ala Lys Asn Pro Gln Asp Lys Ile Val Phe Thr Lys Ala Glu Asp Asn
            820                 825                 830
```

```
Leu Leu Ala Leu Gly Leu Lys His Phe Glu Gly Thr Glu Phe Pro Asn
            835                 840                 845

Pro Leu Ile Ser Lys Tyr Leu Leu Thr Cys Lys Thr Ala His Gln Leu
            850                 855                 860

Thr Val Arg Ile Lys Asn Leu Asn Met Asn Arg Ala Pro Asp Asn Ile
865                 870                 875                 880

Ile Lys Phe Tyr Lys Lys Thr Lys Gln Leu Pro Val Leu Gly Lys Cys
            885                 890                 895

Cys Glu Glu Ile Gln Pro His Gln Trp Lys Pro Ile Glu Arg Glu
            900                 905                 910

Glu His Arg Leu Pro Phe Trp Leu Lys Ala Ser Leu Pro Ser Ile Gln
            915                 920                 925

Glu Glu Leu Arg His Met Ala Asp Gly Ala Arg Glu Val Gly Asn Met
            930                 935                 940

Thr Gly Thr Thr Glu Ile Asn Ser Asp Arg Ser Leu Glu Lys Asp Asn
945                 950                 955                 960

Leu Glu Leu Gly Ser Glu Ser Arg Tyr Pro Leu Leu Pro Lys Gly
            965                 970                 975

Val Val Leu Lys Leu Lys Pro Val Ala Thr Arg Ser Pro Arg Lys Ala
            980                 985                 990

Trp Arg Gln Lys Arg Ser Ser Val Leu Lys Pro Leu Leu Ile Gln Pro
            995                 1000                1005

Ser Pro Ser Leu Gln Pro Ser Phe Asn Pro Gly Lys Thr Pro Ala Arg
            1010                1015                1020

Ser Thr His Ser Glu Ala Pro Pro Ser Lys Met Val Leu Arg Ile Pro
1025                1030                1035                1040

His Pro Ile Gln Pro Ala Thr Val Leu Gln Thr Val Pro Gly Val Pro
            1045                1050                1055

Pro Leu Gly Val Ser Gly Gly Glu Ser Phe Glu Ser Pro Ala Ala Leu
            1060                1065                1070

Pro Ala Val Pro Pro Glu Ala Arg Thr Ser Phe Pro Leu Ser Glu Ser
            1075                1080                1085

Gln Thr Leu Leu Ser Ser Ala Pro Val Pro Lys Val Met Leu Pro Ser
            1090                1095                1100

Leu Ala Pro Ser Lys Phe Arg Lys Pro Tyr Val Arg Arg Pro Ser
1105                1110                1115                1120

Lys Arg Arg Gly Val Lys Ala Ser Pro Cys Met Lys Pro Ala Pro Val
            1125                1130                1135

Ile His His Pro Ala Ser Val Ile Phe Thr Val Pro Ala Thr Thr Val
            1140                1145                1150

Lys Ile Val Ser Leu Gly Gly Gly Cys Asn Met Ile Gln Pro Val Asn
            1155                1160                1165

Ala Ala Val Ala Gln Ser Pro Gln Thr Ile Pro Ile Thr Thr Leu Leu
            1170                1175                1180

Val Asn Pro Thr Ser Phe Pro Cys Pro Leu Asn Gln Ser Leu Val Ala
1185                1190                1195                1200

Ser Ser Val Ser Pro Leu Ile Val Ser Gly Asn Ser Val Asn Leu Pro
            1205                1210                1215

Ile Pro Ser Thr Pro Glu Asp Lys Ala His Val Asn Val Asp Ile Ala
            1220                1225                1230

Cys Ala Val Ala Asp Gly Glu Asn Ala Phe Gln Gly Leu Glu Pro Lys
            1235                1240                1245
```

-continued

```
Leu Glu Pro Gln Glu Leu Ser Pro Leu Ser Ala Thr Val Phe Pro Lys
    1250                1255                1260

Val Glu His Ser Pro Gly Pro Pro Leu Ala Asp Ala Glu Cys Gln Glu
1265                1270                1275                1280

Gly Leu Ser Glu Asn Ser Ala Cys Arg Trp Thr Val Val Lys Thr Glu
                1285                1290                1295

Glu Gly Arg Gln Ala Leu Glu Pro Leu Pro Gln Gly Ile Gln Glu Ser
            1300                1305                1310

Leu Asn Asn Pro Thr Pro Gly Asp Leu Glu Glu Ile Val Lys Met Glu
        1315                1320                1325

Pro Glu Glu Ala Arg Glu Glu Ile Ser Gly Ser Pro Glu Arg Asp Ile
    1330                1335                1340

Cys Asp Asp Ile Lys Val Glu His Ala Val Glu Leu Asp Thr Gly Ala
1345                1350                1355                1360

Pro Ser Glu Glu Leu Ser Ser Ala Gly Glu Val Thr Lys Gln Thr Val
                1365                1370                1375

Leu Gln Lys Glu Glu Gly Arg Ser Gln Pro Thr Lys Thr Pro Ser Ser
            1380                1385                1390

Ser Gln Glu Pro Pro Asp Glu Gly Thr Ser Gly Thr Asp Val Asn Lys
        1395                1400                1405

Gly Ser Ser Lys Asn Ala Leu Ser Ser Met Asp Pro Glu Val Arg Leu
    1410                1415                1420

Ser Ser Pro Gly Lys Pro Glu Asp Ser Ser Val Asp Gly Gln
1425                1430                1435                1440

Ser Val Gly Thr Pro Val Gly Pro Glu Thr Gly Gly Glu Lys Asn Gly
                1445                1450                1455

Pro Glu Glu Glu Glu Glu Asp Phe Asp Asp Leu Thr Gln Asp Glu
            1460                1465                1470

Glu Asp Glu Met Ser Ser Ala Ser Glu Glu Ser Val Leu Ser Val Pro
        1475                1480                1485

Glu Leu Gln Val Arg Ala Gly Glu Tyr Ser Gln Val Phe Arg Gly Leu
    1490                1495                1500

Ser Asn Met Tyr His Leu Leu Ile Cys His Leu Leu Ala Cys Cys Thr
1505                1510                1515                1520

Met Asp Ser Pro Lys Ile Ile Cys Ile
                1525

<210> SEQ ID NO 4
<211> LENGTH: 2241
<212> TYPE: PRT
<213> ORGANISM: Homo sapiens
<220> FEATURE:
<223> OTHER INFORMATION: human GON4L isoform C, GenBank: AAR01261.1

<400> SEQUENCE: 4

Met Leu Pro Cys Lys Lys Arg Arg Thr Thr Val Thr Glu Ser Leu Gln
1               5                   10                  15

His Lys Gly Asn Gln Glu Glu Asn Asn Val Asp Leu Glu Ser Ala Val
            20                  25                  30

Lys Pro Glu Ser Asp Gln Val Lys Asp Leu Ser Ser Val Ser Leu Ser
        35                  40                  45

Trp Asp Pro Ser His Gly Arg Val Ala Gly Phe Glu Val Gln Ser Leu
    50                  55                  60

Gln Asp Ala Gly Asn Gln Leu Gly Met Glu Asp Thr Ser Leu Ser Ser
65                  70                  75                  80
```

```
Gly Met Leu Thr Gln Asn Thr Asn Val Pro Ile Leu Glu Gly Val Asp
             85                  90                  95

Val Ala Ile Ser Gln Gly Ile Thr Leu Pro Ser Leu Gly Ser Phe His
        100                 105                 110

Pro Leu Asn Ile His Ile Gly Lys Gly Lys Leu His Ala Thr Gly Ser
            115                 120                 125

Lys Arg Gly Lys Lys Met Thr Leu Arg Pro Gly Pro Val Thr Gln Glu
        130                 135                 140

Asp Arg Cys Asp His Leu Thr Leu Lys Glu Pro Phe Ser Gly Glu Pro
145                 150                 155                 160

Ser Glu Glu Val Lys Glu Gly Gly Lys Pro Gln Met Asn Ser Glu
                165                 170                 175

Gly Glu Ile Pro Ser Leu Pro Ser Gly Ser Gln Ser Ala Lys Pro Val
            180                 185                 190

Ser Gln Pro Arg Lys Ser Thr Gln Pro Asp Val Cys Ala Ser Pro Gln
        195                 200                 205

Glu Lys Pro Leu Arg Thr Leu Phe His Gln Pro Glu Glu Ile Glu
    210                 215                 220

Asp Gly Gly Leu Phe Ile Pro Met Glu Glu Gln Asp Asn Glu Ser
225                 230                 235                 240

Glu Lys Arg Arg Lys Lys Lys Gly Thr Lys Arg Lys Arg Asp Gly
                245                 250                 255

Arg Gly Gln Glu Gly Thr Leu Ala Tyr Asp Leu Lys Leu Asp Asp Met
            260                 265                 270

Leu Asp Arg Thr Leu Glu Asp Gly Ala Lys Gln His Asn Leu Thr Ala
        275                 280                 285

Val Asn Val Arg Asn Ile Leu His Glu Val Ile Thr Asn Glu His Val
    290                 295                 300

Val Ala Met Met Lys Ala Ala Ile Ser Glu Thr Glu Asp Met Pro Met
305                 310                 315                 320

Phe Glu Pro Lys Met Thr Arg Ser Lys Leu Lys Glu Val Val Glu Lys
            325                 330                 335

Gly Val Val Ile Pro Thr Trp Asn Ile Ser Pro Ile Lys Lys Ala Asn
        340                 345                 350

Glu Ile Lys Pro Pro Gln Phe Val Asp Ile His Leu Glu Glu Asp Asp
    355                 360                 365

Ser Ser Asp Glu Glu Tyr Gln Pro Asp Asp Glu Glu Asp Glu Thr
    370                 375                 380

Ala Glu Glu Ser Leu Leu Glu Ser Asp Val Glu Ser Thr Ala Ser Ser
385                 390                 395                 400

Pro Arg Gly Ala Lys Lys Ser Arg Leu Arg Gln Ser Ser Glu Met Thr
            405                 410                 415

Glu Thr Asp Glu Glu Ser Gly Ile Leu Ser Glu Ala Glu Lys Val Thr
        420                 425                 430

Thr Pro Ala Ile Arg His Ile Ser Ala Glu Val Val Pro Met Gly Pro
            435                 440                 445

Pro Pro Pro Lys Pro Lys Gln Thr Arg Asp Ser Thr Phe Met Glu
    450                 455                 460

Lys Leu His Ala Val Asp Glu Glu Leu Ala Ser Ser Pro Val Cys Met
465                 470                 475                 480

Asp Ser Phe Gln Pro Met Asp Asp Ser Leu Ile Ala Phe Arg Thr Arg
            485                 490                 495

Ser Lys Met Pro Leu Lys Asp Val Pro Leu Gly Gln Leu Glu Ala Glu
```

-continued

```
                500                 505                 510
Leu Gln Ala Pro Asp Ile Thr Pro Asp Met Tyr Asp Pro Asn Thr Ala
                515                 520                 525
Asp Asp Glu Asp Trp Lys Met Trp Leu Gly Gly Leu Met Asn Asp Asp
            530                 535                 540
Val Gly Asn Glu Asp Glu Ala Asp Asp Asp Asp Pro Glu Tyr Asn
545                 550                 555                 560
Phe Leu Glu Asp Leu Asp Glu Pro Asp Thr Glu Asp Phe Arg Thr Asp
                565                 570                 575
Arg Ala Val Arg Ile Thr Lys Lys Glu Val Asn Glu Leu Met Glu Glu
                580                 585                 590
Leu Phe Glu Thr Phe Gln Asp Glu Met Gly Phe Ser Asn Met Glu Asp
            595                 600                 605
Asp Gly Pro Glu Glu Glu Cys Val Ala Glu Pro Arg Pro Asn Phe
610                 615                 620
Asn Thr Pro Gln Ala Leu Arg Phe Glu Glu Pro Leu Ala Asn Leu Leu
625                 630                 635                 640
Asn Glu Gln His Arg Thr Val Lys Glu Leu Phe Glu Gln Leu Lys Met
                645                 650                 655
Lys Lys Ser Ser Ala Lys Gln Leu Gln Glu Val Glu Lys Val Lys Pro
            660                 665                 670
Gln Ser Glu Lys Val His Gln Thr Leu Ile Leu Asp Pro Ala Gln Arg
            675                 680                 685
Lys Arg Leu Gln Gln Gln Met Gln Gln His Val Gln Leu Leu Thr Gln
            690                 695                 700
Ile His Leu Leu Ala Thr Cys Asn Pro Asn Leu Asn Pro Glu Ala Thr
705                 710                 715                 720
Thr Thr Arg Ile Phe Leu Lys Glu Leu Gly Thr Phe Ala Gln Ser Ser
                725                 730                 735
Ile Ala Leu His His Gln Tyr Asn Pro Lys Phe Gln Thr Leu Phe Gln
            740                 745                 750
Pro Cys Asn Leu Met Gly Ala Met Gln Leu Ile Glu Asp Phe Ser Thr
            755                 760                 765
His Val Ser Ile Asp Cys Ser Pro His Lys Thr Val Lys Lys Thr Ala
            770                 775                 780
Asn Glu Phe Pro Cys Leu Pro Lys Gln Val Ala Trp Ile Leu Ala Thr
785                 790                 795                 800
Ser Lys Val Phe Met Tyr Pro Glu Leu Leu Pro Val Cys Ser Leu Lys
                805                 810                 815
Ala Lys Asn Pro Gln Asp Lys Ile Val Phe Thr Lys Ala Glu Asp Asn
            820                 825                 830
Leu Leu Ala Leu Gly Leu Lys His Phe Glu Gly Thr Glu Phe Pro Asn
            835                 840                 845
Pro Leu Ile Ser Lys Tyr Leu Leu Thr Cys Lys Thr Ala His Gln Leu
            850                 855                 860
Thr Val Arg Ile Lys Asn Leu Asn Met Asn Arg Ala Pro Asp Asn Ile
865                 870                 875                 880
Ile Lys Phe Tyr Lys Lys Thr Lys Gln Leu Pro Val Leu Gly Lys Cys
                885                 890                 895
Cys Glu Glu Ile Gln Pro His Gln Trp Lys Pro Pro Ile Glu Arg Glu
            900                 905                 910
Glu His Arg Leu Pro Phe Trp Leu Lys Ala Ser Leu Pro Ser Ile Gln
            915                 920                 925
```

```
Glu Glu Leu Arg His Met Ala Asp Gly Ala Arg Val Gly Asn Met
        930                 935                 940

Thr Gly Thr Thr Glu Ile Asn Ser Asp Arg Ser Leu Glu Lys Asp Asn
945                 950                 955                 960

Leu Glu Leu Gly Ser Glu Ser Arg Tyr Pro Leu Leu Pro Lys Gly
                965                 970                 975

Val Val Leu Lys Leu Lys Pro Val Ala Thr Arg Phe Pro Arg Lys Ala
        980                 985                 990

Trp Arg Gln Lys Arg Ser Ser Val Leu Lys Pro Leu Leu Ile Gln Pro
        995                 1000                1005

Ser Pro Ser Leu Gln Pro Ser Phe Asn Pro Gly Lys Thr Pro Ala Arg
        1010                1015                1020

Ser Thr His Ser Glu Ala Pro Pro Ser Lys Met Val Leu Arg Ile Pro
1025                1030                1035                1040

His Pro Ile Gln Pro Ala Thr Val Leu Gln Thr Val Pro Gly Val Pro
                1045                1050                1055

Pro Leu Gly Val Ser Gly Gly Glu Ser Phe Glu Ser Pro Ala Ala Leu
                1060                1065                1070

Pro Ala Val Pro Pro Glu Ala Arg Thr Ser Phe Pro Leu Ser Glu Ser
        1075                1080                1085

Gln Thr Leu Leu Ser Ser Ala Pro Val Pro Lys Val Met Leu Pro Ser
        1090                1095                1100

Leu Ala Pro Ser Lys Phe Arg Lys Pro Tyr Val Arg Arg Pro Ser
1105                1110                1115                1120

Lys Arg Arg Gly Val Lys Ala Ser Pro Cys Met Lys Pro Ala Pro Val
                1125                1130                1135

Ile His His Pro Ala Ser Val Ile Phe Thr Val Pro Ala Thr Thr Val
                1140                1145                1150

Lys Ile Val Ser Leu Gly Gly Gly Cys Asn Met Ile Gln Pro Val Asn
        1155                1160                1165

Ala Ala Val Ala Gln Ser Pro Gln Thr Ile Pro Ile Thr Thr Leu Leu
        1170                1175                1180

Val Asn Pro Thr Ser Phe Pro Cys Pro Leu Asn Gln Ser Leu Val Ala
1185                1190                1195                1200

Ser Ser Val Ser Pro Leu Ile Val Ser Gly Asn Ser Val Asn Leu Pro
                1205                1210                1215

Ile Pro Ser Thr Pro Glu Asp Lys Ala His Val Asn Val Asp Ile Ala
                1220                1225                1230

Cys Ala Val Ala Asp Gly Glu Asn Ala Phe Gln Gly Leu Glu Pro Lys
        1235                1240                1245

Leu Glu Pro Gln Glu Leu Ser Pro Leu Ser Ala Thr Val Phe Pro Lys
        1250                1255                1260

Val Glu His Ser Pro Gly Pro Pro Leu Ala Asp Ala Glu Cys Gln Glu
1265                1270                1275                1280

Gly Leu Ser Glu Asn Ser Ala Cys Arg Trp Thr Val Val Lys Thr Glu
                1285                1290                1295

Glu Gly Arg Gln Ala Leu Glu Pro Leu Pro Gln Gly Ile Gln Glu Ser
        1300                1305                1310

Leu Asn Asn Pro Thr Pro Gly Asp Leu Glu Glu Ile Val Lys Met Glu
        1315                1320                1325

Pro Glu Glu Ala Arg Glu Ile Ser Gly Ser Pro Glu Arg Asp Ile
        1330                1335                1340
```

-continued

```
Cys Asp Asp Ile Lys Val Glu His Ala Val Glu Leu Asp Thr Gly Ala
1345                1350                1355                1360

Pro Ser Glu Glu Leu Ser Ser Ala Gly Glu Val Thr Lys Gln Thr Val
            1365                1370                1375

Leu Gln Lys Glu Glu Arg Ser Gln Pro Thr Lys Thr Pro Ser Ser
        1380                1385                1390

Ser Gln Glu Pro Pro Asp Glu Gly Thr Ser Gly Thr Asp Val Asn Lys
        1395                1400                1405

Gly Ser Ser Lys Asn Ala Leu Ser Ser Met Asp Pro Glu Val Arg Leu
    1410                1415                1420

Ser Ser Pro Pro Gly Lys Pro Glu Asp Ser Ser Val Asp Gly Gln
1425                1430                1435                1440

Ser Val Gly Thr Pro Val Gly Pro Glu Thr Gly Gly Glu Lys Asn Gly
                1445                1450                1455

Pro Glu Glu Glu Glu Glu Asp Phe Asp Asp Leu Thr Gln Asp Glu
                1460                1465                1470

Glu Asp Glu Met Ser Ser Ala Ser Glu Glu Ser Val Leu Ser Val Pro
        1475                1480                1485

Glu Leu Gln Glu Thr Met Glu Lys Leu Thr Trp Leu Ala Ser Glu Arg
    1490                1495                1500

Arg Met Ser Gln Glu Gly Glu Ser Glu Glu Asn Ser Gln Glu Glu
1505                1510                1515                1520

Asn Ser Glu Pro Glu Glu Glu Glu Glu Ala Glu Gly Met Glu
                1525                1530                1535

Ser Leu Gln Lys Glu Asp Glu Met Thr Asp Glu Ala Val Gly Asp Ser
        1540                1545                1550

Ala Glu Lys Pro Pro Thr Phe Ala Ser Pro Glu Thr Ala Pro Glu Val
        1555                1560                1565

Glu Thr Ser Arg Thr Pro Pro Gly Glu Ser Ile Lys Ala Ala Gly Lys
    1570                1575                1580

Gly Arg Asn Asn His Arg Ala Arg Asn Lys Arg Gly Ser Arg Ala Arg
1585                1590                1595                1600

Ala Ser Lys Asp Thr Ser Lys Leu Leu Leu Leu Tyr Asp Glu Asp Ile
        1605                1610                1615

Leu Glu Arg Asp Pro Leu Arg Glu Gln Lys Asp Leu Ala Phe Ala Gln
        1620                1625                1630

Ala Tyr Leu Thr Arg Val Arg Glu Ala Leu Gln His Ile Pro Gly Lys
        1635                1640                1645

Tyr Glu Asp Phe Leu Gln Val Ile Tyr Glu Phe Glu Ser Ser Thr Gln
    1650                1655                1660

Arg Arg Thr Ala Val Asp Leu Tyr Lys Ser Leu Gln Ile Leu Leu Gln
1665                1670                1675                1680

Asp Trp Pro Gln Leu Leu Lys Asp Phe Ala Ala Phe Leu Leu Pro Glu
        1685                1690                1695

Gln Ala Leu Ala Cys Gly Leu Phe Glu Glu Gln Ala Phe Glu Lys
        1700                1705                1710

Ser Arg Lys Phe Leu Arg Gln Leu Glu Ile Cys Phe Ala Glu Asn Pro
    1715                1720                1725

Ser His His Gln Lys Ile Ile Lys Val Leu Gln Gly Cys Ala Asp Cys
        1730                1735                1740

Leu Pro Gln Glu Ile Thr Glu Leu Lys Thr Gln Met Trp Gln Leu Leu
1745                1750                1755                1760

Lys Gly His Asp His Leu Gln Asp Glu Phe Ser Ile Phe Phe Asp His
```

```
                    1765            1770            1775

Leu Arg Pro Ala Ala Ser Arg Met Gly Asp Phe Glu Glu Ile Asn Trp
                1780            1785            1790

Thr Glu Glu Lys Glu Tyr Glu Phe Asp Gly Phe Glu Glu Val Ala Leu
                1795            1800            1805

Pro Asp Val Glu Glu Glu Glu Pro Pro Lys Ile Pro Thr Ala Ser
        1810            1815            1820

Lys Asn Lys Arg Lys Lys Glu Ile Gly Val Gln Asn His Asp Lys Glu
1825            1830            1835            1840

Thr Glu Trp Pro Asp Gly Ala Lys Asp Cys Ala Cys Ser Cys His Glu
                1845            1850            1855

Gly Gly Pro Asp Ser Lys Leu Lys Lys Ser Lys Arg Arg Ser Cys Ser
                1860            1865            1870

His Cys Ser Ser Lys Val Cys Asp Ser Lys Ser Tyr Lys Ser Lys Glu
        1875            1880            1885

Pro His Glu Leu Val Gly Ser Ser Pro His Arg Glu Ala Ser Pro Met
        1890            1895            1900

Pro Gly Ala Lys Glu Ala Gly Gln Gly Lys Asp Met Met Glu Glu Glu
1905            1910            1915            1920

Ala Pro Glu Glu Arg Glu Ser Thr Glu Ala Thr Gln Ser Arg Thr Val
                1925            1930            1935

Arg Thr Thr Arg Lys Gly Glu Met Pro Val Ser Ala Gly Leu Ala Val
                1940            1945            1950

Gly Ser Thr Leu Pro Ser Pro Arg Glu Val Thr Val Thr Glu Arg Leu
        1955            1960            1965

Leu Leu Asp Gly Pro Pro His Ser Pro Glu Thr Pro Gln Phe Pro
        1970            1975            1980

Pro Thr Thr Gly Ala Val Leu Tyr Thr Val Lys Arg Asn Gln Val Gly
1985            1990            1995            2000

Pro Glu Val Arg Ser Cys Pro Lys Ala Ser Pro Arg Leu Gln Lys Glu
                2005            2010            2015

Arg Glu Gly Gln Lys Ala Val Ser Glu Ser Glu Ala Leu Met Leu Val
                2020            2025            2030

Trp Asp Ala Ser Glu Thr Glu Lys Leu Pro Gly Thr Val Glu Pro Pro
                2035            2040            2045

Ala Ser Phe Leu Ser Pro Val Ser Ser Lys Thr Arg Asp Ala Gly Arg
        2050            2055            2060

Arg His Val Ser Gly Lys Pro Asp Thr Gln Glu Arg Trp Leu Pro Ser
2065            2070            2075            2080

Ser Arg Ala Arg Val Lys Thr Arg Asp Arg Thr Cys Pro Val His Glu
                2085            2090            2095

Ser Pro Ser Gly Ile Asp Thr Ser Glu Thr Ser Pro Lys Ala Pro Arg
        2100            2105            2110

Gly Gly Leu Ala Lys Asp Ser Gly Thr Gln Ala Lys Gly Pro Glu Gly
                2115            2120            2125

Glu Gln Gln Pro Lys Ala Ala Glu Ala Thr Val Cys Ala Asn Asn Ser
        2130            2135            2140

Lys Val Ser Ser Thr Gly Glu Lys Val Val Leu Trp Thr Arg Glu Ala
2145            2150            2155            2160

Asp Arg Val Ile Leu Thr Met Cys Gln Glu Gln Gly Ala Gln Pro Gln
                2165            2170            2175

Thr Phe Asn Ile Ile Ser Gln Gln Leu Gly Asn Lys Thr Pro Ala Glu
                2180            2185            2190
```

```
Val Ser His Arg Phe Arg Glu Leu Met Gln Leu Phe His Thr Ala Cys
        2195                2200                2205

Glu Ala Ser Ser Glu Asp Glu Asp Ala Thr Ser Thr Ser Asn Ala
    2210                2215                2220

Asp Gln Leu Ser Asp His Gly Asp Leu Leu Ser Glu Glu Leu Asp
2225                2230                2235                2240

Glu

<210> SEQ ID NO 5
<211> LENGTH: 356
<212> TYPE: PRT
<213> ORGANISM: Homo sapiens
<220> FEATURE:
<223> OTHER INFORMATION: human NEUROD1, GenBank: BAJ84018.1

<400> SEQUENCE: 5

Met Thr Lys Ser Tyr Ser Glu Ser Gly Leu Met Gly Glu Pro Gln Pro
1               5                   10                  15

Gln Gly Pro Pro Ser Trp Thr Asp Glu Cys Leu Ser Ser Gln Asp Glu
            20                  25                  30

Glu His Glu Ala Asp Lys Lys Glu Asp Asp Leu Glu Ala Met Asn Ala
        35                  40                  45

Glu Glu Asp Ser Leu Arg Asn Gly Gly Glu Glu Glu Asp Glu Asp Glu
    50                  55                  60

Asp Leu Glu Glu Glu Glu Glu Glu Glu Glu Asp Asp Asp Gln Lys
65                  70                  75                  80

Pro Lys Arg Arg Gly Pro Lys Lys Lys Met Thr Lys Ala Arg Leu
                85                  90                  95

Glu Arg Phe Lys Leu Arg Arg Met Lys Ala Asn Ala Arg Glu Arg Asn
                100                 105                 110

Arg Met His Gly Leu Asn Ala Ala Leu Asp Asn Leu Arg Lys Val Val
            115                 120                 125

Pro Cys Tyr Ser Lys Thr Gln Lys Leu Ser Lys Ile Glu Thr Leu Arg
    130                 135                 140

Leu Ala Lys Asn Tyr Ile Trp Ala Leu Ser Glu Ile Leu Arg Ser Gly
145                 150                 155                 160

Lys Ser Pro Asp Leu Val Ser Phe Val Gln Thr Leu Cys Lys Gly Leu
                165                 170                 175

Ser Gln Pro Thr Thr Asn Leu Val Ala Gly Cys Leu Gln Leu Asn Pro
            180                 185                 190

Arg Thr Phe Leu Pro Glu Gln Asn Gln Asp Met Pro Pro His Leu Pro
        195                 200                 205

Thr Ala Ser Ala Ser Phe Pro Val His Pro Tyr Ser Tyr Gln Ser Pro
    210                 215                 220

Gly Leu Pro Ser Pro Pro Tyr Gly Thr Met Asp Ser Ser His Val Phe
225                 230                 235                 240

His Val Lys Pro Pro Pro His Ala Tyr Ser Ala Ala Leu Glu Pro Phe
                245                 250                 255

Phe Glu Ser Pro Leu Thr Asp Cys Thr Ser Pro Ser Phe Asp Gly Pro
            260                 265                 270

Leu Ser Pro Pro Leu Ser Ile Asn Gly Asn Phe Ser Phe Lys His Glu
        275                 280                 285

Pro Ser Ala Glu Phe Glu Lys Asn Tyr Ala Phe Thr Met His Tyr Pro
    290                 295                 300
```

```
Ala Ala Thr Leu Ala Gly Ala Gln Ser His Gly Ser Ile Phe Ser Gly
305                 310                 315                 320

Thr Ala Ala Pro Arg Cys Glu Ile Pro Ile Asp Asn Ile Met Ser Phe
            325                 330                 335

Asp Ser His Ser His His Glu Arg Val Met Ser Ala Gln Leu Asn Ala
        340                 345                 350

Ile Phe His Asp
        355

<210> SEQ ID NO 6
<211> LENGTH: 297
<212> TYPE: PRT
<213> ORGANISM: Homo sapiens
<220> FEATURE:
<223> OTHER INFORMATION: human OTX2 Isoform A, NCBI Reference Sequence:
      NP_068374.1

<400> SEQUENCE: 6

Met Met Ser Tyr Leu Lys Gln Pro Pro Tyr Ala Val Asn Gly Leu Ser
1               5                   10                  15

Leu Thr Thr Ser Gly Met Asp Leu Leu His Pro Ser Val Gly Tyr Pro
            20                  25                  30

Gly Pro Trp Ala Ser Cys Pro Ala Thr Pro Arg Lys Gln Arg Arg
        35                  40                  45

Glu Arg Thr Thr Phe Thr Arg Ala Gln Leu Asp Val Leu Glu Ala Leu
50                  55                  60

Phe Ala Lys Thr Arg Tyr Pro Asp Ile Phe Met Arg Glu Glu Val Ala
65                  70                  75                  80

Leu Lys Ile Asn Leu Pro Glu Ser Arg Val Gln Val Trp Phe Lys Asn
                85                  90                  95

Arg Arg Ala Lys Cys Arg Gln Gln Gln Gln Gln Gln Asn Gly Gly
            100                 105                 110

Gln Asn Lys Val Arg Pro Ala Lys Lys Lys Thr Ser Pro Ala Arg Glu
        115                 120                 125

Val Ser Ser Glu Ser Gly Thr Ser Gly Gln Phe Thr Pro Pro Ser Ser
130                 135                 140

Thr Ser Val Pro Thr Ile Ala Ser Ser Ala Pro Val Ser Ile Trp
145                 150                 155                 160

Ser Pro Ala Ser Ile Ser Pro Leu Ser Asp Pro Leu Ser Thr Ser Ser
                165                 170                 175

Ser Cys Met Gln Arg Ser Tyr Pro Met Thr Tyr Thr Gln Ala Ser Gly
            180                 185                 190

Tyr Ser Gln Gly Tyr Ala Gly Ser Thr Ser Tyr Phe Gly Gly Met Asp
        195                 200                 205

Cys Gly Ser Tyr Leu Thr Pro Met His His Gln Leu Pro Gly Pro Gly
210                 215                 220

Ala Thr Leu Ser Pro Met Gly Thr Asn Ala Val Thr Ser His Leu Asn
225                 230                 235                 240

Gln Ser Pro Ala Ser Leu Ser Thr Gln Gly Tyr Gly Ala Ser Ser Leu
                245                 250                 255

Gly Phe Asn Ser Thr Thr Asp Cys Leu Asp Tyr Lys Asp Gln Thr Ala
            260                 265                 270

Ser Trp Lys Leu Asn Phe Asn Ala Asp Cys Leu Asp Tyr Lys Asp Gln
        275                 280                 285

Thr Ser Ser Trp Lys Phe Gln Val Leu
        290                 295
```

<210> SEQ ID NO 7
<211> LENGTH: 289
<212> TYPE: PRT
<213> ORGANISM: Homo sapiens
<220> FEATURE:
<223> OTHER INFORMATION: human OTX2 Isoform B, NCBI Reference Sequence:
    NP_001257453.1

<400> SEQUENCE: 7

```
Met Met Ser Tyr Leu Lys Gln Pro Pro Tyr Ala Val Asn Gly Leu Ser
1               5                   10                  15

Leu Thr Thr Ser Gly Met Asp Leu Leu His Pro Ser Val Gly Tyr Pro
            20                  25                  30

Ala Thr Pro Arg Lys Gln Arg Arg Glu Arg Thr Thr Phe Thr Arg Ala
        35                  40                  45

Gln Leu Asp Val Leu Glu Ala Leu Phe Ala Lys Thr Arg Tyr Pro Asp
    50                  55                  60

Ile Phe Met Arg Glu Glu Val Ala Leu Lys Ile Asn Leu Pro Glu Ser
65                  70                  75                  80

Arg Val Gln Val Trp Phe Lys Asn Arg Arg Ala Lys Cys Arg Gln Gln
                85                  90                  95

Gln Gln Gln Gln Gln Asn Gly Gly Gln Asn Lys Val Arg Pro Ala Lys
            100                 105                 110

Lys Lys Thr Ser Pro Ala Arg Glu Val Ser Ser Glu Ser Gly Thr Ser
        115                 120                 125

Gly Gln Phe Thr Pro Pro Ser Ser Thr Ser Val Pro Thr Ile Ala Ser
    130                 135                 140

Ser Ser Ala Pro Val Ser Ile Trp Ser Pro Ala Ser Ile Ser Pro Leu
145                 150                 155                 160

Ser Asp Pro Leu Ser Thr Ser Ser Ser Cys Met Gln Arg Ser Tyr Pro
                165                 170                 175

Met Thr Tyr Thr Gln Ala Ser Gly Tyr Ser Gln Gly Tyr Ala Gly Ser
            180                 185                 190

Thr Ser Tyr Phe Gly Gly Met Asp Cys Gly Ser Tyr Leu Thr Pro Met
        195                 200                 205

His His Gln Leu Pro Gly Pro Gly Ala Thr Leu Ser Pro Met Gly Thr
    210                 215                 220

Asn Ala Val Thr Ser His Leu Asn Gln Ser Pro Ala Ser Leu Ser Thr
225                 230                 235                 240

Gln Gly Tyr Gly Ala Ser Ser Leu Gly Phe Asn Ser Thr Thr Asp Cys
                245                 250                 255

Leu Asp Tyr Lys Asp Gln Thr Ala Ser Trp Lys Leu Asn Phe Asn Ala
            260                 265                 270

Asp Cys Leu Asp Tyr Lys Asp Gln Thr Ser Ser Trp Lys Phe Gln Val
        275                 280                 285

Leu
```

<210> SEQ ID NO 8
<211> LENGTH: 4587
<212> TYPE: DNA
<213> ORGANISM: Homo sapiens

<400> SEQUENCE: 8

```
atgttgccct gtaagaagag aagaactaca gtgacagagt ccctacagca taaaggcaat    60
caagaggaaa acaacgtaga cctagaatca gccgttaaac cagaatctga ccaggttaag   120
```

```
gacttgagtt cggtgtcact atcctgggat ccaagtcatg gcagagtagc tggcttcgaa    180
gtacagtctt tgcaggatgc aggaaatcag cttggtatgg aggatacatc tctgagctct    240
ggaatgctca cccagaacac aaatgtacca attctagaag gtgttgatgt ggccatctct    300
cagggaatca ccctaccttc cttggagtct tttcaccccc ttaatataca cattggtaaa    360
ggaaaactcc acgctactgg ctcaaagaga gggaaaaaaa tgacactcag gcctgggcca    420
gttacccaag aagacagatg tgatcatctt accctaaagg agccttttc aggagagcct    480 agtgaagaag tcaaggaaga aggagggaaa cctcaaatga attctgaagg ggagataccct    540 tccctgccat caggcagcca atctgcaaaa ccagtaagcc agcccaggaa atcaacccag    600
ccagatgttt gtgcctctcc tcaagaaaag ccactcagga ctctgtttca ccaacctgag    660
gaagagatag aagatggtgg actcttcatt ccaatggaag aacaagacaa tgaagaaagt    720
gagaaaagga gaaaaagaa aagggtacc aagaggaaac gagatggaag gggtcaagaa    780
gggaccttgg catatgacct gaaactggat gacatgcttg accgtacctt ggaggatggt    840
gccaagcagc acaatctaac agcagtcaat gtccgaaaca tccttcatga agtaatcaca    900
aatgaacacg tggtagctat gatgaaagca gccatcagtg agacggaaga tatgccaatg    960
tttgagccta aaatgacacg ctctaaactg aaggaagtag tggaaaaagg agtggtaatt   1020
ccaacatgga atatttcacc aattaagaag gccaatgaaa ttaagcctcc tcagtttgtg   1080
gatatccacc ttgaagaaga tgattcctca gatgaagaat accagccgga tgatgaagaa   1140
gaagatgaaa ctgctgaaga gagcttattg gaaagtgatg ttgaaagcac tgcttcatct   1200
ccacgtgggg caaagaaatc cagattgagg cagtcttctg agatgactga aacagatgag   1260
gagagtggca tattatcaga ggctgagaaa gtcaccacac cagccatcag gcacatcagt   1320
gctgaggtag tgcccatggg gccccgcc cctccaaagc cgaaacagac cagagatagt   1380
actttcatgg agaagttaca tgcggtagat gaggagctgg cttccagtcc agtctgcatg   1440
gattctttcc agcccatgga tgacagtctc attgcatttc gaacgcgttc taagatgccc   1500
ctgaaagatg ttcccctggg ccaattagag gcagagctcc aagctccaga catcactcca   1560
gatatgtatg accccaatac ggcagatgat gaggactgga gatgtggct ggggggactt   1620 atgaatgatg atgtggggaa tgaagatgaa gcagatgatg atgatgatcc agaatataat   1680
ttcctggaag acctcgatga accagacaca gaggatttcc ggactgaccg ggcagtgaga   1740
atcaccaaaa aggaagtaaa tgagctgatg gaagagctgt ttgaaacttt ccaagatgag   1800
atgggattct ccaacatgga agatgatggc ccagaagagg aggagtgtgt agctgagcct   1860
cgtcctaact ttaacaccccc tcaagctcta cggtttgagg aaccactggc caacctgtta   1920
aatgaacaac atcggacagt gaaggagcta tttaacagc tgaagatgaa gaatcttca   1980 gccaaacagc tgcaggaagt agagaaggtt aaaccccaga gtgagaaagt tcatcagact   2040
ctgattctgg acccagcaca gaggaagaga ctccagcagc agatgcagca gcacgttcag   2100
ctcttgaccc aaatccacct tcttgccacc tgcaaccccca acctcaatcc ggaggccact   2160
accaccagga tatttcttaa agagctggga acctttgctc aaagctccat cgcccttcac   2220
catcagtaca accccaagtt tcagaccctg ttccaaccct gtaacttgat gggagctatg   2280
cagctgattg aagacttcag cacacatgtc agcattgact gcagccctca taaaactgtc   2340
aagaagactg cgaatgaatt tccctgtttg ccaaagcaag tggcttggat tctggccaca   2400
agcaaggttt tcatgtatcc agagttactt ccagtgtgtt ccctgaaggc aaagaatccc   2460
```

| | |
|---|---|
| caggataaga tcgtcttcac caaggctgag gacaatttgt tagctttagg actgaagcat | 2520 |
| tttgaaggaa ctgagtttcc taatcctcta atcagcaagt accttctaac ctgcaaaact | 2580 |
| gcccaccaac tgacagtgag aatcaagaac ctcaacatga acagagctcc tgacaacatc | 2640 |
| attaaatttt ataagaagac caaacagctg ccagtcctag gaaaatgctg tgaagagatc | 2700 |
| cagccacatc agtggaagcc acctatagag agagaagaac accggctccc attctggtta | 2760 |
| aaggccagtc tgccatccat ccaggaagaa ctgcggcaca tggctgatgg tgctagagag | 2820 |
| gtaggaaata tgactggaac cactgagatc aactcagatc gaagcctaga aaagacaat | 2880 |
| ttggagttgg ggagtgaatc tcggtaccca ctgctattgc ctaagggtgt agtcctgaaa | 2940 |
| ctgaagccag ttgccacccg tttccccagg aaggcttgga gacagaagcg ttcatcagtc | 3000 |
| ctgaagcccc tccttatcca acccagcccc tctctccagc ccagcttcaa ccctgggaaa | 3060 |
| acaccagccc gatcaactca ttcagaagcc cctccgagca aaatggtgct ccggattcct | 3120 |
| cacccaatac agccaccac tgttttacag acagttccag gtgtccctcc actgggggtc | 3180 |
| agtggaggtg agagttttga gtctcctgca gcactgcctg ctgtgccccc tgaggccagg | 3240 |
| acaagcttcc ctctgtctga gtcccagact ttgctctctt ctgcccctgt gcccaaggta | 3300 |
| atgctgccct cccttgcccc ttctaagttt cgaaagccat atgtgagacg gagaccctca | 3360 |
| aagagaagag gagtcaaggc ctctccctgt atgaaacctg ccctgttat ccaccaccct | 3420 |
| gcatctgtta tcttcactgt tcctgctacc actgtgaaga ttgtgagcct tggcggtggc | 3480 |
| tgtaacatga tccagcctgt caatgcggct gtggcccaga gtccccagac tattcccatc | 3540 |
| actaccctct tggttaaccc tacttccttc ccctgtccat tgaaccagtc ccttgtggcc | 3600 |
| tcctctgtct caccttaat tgtttctggc aattctgtga atcttcctat accatccacc | 3660 |
| cctgaagata aggcccacgt gaatgtgac attgcttgtg ctgtggctga tggggaaaat | 3720 |
| gcctttcagg gcctagaacc caaattagag ccccaggaac tatctcctct ctctgctact | 3780 |
| gttttcccga aagtggaaca tagcccaggg cctccactag cagatgcaga gtgccaagaa | 3840 |
| ggattgtcag agaatagtgc ctgtcgctgg accgttgtga aaacagagga ggggaggcaa | 3900 |
| gctctggagc cgctccctca gggcatccag gagtctctaa acaaccctac ccctggggat | 3960 |
| ttagaggaaa ttgtcaagat ggaacctgaa gaagctagag aggaaatcag tggatcccct | 4020 |
| gagcgtgata tttgtgatga catcaaagtg gaacatgctg tggaattgga cactggtgcc | 4080 |
| ccaagcgagg agttgagcag tgctggagaa gtaacgaaac agacagtctt acagaaggaa | 4140 |
| gaggagagga gtcagccaac taaaacccct tcatcttctc aagagccccc tgatgaagga | 4200 |
| acctcaggga cagatgtgaa caaaggatca tcaaagaatg ctttgtcctc aatggatcct | 4260 |
| gaagtgaggc ttagtagccc cccagggaag ccagaagatt catccagtgt tgatggtcag | 4320 |
| tcagtgggga ctccagttgg gccagaaact ggaggagaga agaatgggcc agaagaagag | 4380 |
| gaagaagagg actttgatga cctcacccaa gatgaggaag atgaaatgtc atcagcttct | 4440 |
| gaggaatctg tgctttctgt cccagaactc caggtgagag ctggagaata ttctcaagta | 4500 |
| tttcgtggac tcagtaatat gtatcactta ttgatatgcc acctgcttgc ttgctgcact | 4560 |
| atggatagtc ctaaaatcat ttgtatt | 4587 |

<210> SEQ ID NO 9
<211> LENGTH: 4641
<212> TYPE: DNA
<213> ORGANISM: Homo sapiens

<400> SEQUENCE: 9

```
atgttgccct gtaagaagag aagaactaca gtgacagagt ccctacagca taaaggcaat    60
caagaggaaa acaacgtaga cctagaatca gccgttaaac cagaatctga ccaggttaag   120
gacttgagtt cggtgtcact atcctgggat ccaagtcatg gcagagtagc tggcttcgaa   180
gtacagtctt tgcaggatgc aggaaatcag cttggtatgg aggatacatc tctgagctct   240
ggaatgctca cccagaacac aaatgtacca attctagaag gtgttgatgt ggccatctct   300
cagggaatca ccctaccttc cttggagtct tttcaccccc ttaatataca cattggtaaa   360
ggaaaactcc acgctactgg ctcaaagaga gggaaaaaaa tgacactcag gcctgggcca   420
gttacccaag aagacagatg tgatcatctt accctaaagg agccttttc aggagagcct    480 agtgaagaag tcaaggaaga aggagggaaa cctcaaatga attctgaagg ggagatacct   540
tccctgccat caggcagcca atctgcaaaa ccagtaagcc agcccaggaa atcaacccag   600
ccagatgttt gtgcctctcc tcaagaaaag ccactcagga ctctgtttca ccaacctgag   660
gaagagatag aagatggtgg actcttcatt ccaatggaag aacaagacaa tgaagaaagt   720
gagaaaagga gaaaaagaa aagggtacc aagaggaaac gagatggaag gggtcaagaa     780
gggaccttgg catatgacct gaaactggat gacatgcttg accgtacctt ggaggatggt   840
gccaagcagc acaatctaac agcagtcaat gtccgaaaca tccttcatga agtaatcaca   900
aatgaacacg tggtagctat gatgaaagca gccatcagtg agacggaaga tatgccaatg   960
tttgagccta aaatgacacg ctctaaactg aaggaagtag tggaaaaagg agtggtaatt  1020
ccaacatgga atatttcacc aattaagaag gccaatgaaa ttaagcctcc tcagtttgtg  1080
gatatccacc ttgaagaaga tgattcctca gatgaagaat accagccgga tgatgaagaa  1140
gaagatgaaa ctgctgaaga gagcttattg gaaagtgatg ttgaaagcac tgcttcatct  1200
ccacgtgggg caaagaaatc cagattgagg cagtcttctg agatgactga aacagatgag  1260
gagagtggca tattatcaga ggctgagaaa gtcaccacac cagccatcag gcacatcagt  1320
gctgaggtag tgcccatggg gcccccgccc cctccaaagc cgaaacagac cagagatagt  1380
actttcatgg agaagttaca tgcggtagat gaggagctgg cttccagtcc agtctgcatg  1440
gattctttcc agcccatgga tgacagtctc attgcatttc gaacgcgttc taagatgccc  1500
ctgaaagatg ttccctggg ccaattagag gcagagctcc aagctccaga catcactcca   1560
gatatgtatg accccaatac ggcagatgat gaggactgga gatgtggct gggggggactt  1620 atgaatgatg atgtggggaa tgaagatgaa gcagatgatg atgatgatcc agaatataat  1680
ttcctggaag acctcgatga accagacaca gaggatttcc ggactgaccg ggcagtgaga  1740
atcaccaaaa aggaagtaaa tgagctgatg aagagctgt ttgaaacttt ccaagatgag   1800
atgggattct ccaacatgga agatgatggc cagaagagg aggagtgtgt agctgagcct   1860
cgtcctaact ttaacacccc tcaagctcta cggtttgagg aaccactggc caacctgtta  1920
aatgaacaac atcggacagt gaaggagcta tttgaacagc tgaagatgaa gaatcttca   1980 gccaaacagc tgcaggaagt agagaaggtt aaacccaga gtgagaaagt tcatcagact   2040
ctgattctgg acccagcaca gaggaagaga ctccagcagc agatgcagca gcacgttcag  2100
ctcttgaccc aaatccacct tcttgccacc tgcaaccca acctcaatcc ggaggccact  2160
accaccagga tatttcttaa agagctggga accttgctc aaagctccat cgcccttcac   2220
catcagtaca accccaagtt tcagaccctg ttccaaccct gtaacttgat gggagctatg  2280
cagctgattg aagacttcag cacacatgtc agcattgact gcagccctca taaaactgtc  2340
```

```
aagaagactg cgaatgaatt tccctgtttg ccaaagcaag tggcttggat tctgccaca   2400
agcaaggttt tcatgtatcc agagttactt ccagtgtgtt ccctgaaggc aaagaatccc   2460
caggataaga tcgtcttcac caaggctgag acaatttgt tagctttagg actgaagcat    2520
tttgaaggaa ctgagtttcc taatcctcta atcagcaagt accttctaac ctgcaaaact   2580
gcccaccaac tgacagtgag aatcaagaac ctcaacatga acagagctcc tgacaacatc   2640
attaaatttt ataagaagac caaacagctg ccagtcctag gaaaatgctg tgaagagatc   2700
cagccacatc agtggaagcc acctatagag agagaagaac accggctccc attctggtta   2760
aaggccagtc tgccatccat ccaggaagaa ctgcggcaca tggctgatgg tgctagagag   2820
gtaggaaata tgactggaac cactgagatc aactcagatc gaagcctaga aaaagacaat   2880
ttggagttgg ggagtgaatc tcggtaccca ctgctattgc ctaagggtgt agtcctgaaa   2940
ctgaagccag ttgccacccg tttccccagg aaggcttgga gacagaagcg ttcatcagtc   3000
ctgaagcccc tccttatcca acccagcccc tctctccagc ccagcttcaa ccctgggaaa   3060
acaccagccc gatcaactca ttcagaagcc ctccgagcaa aaatggtgct ccggattcct   3120
cacccaatac agccagccac tgttttacag acagttccag gtgtccctcc actgggggtc   3180
agtggaggtg agagttttga gtctcctgca gcactgcctg ctgtgcccccc tgaggccagg   3240
acaagcttcc ctctgtctga gtcccagact ttgctctctt ctgcccctgt gcccaaggta   3300
atgctgccct cccttgcccc ttctaagttt cgaaagccat atgtgagacg gagaccctca   3360
aagagaagag gagtcaaggc ctctccctgt atgaaacctg ccctgttat ccaccaccct    3420
gcatctgtta tcttcactgt tcctgctacc actgtgaaga ttgtgagcct tggcggtggc   3480
tgtaacatga tccagcctgt caatgcggct gtggcccaga gtccccagac tattcccatc   3540
actaccctct tggttaaccc tacttccttc ccctgtccat tgaaccagtc ccttgtggcc   3600
tcctctgtct cacccttaat tgtttctggc aattctgtga atcttcctat accatccacc   3660
cctgaagata aggcccacgt gaatgtggac attgcttgtg ctgtggctga tggggaaaat   3720
gcctttcagg gcctagaacc caaattagag ccccaggaac tatctcctct ctctgctact   3780
gttttcccga aagtggaaca tagcccaggg cctccactag cagatgcaga gtgccaagaa   3840
ggattgtcag agaatagtgc ctgtcgctgg accgttgtga aaacagagga ggggaggcaa   3900
gctctggagc cgctccctca gggcatccag gagtctctaa caaccctac ccctgggat     3960
ttagaggaaa ttgtcaagat ggaacctgaa gaagctagag aggaaatcag tggatcccct   4020
gagcgtgata tttgtgatga catcaaagtg gaacatgctg tggaattgga cactggtgcc   4080
ccaagcgagg agttgagcag tgctggagaa gtaacgaaac agacagtctt acagaaggaa   4140
gaggagagga gtcagccaac taaaaccct tcatcttctc aagagccccc tgatgaagga    4200
acctcaggga cagatgtgaa caaaggatca tcaaagaatg ctttgtcctc aatggatcct   4260
gaagtgaggc ttagtagccc cccagggaag ccagaagatt catccagtgt tgatggtcag   4320
tcagtgggga ctccagttgg gccagaaact ggaggagaga agaatgggcc agaagaagag   4380
gaagaagagg actttgatga cctcaccca gatgaggaag atgaaatgtc atcagcttct    4440
gaggaatctg tgctttctgt cccagaactc caggtgagag ctgagaaata ttctcaagta   4500
tttcgtggac tcagtaatat gtatcactta ttgatatgcc acctgcttgc ttgctgcact   4560
atggatagtc ctaaaatcat ttgtattctc gagggtaagc ctatccctaa ccctctcctc   4620
ggtctcgatt ctacgtaatg a                                             4641
```

<210> SEQ ID NO 10
<211> LENGTH: 1068
<212> TYPE: DNA
<213> ORGANISM: Homo sapiens

<400> SEQUENCE: 10

| | | | | | |
|---|---|---|---|---|---|
| atgaccaaat | cgtacagcga | gagtgggctg | atgggcgagc | ctcagcccca | aggtcctcca | 60 |
| agctggacag | acgagtgtct | cagttctcag | gacgaggagc | acgaggcaga | caagaaggag | 120 |
| gacgacctcg | aagccatgaa | cgcagaggag | gactcactga | ggaacggggg | agaggaggag | 180 |
| gacgaagatg | aggacctgga | agaggaggaa | gaagaggaag | aggaggatga | cgatcaaaag | 240 |
| cccaagagac | gcggccccaa | aaagaagaag | atgactaagg | ctcgcctgga | gcgttttaaa | 300 |
| ttgagacgca | tgaaggctaa | cgcccgggag | cggaaccgca | tgcacggact | gaacgcggcg | 360 |
| ctagacaacc | tgcgcaaggt | ggtgccttgc | tattctaaga | cgcagaagct | gtccaaaatc | 420 |
| gagactctgc | gcttggccaa | gaactacatc | tgggctctgt | cggagatcct | gcgctcaggc | 480 |
| aaaagcccag | acctggtctc | cttcgttcag | acgctttgca | agggcttatc | ccaacccacc | 540 |
| accaacctgg | ttgcgggctg | cctgcaactc | aatcctcgga | cttttctgcc | tgagcagaac | 600 |
| caggacatgc | cccccacct | gccgacggcc | agcgcttcct | tccctgtaca | cccctactcc | 660 |
| taccagtcgc | ctgggctgcc | cagtccgcct | tacggtacca | tggacagctc | ccatgtcttc | 720 |
| cacgttaagc | ctccgccgca | cgcctacagc | gcagcgctgg | agcccttctt | tgaaagccct | 780 |
| ctgactgatt | gcaccagccc | ttcctttgat | ggacccctca | gcccgccgct | cagcatcaat | 840 |
| ggcaacttct | ctttcaaaca | cgaaccgtcc | gccgagtttg | agaaaaatta | tgcctttacc | 900 |
| atgcactatc | ctgcagcgac | actggcaggg | gcccaaagcc | acggatcaat | cttctcaggc | 960 |
| accgctgccc | ctcgctgcga | gatccccata | gacaatatta | tgtccttcga | tagccattca | 1020 |
| catcatgagc | gagtcatgag | tgcccagctc | aatgccatat | ttcatgat | | 1068 |

<210> SEQ ID NO 11
<211> LENGTH: 1122
<212> TYPE: DNA
<213> ORGANISM: Homo sapiens

<400> SEQUENCE: 11

| | | | | | |
|---|---|---|---|---|---|
| atgaccaaat | cgtacagcga | gagtgggctg | atgggcgagc | ctcagcccca | aggtcctcca | 60 |
| agctggacag | acgagtgtct | cagttctcag | gacgaggagc | acgaggcaga | caagaaggag | 120 |
| gacgacctcg | aagccatgaa | cgcagaggag | gactcactga | ggaacggggg | agaggaggag | 180 |
| gacgaagatg | aggacctgga | agaggaggaa | gaagaggaag | aggaggatga | cgatcaaaag | 240 |
| cccaagagac | gcggccccaa | aaagaagaag | atgactaagg | ctcgcctgga | gcgttttaaa | 300 |
| ttgagacgca | tgaaggctaa | cgcccgggag | cggaaccgca | tgcacggact | gaacgcggcg | 360 |
| ctagacaacc | tgcgcaaggt | ggtgccttgc | tattctaaga | cgcagaagct | gtccaaaatc | 420 |
| gagactctgc | gcttggccaa | gaactacatc | tgggctctgt | cggagatcct | gcgctcaggc | 480 |
| aaaagcccag | acctggtctc | cttcgttcag | acgctttgca | agggcttatc | ccaacccacc | 540 |
| accaacctgg | ttgcgggctg | cctgcaactc | aatcctcgga | cttttctgcc | tgagcagaac | 600 |
| caggacatgc | cccccacct | gccgacggcc | agcgcttcct | tccctgtaca | cccctactcc | 660 |
| taccagtcgc | ctgggctgcc | cagtccgcct | tacggtacca | tggacagctc | ccatgtcttc | 720 |
| cacgttaagc | ctccgccgca | cgcctacagc | gcagcgctgg | agcccttctt | tgaaagccct | 780 |
| ctgactgatt | gcaccagccc | ttcctttgat | ggacccctca | gcccgccgct | cagcatcaat | 840 |

| | |
|---|---|
| ggcaacttct ctttcaaaca cgaaccgtcc gccgagtttg agaaaaatta tgcctttacc | 900 |
| atgcactatc ctgcagcgac actggcaggg gcccaaagcc acggatcaat cttctcaggc | 960 |
| accgctgccc ctcgctgcga gatccccata gacaatatta tgtccttcga tagccattca | 1020 |
| catcatgagc gagtcatgag tgcccagctc aatgccatat ttcatgatct cgagggtaag | 1080 |
| cctatcccta accctctcct cggtctcgat tctacgtaat ga | 1122 |

<210> SEQ ID NO 12
<211> LENGTH: 891
<212> TYPE: DNA
<213> ORGANISM: Homo sapiens

<400> SEQUENCE: 12

| | |
|---|---|
| atgatgtctt atcttaagca accgccttac gcagtcaatg ggctgagtct gaccacttcg | 60 |
| ggtatggact tgctgcaccc ctccgtgggc tacccggggc cctgggcttc ttgtcccgca | 120 |
| gccaccccc ggaaacagcg ccgggagagg acgacgttca ctcgggcgca gctagatgtg | 180 |
| ctggaagcac tgtttgccaa gacccggtac ccagacatct tcatgcgaga ggaggtggca | 240 |
| ctgaaaatca acttgcccga gtcgagggtg caggtatggt ttaagaatcg aagagctaag | 300 |
| tgccgccaac aacagcaaca acagcagaat ggaggtcaaa acaaagtgag acctgccaaa | 360 |
| aagaagacat ctccagctcg ggaagtgagt tcagagagtg gaacaagtgg ccaattcact | 420 |
| cccccctcta gcacctcagt cccgaccatt gccagcagca gtgctcctgt gtctatctgg | 480 |
| agcccagctt ccatctcccc actgtcagat cccttgtcca cctcctcttc ctgcatgcag | 540 |
| aggtcctatc ccatgaccta tactcaggct tcaggttata gtcaaggata tgctggctca | 600 |
| acttcctact ttgggggcat ggactgtgga tcatatttga cccctatgca tcaccagctt | 660 |
| cccggaccag gggccacact cagtcccatg ggtaccaatg cagtcaccag ccatctcaat | 720 |
| cagtccccag cttctctttc cacccaggga tatggagctt caagcttggg ttttaactca | 780 |
| accactgatt gcttggatta taaggaccaa actgcctcct ggaagcttaa cttcaatgct | 840 |
| gactgcttgg attataaaga tcagacatcc tcgtggaaat tccaggtttt g | 891 |

<210> SEQ ID NO 13
<211> LENGTH: 945
<212> TYPE: DNA
<213> ORGANISM: Homo sapiens

<400> SEQUENCE: 13

| | |
|---|---|
| atgatgtctt atcttaagca accgccttac gcagtcaatg ggctgagtct gaccacttcg | 60 |
| ggtatggact tgctgcaccc ctccgtgggc tacccggggc cctgggcttc ttgtcccgca | 120 |
| gccaccccc ggaaacagcg ccgggagagg acgacgttca ctcgggcgca gctagatgtg | 180 |
| ctggaagcac tgtttgccaa gacccggtac ccagacatct tcatgcgaga ggaggtggca | 240 |
| ctgaaaatca acttgcccga gtcgagggtg caggtatggt ttaagaatcg aagagctaag | 300 |
| tgccgccaac aacagcaaca acagcagaat ggaggtcaaa acaaagtgag acctgccaaa | 360 |
| aagaagacat ctccagctcg ggaagtgagt tcagagagtg gaacaagtgg ccaattcact | 420 |
| cccccctcta gcacctcagt cccgaccatt gccagcagca gtgctcctgt gtctatctgg | 480 |
| agcccagctt ccatctcccc actgtcagat cccttgtcca cctcctcttc ctgcatgcag | 540 |
| aggtcctatc ccatgaccta tactcaggct tcaggttata gtcaaggata tgctggctca | 600 |
| acttcctact ttgggggcat ggactgtgga tcatatttga cccctatgca tcaccagctt | 660 |
| cccggaccag gggccacact cagtcccatg ggtaccaatg cagtcaccag ccatctcaat | 720 |

```
cagtccccag cttctctttc cacccaggga tatggagctt caagcttggg ttttaactca    780
accactgatt gcttggatta taaggaccaa actgcctcct ggaagcttaa cttcaatgct    840
gactgcttgg attataaaga tcagacatcc tcgtggaaat tccaggtttt gctcgagggt    900
aagcctatcc ctaaccctct cctcggtctc gattctacgt aatga                   945
```

INDUCED PHOTORECEPTOR CELLS AND METHODS FOR THEIR PRODUCTION

The invention relates to a method for producing induced photoreceptor cells from an initial cell, the method comprising providing one or more transcription factors (TFs) comprising at least GON4L to the initial cell. In preferred embodiments of the invention, the initial cell is a human induced pluripotent stem cell (iPSC). In other embodiments the method comprises providing the TFs OTX2 and/or NEUROD1 to the initial cell. The invention further relates to the cells produced and obtainable by the method of the invention, the use of these cells as a medicament in the treatment of retinopathy, vectors for inducing the photoreceptor cells of the present invention and combinations of transcription factors intended for this use.

BACKGROUND OF THE INVENTION

The use of pluripotent stem cells in regenerative therapy for the treatment of retinal diseases has been discussed in the literature and several approaches for achieving this goal have been suggested (Oswald and Baranov, 2018 "Regenerative medicine in the retina: from stem cells to cell replacement therapy", Ther Adv Ophthalmol.; Weed and Mills, 2017 "Strategies for retinal cell generation from human pluripotent stem cells", Stem Cell Investig.). Different methods for the production of photoreceptor cells have emerged. One method promotes the differentiation of photoreceptors from human embryonic stem cells by the addition of growth factors, inhibitors or low-molecular compounds (Zhou et al., 2015 "Differentiation of human embryonic stem cells into cone photoreceptors through simultaneous inhibition of BMP, TGF β and Wnt signaling" Development 2015 Oct. 1; 142(19):3294-306). In another approach, retinal progenitors such as photoreceptor precursor cells are differentiated from mouse iPSCs (Xie et al. PLOS ONE, vol. 9, no. 11, 2014-11-17, page e112175) using manipulation of the Wnt and TGF-beta/BMP signaling pathways by using specific inhibitory molecules.

Furthermore, direct cell conversion from somatic cells (1, 2) or stem cells (via 3D organoids) (3-6) has been suggested. Direct conversion from somatic cells uses transcription factor (TF) overexpression in human fibroblasts and yields photoreceptor-like cells in extremely low quantity. For example, Seko et al. (GENES TO CELLS, vol. 19, no. 3, 2014-01-24, pages 198-208) have derived human photoreceptor cells from fibroblasts by defined combinations of the TF CRX, RAX, OTX2 and NEURD. An alternative approach is to generate human retinal organoids out of human iPSCs that will be dissociated after >100 days in culture, resulting in about 10% photoreceptors that need to be extensively purified.

Photoreceptors need to be enriched from 2D (direct conversion from fibroblasts) or 3D organoids, which is technically challenging as all dissociation and purification protocols are stressful for the cells and depend on specific markers for fluorescence-activated-cell-sorting (FACS) or magnetic-activated-cell-sorting (MACS) (7). Furthermore, human fibroblasts proliferation time is longer compared to human iPSCs, which is important for the amount of starting cell population. 3D retinal organoids need to be cultured for >100 days before photoreceptors can be harvested, which easily results in batch effects reducing the final quality. Longer incubation times and complicated down-stream processing further increase the costs of a medical product for cell transplantation.

Due to extensive studies of in vivo retinogenesis, many TFs important for photoreceptor development are known and applied to human fibroblasts; however, they are insufficient to drive photoreceptor differentiation from human iPSCs or other pluripotent cells, as human iPSCs and photoreceptor progenitor cells differ in their cellular ground state and the knowledge from fibroblast transdifferentiation protocols cannot be applied to other initial cells, especially not iPSC.

In order to transplant human photoreceptors into patient retinas for treating blindness diseases, one needs an efficient protocol to derive human photoreceptors in high quantity and quality from human induced pluripotent stem cells (iPSCs). Therefore, a fast, efficient, easy-to-adapt, homogeneous and controllable differentiation protocol needs to be developed to provide human photoreceptors in cell therapy quality.

In light of the prior art there remains a significant need in the art for a fast, efficient and homogeneous differentiation protocol for generating induced photoreceptors from initial cells, such as human iPSC, that provides the cellular quantity and quality of induced photoreceptors for cell transplantation therapies to replace damaged or degenerated photoreceptors.

SUMMARY OF THE INVENTION

In light of the prior art the technical problem underlying the present invention is to provide alternative or improved methods for producing induced photoreceptor cells. Another object of the invention is the provision of alternative or improved therapeutic agents for treating medical conditions associated with damaged or degenerated photoreceptors. In addressing these objectives, the present invention seeks to avoid the disadvantages of the prior art.

This problem is solved by the features of the independent claims. Preferred embodiments of the present invention are provided by the dependent claims.

The invention therefore relates to a method for producing induced photoreceptor cells from an initial cell, the method comprising providing one or more transcription factors (TFs) comprising at least GON4L to the initial cell.

It was entirely surprising that the transcription factor GON4L, which has never been described in the context of photoreceptor differentiation, is an effective factor for induction of a photoreceptor phenotype in an initial cell to be reprogrammed into a photoreceptor-like cell. It was only possible to identify this completely unexpected TF by performing an unbiased library screening comprising the practically all human TFs. Surprisingly, it was not sufficient to use TFs that were already known to be involved in photoreceptor development to induce differentiation of an initial cell into a photoreceptor-like cell or photoreceptor progenitor cell, but GON4L was required to achieve this. Importantly, the method of the invention enables fast and efficient induction of a photoreceptor phenotype in the initial cells resulting in a relatively homogenous cellular population, which can be optionally further purified by isolating the induced photoreceptor cells.

In contrast to known 2D cell culture protocols for generating photoreceptor cells from an initial cell, the method of the invention is fast and can be applied to different cell types, including proliferating cells such as iPSC. Provision of the TF GON4L and potentially further TF can occur in a step-wise manner. For example, it is possible to deliver one or more exogenous nucleic acids encoding the required transcription factors to the initial cell without inducing expression of the factors from the exogenous nucleic acid. Subsequently, the initial cells can be expanded for several rounds of replication before inducing expression of the factors from the nucleic acid, which corresponds to the provision of the TFs, so that the initial cells can be massively expanded before inducing photoreceptor differentiation, enabling the generation of large amounts of induced photoreceptor cells form only few initial cells. This represents an important advantage over known 2D differentiation protocols using for example for slowly dividing fibroblasts as an initial cell.

Furthermore, cells displaying a phenotype resembling photoreceptor precursors can be identified in the culture systems very early on after provision of GON4L and potentially further transcription factors. Such early precursor cells as well as cells corresponding more differentiated or mature photoreceptor development stage can be easily isolated by means described herein and known in the art for downstream applications of the cells.

The provision of GON4L, potentially in combination with other TFs, in particular OTX2 and NEUROD1, and/or other factors, represents a novel method for inducing a photoreceptor phenotype in a starting cell in culture.

Without being limited by theory, the use of GON4L for inducing a photoreceptor phenotype is considered necessary to prime the initial cells for photoreceptor differentiation.

It was entirely surprising that provision of GON4L is sufficient for inducing a photoreceptor phenotype in an initial cell, in particular when using iPSC as an initial cell. As is evident form the enclosed examples, GON4L is the only TF required for inducing expression of reporter genes under the control of photoreceptor-specific promoters, although the combined expression of GON4L with other TFs is preferred.

According to the present invention, GON4L expression appears necessary for achieving the technical effect of inducing photoreceptor cells from an initial cell, preferably combined with the expression of another TF for inducing a photoreceptor phenotype, more preferably via the combined expression of GON4L, with OTX2 and/or NEUROD1 (see FIGS. 5 and 6).

A major advantage of the method of the invention is that induced photoreceptor cells can be produced in high purity, which simplifies further downstream processing for purification and enrichment of the cells to a homogenous population.

In embodiments of the invention, the initial cell is a pluripotent or multipotent mammalian cell that is differentiated to the induced photoreceptor cells via providing the one or more transcription factors (TFs) comprising at least GON4L to the initial cell.

Preferably, the initial cell is an induced pluripotent stem cell (iPSC).

It is particularly advantageous to use iPSC as an initial cell for the method of the invention since these cells can be easily expanded due to their proliferative capacity. Accordingly, in embodiments where one or more TFs are provided through expression from one or more nucleic acids in an inducible fashion, it is possible to expand the iPSC after delivery of the nucleic acid, but before induction of TF expression from the nucleic acid. Therefore, it is possible to induce a high number of photoreceptor cells from only a few initial cells. This advantage holds true also for other proliferating or expandable cells that may serve as an initial cell. Furthermore, it is possible to generate iPSC from an individual patient as initial cells for the method of the present invention. Such personal cells can be used as a medicament in the treatment of the same patient after induction of the photoreceptor phenotype by means of the present invention. Accordingly, it is possible to generate patient specific induced photoreceptor cells in high quantities from only a few isolated patient specific cells.

In preferred embodiments of the invention the initial cell is of human origin.

The human origin of the initial cell is particularly advantages since the induced photoreceptor cells generated from such cells will also be human, which is preferable for therapeutic and research applications of the photoreceptor cells of the invention. If the induced photoreceptors are of human origin they can be used for transplantation into patients in need of such cells, for example patients suffering from retinal degeneration or other eye diseases. Furthermore, for the use of the cells of the invention for research and development purposes, for example in drug screening and development, it is a great advantage to use human cells.

In certain embodiments, the initial cell is a fibroblast. Fibroblasts are advantageous initial cells since they are easily accessible from a donor and are easy to culture. Accordingly, it may be possible to generate a high number of fibroblasts from a patient that can be immediately applied as initial cells in the method of the invention leading to fast generation of induced photoreceptor cells after isolation of the cells from the patient. Further preferred initial cells can be bone marrow derived cells, such as hematopoietic stem cells, proliferating precursor cells present in the bone marrow, leukocytes, lymphocytes.

In further embodiments, other somatic or precursor cells may be used as an initial cell. A skilled person is able to select suitable initial cells in view of general knowledge and the state of the art. It has been described that specific cellular phenotypes of differentiated cells can be induced either from stem cells, such as iPSC, or from other initial cells, such as fibroblasts or other somatic cells that may be fully differentiated or still have a differentiation potential. From such studies, a skilled person can conclude that TF that can promote induction of a certain phenotype in a iPSC as an initial cell are also useful for inducing such a specific phenotype in a different cell type used as an initial cell.

The induction of human neuronal cells by defined transcription factor expression has been described previously, whereby somatic cell nuclear transfer, cell fusion, or expression of lineage-specific factors have been shown to induce cell-fate changes in diverse somatic cell types (Pang et al, Nature. 2011 May 26; 476(7359):220-3). For example, forced expression of a different combination of three transcription factors (Brn2, Ascl1 and Myt1l) can efficiently convert mouse fibroblasts and pluripotent cells into functional induced neuronal (iN) cells.

Accordingly, the use of iPSC as an initial cell type in the context of the present invention is a preferred embodiment, but a skilled person would not expect that the use of iPSC as an initial cell is an essential feature of the invention. On the contrary, the fact that GON4L can induce a photoreceptor cell phenotype in iPSC indicates that GON4L can also promote the induction of a photoreceptor phenotype in other initial cell types.

In one embodiment, the initial cell is not an embryonic stem cell or other cell obtained from an embryo.

In embodiments of the invention the induced photoreceptor cell is a cone.

In further embodiments the induced photoreceptor cell is a rod.

In some embodiments, the induced photoreceptor cell is a photosensitive retinal ganglion cell.

It is a great advantage of the method of the invention that by modifying the culture condition of provision of factor combination it is possible to enable directed generation of rods, cones or photosensitive retinal ganglion cells from the initial cells. This is particularly advantageous for using the induced photoreceptor cells in downstream applications that are specific to a certain photoreceptor subtype.

In embodiments of the invention, the method comprises providing one or more TFs selected from CRX, NEUROD1, NR2E1, NR2E3, NRL1, OTX2, ONECUT1, PAX6, RAX, RORB, RXRG, SIX3, SIX6, SOX2, THRB and VSX2 to the initial cell.

In embodiments of the invention, two or more TF comprising GON4L are provided to an initial cell. In another embodiment, three or more TF comprising GON4L are provided to an initial cell. In embodiments of the invention, two or more TF comprising GON4L and one or more TFs selected from the group consisting of CRX, NEUROD1, NR2E1, NR2E3, NRL1, OTX2, ONECUT1, PAX6, RAX, RORB, RXRG, SIX3, SIX6, SOX2, THRB and VSX2 are provided to the initial cell.

It was entirely surprising that the provision of GON4L together with at least another, preferably two additional TF was effective in inducing a photoreceptor phenotype in an initial cell, such as an iPSC. The enclosed examples demonstrate that GON4L in combination with SIX6, NEUROD1 or OTX2, obtained the desired effect. In one embodiment, the invention comprises providing GON4L and OTX2 to an initial cell, such as preferably an iPSC. In one embodiment, the invention comprises providing GON4L and SIX6 to an initial cell, such as preferably an iPSC. In one embodiment, the invention comprises providing GON4L and NEUROD1 to an initial cell, such as preferably an iPSC.

These TFs have been identified to facilitate photoreceptor development from an initial cell when provided in combination with GON4L and to more efficiently induce a photoreceptor phenotype in the initial cell.

In preferred embodiments, the method of the invention comprises providing the TFs OTX2 and/or NEUROD1 to the initial cell.

Surprisingly, it was found out that expression of either OTX2 or NEUROD1, and in particular both TFs, improved the differentiation capacity of an initial cell to an induced photoreceptor when provided in combination with GON4L.

In one embodiment, the combination GON4L, OTX2 and NEUROD1 is provided to the initial cell. In one embodiment, the invention comprises providing GON4L, OTX2 and NEUROD1 to an iPSC as the initial cell. In some embodiments, TFs are provided at about the same time for induction of a photoreceptor phenotype in the initial cell in the context of the method of the invention. In further embodiments, the TFs may be provided sequentially. For example, GON4L may be provided several minutes, hours or days before a second TF, such as OTX2 and/or NEUROD1. A third TF may be provided at the same time as the first or second TF or at a later time point. In embodiments of the invention GON4L is provided after at least one other TF, such as OTX2 and/or NEUROD1. This sequential provision also holds true for further TFs or other factors such as micro-RNAs that may be provided to the initial cell in the context of the method of the invention.

In embodiments of the invention OTX2, NEUROD1 and GON4L are provided to the initial cell at essentially the same time or sequentially.

The order of provision can be (i) GON4L, (ii) OTX2 and (iii) NEUROD1 or (i) GON4L, (ii) NEUROD1 and (iii) OTX2. Furthermore, the order can be (i) OTX2, (ii) NEUROD1 and (iii) GON4L or (i) OTX2, (ii) GON4L and (iii) NEUROD1. Also, the order can be (i) NEUROD1, (ii) GON4L and (iii) OTX2 or (i) NEUROD1, (ii) OTX2 and (iii) GON4L.

Also, one of the factors may be provided first before the two other factors are provided at about the same time, for example GON4L before OTX2 and NEURD1, or OTX2 before GON4L and NEUROD1, or NEUROD1 before GON4L and OTX2.

The time frame between provision of a first, second, third and/or further TF or other factor that may be provided in the context of the method of the invention may be in the range of about 10, 15, 20, 25, 30, 40, 50 and/or 60 minutes. It may also be in the range of about 1, 1.5, 2, 3, 4, 5, 6, 7, 8, 9, 10, 11, 12, 13, 14, 15, 16, 17, 18, 19, 20, 21, 22, 23 and/or 24 hours. In embodiments the time frame between provision of TFs and/or other factors in the context of the method of the invention may be 1, 2, 3, 4, 5, 6, 7, 8, 9, 10, 11, 12, 13, 14, 15, 16, 17, 18, 19 and/or 20 days.

In embodiments of the invention, the method comprises the provision of micro-RNAs to the initial cell, preferably, miR-182 and/or miR-183.

In further embodiments, the one or more TFs and/or one or more micro-RNA, such as miR-182 and/or miR-183, are expressed from one or more exogenous nucleic acid molecules within the initial cell, wherein expression form the external nucleic acid results preferably in a level greater than present in the initial cell, for example a human iPSC.

In another embodiment of the invention, the initial cell is provided with one or more TFs and potentially other factors, such as miR-182 and/or miR-183 for at least 4 days, preferably about 7 to 10 days. In embodiments, provision with the one or more TFs and potentially other factors for only about 1 day is sufficient to induce a reprogramming of the initial cell to an induced photoreceptor cell, even if the photoreceptor phenotype may only occur after a further time frame.

Provision of GON4L and potentially the other factors, such as OTX2 and NEUROD1, for only a short initial time, such as one day, can be sufficient to induce a transdifferentiation program in the initial cell to develop into an induced photoreceptor cell, even if the initial external provision of the one or more TFs only occurred for a short period of time, such as 1 day. In embodiments of the invention, the initial cell is provided with one or more TFs and potentially other factors, such as miR-182 and/or miR-183 for at least about 0.25, 0.5, 0.75, 1.5, 2, 2.5, 3, 3.5, 4, 5, 6, 7, 8, 9, 10, 11, 12, 13, 14, 15, 16, 17, 18, 19, 20 days. Different factors provided during performing the method of the invention can be provided for different time periods and can be provided sequentially.

In embodiments of the invention, the one or more TFs and potentially micro-RNAs, such as miR-182 and/or miR-183, are expressed in the initial cell from one or more viral vectors, preferably lentiviral vectors.

In further embodiments, the one or more TFs and potentially micro-RNAs, such as miR-182 and/or miR-183, are provided by microinjection, transfection, electroporation of the factors and/or exogenous nucleic acid molecules for expression of the factors, for example transfection or electroporation of mRNA molecules.

In embodiments, the one or more TFs and potentially micro-RNAs, such as miR-182 and/or miR-183, are provided by a PiggyBac (PB) transposon system or other transposon systems. Such transposon systems are advantageous since they represent in safe method of factor delivery to an initial cell since the genetic elements can be removed from the cells after transient expression of for example the one or more TFs.

In preferred embodiments, the one or more TFs and potentially micro-RNAs, such as miR-182 and/or miR-183, are expressed transiently and/or expression is induced in the initial cell.

Embodiments with transient and/or induced provision or expression of the factors are particularly advantageous since after transient and/or induced expression or provision of the factors and induction of a differentiation program leading to differentiation of an induced photoreceptor cell or generation of an induced photoreceptor cell the external provision of the factors can be ended and the photoreceptor phenotype of the cells can be maintained by the expression endogenous factors and/or factors provided by the cellular environment. After withdrawal of the provided factors from the induced photoreceptor cells, these cells may behave more physiologically, since there is no forced external provision of factors. Therefore, the cells may resemble more to naturally occurring photoreceptor cells after withdrawal of the factors.

In embodiments of the invention, inducible expression is mediated by tetracycline-dependent transcriptional control. Expression of the one or more TFs and potentially micro-RNAs, such as miR-182 and/or miR-183, by means of tetracycline-controlled transcriptional activation is advantageous since tetracycline or one of its derivatives, e.g. doxycycline, can be easily provided to and also be withdrawn from the initial cell for controlling expression of TF from an exogenous nucleic acid molecule.

In further embodiments, the method of the invention comprises administering a cell cycle inhibitor to the initial cell, preferably AraC. Inhibitors, such as cell cycle inhibitors, are considered factors that can be provided to the cells during the method of the invention. Such inhibitors may be simply added to the cell culture medium during the method of the invention at a certain time point. For such inhibitors, the same time frames and criteria of for example sequential provision and time frames of provision apply as outlined above for transcription factors and potentially micro-RNAs. The use of cell cycle inhibitors during the method of the invention can be particularly advantageous when provided after one or more TF that initiates a reprogramming of the initial cell.

In embodiments, the cell cycle inhibitor is administered after providing the one or more TFs to the initial cell, preferably 5 days after providing the one or more TFs. In embodiments, the cell cycle inhibitor is administered to the initial cell 0.25, 0.5, 0.75, 1.5, 2, 2.5, 3, 3.5, 4, 5, 6, 7, 8, 9, 10, 11, 12, 13, 14, 15, 16, 17, 18, 19 or 20 days after providing the one or more TFs.

In embodiments of the method of the invention, the initial cells are cultivated on a basement membrane-like matrix, such as for example Matrigel or another gelatinous protein mixtures, such as specific collagen or laminin molecules that support development or maintenance of photoreceptor cells, such as poly-L-Lysine and poly-D-Lysine.

In some embodiments, the method comprises co-cultivation of the initial cells with retinal pigment epithelial cells (RPE-cells). Such embodiments of the invention are particularly advantageous since RPE-cells provide a cellular environment that promotes differentiation of the initial cells to induced photoreceptor cells.

Embodiments Relating to the Detection of Induced Photoreceptors

In embodiments of the method of the invention, an induced photoreceptor cell produced from the initial cell is determined by a photoreceptor reporter system present in the initial cell, said reporter system preferably comprising one or more photoreceptor-specific promoter sequences, such as sequences from the arrestin- and/or rhodopsin-promoter, and one or more reporter genes and/or selection markers, such as a fluorescent protein gene.

The use of a photoreceptor reporter system in the context of the present invention is advantageous since it indicates the occurrence of a photoreceptor-phenotype in the initial cell and therefore can provide guidance as to whether and which of the induced cells can be used for downstream applications. Furthermore, the use of fluorescent reporter genes, such as GFP, RFP, dsRed and so on allows the detection of a photoreceptor phenotype by different methodologies, including microscopy and flow cytometry. The use of several different promoter sequence with different specificities further allows a specification of the phenotype, for example simultaneous use of cone- and rod-specific promoter sequences with different reporter genes, such as genes encoding for fluorescent proteins of different color, allows detection and subsequent isolation of rod-like and cone-like cells in a mixed culture of the method of the invention. For example, the rhodopsin is a rod-specific protein and therefore activity of the rhodopsin-promoter indicates development of a rod-like phenotype. In contrast, certain arrestin proteins, such as arrestin-3, are cone specific and their promoter can be used in the context of the invention to monitor cone-development. Furthermore, selection markers such as genes that render cells resistant to certain toxic chemicals such as antibiotics can be expressed under the control of a photoreceptor-specific promoter to select induced photoreceptors from a mixed cell culture.

In embodiments of the invention the induced photoreceptor cells are isolated from the cell culture that may comprise uninduced initial cells or other cells than induced photoreceptors. The isolation of induced photoreceptors can occur through use of marker genes or proteins such as fluorescent proteins, for example through fluorescence activated cell sorting. Also, isolation of induced photoreceptor cells may occur through magnetic cell separation FACS-sorting, for example on the basis of surface marker expression. Furthermore, isolation can occur through expression selection markers making the cells resistant to chemical compounds, so that all non-induced cells disappear from the culture. A skilled person is able to use further techniques known in the art to separate induced photoreceptor cells from a cell culture system comprising further cell types.

In further embodiments of the invention, it may be useful to generate monoclonal or clonal cell lines from the induced photoreceptor cells.

In embodiments of the invention, generation of an induced photoreceptor cell is determined by expression of genes or proteins that are specifically expressed in photoreceptor cells, but not in the initial cells of the method of the invention. In some embodiments, the marker molecules described below are expressed in greater amounts in induced photoreceptors compared to the initial cell, such as iPSC. In embodiments of the invention, generation of an induced photoreceptor cell is determined by expression of endogenous recoverin, NCAM, OTX, CRX, RCVRN, RHO, OPN1SW and/or OPN1LW. Detection of expression can occur on a protein or mRNA level, for example by qPCR, antibody-mediated detection methods and other well-established techniques known to the person skilled in the art.

In embodiments, generation of an induced photoreceptor cell is determined through formation of neurite outgrowth in an in vitro assay. Neurite outgrowth are an indicator of a neuronal phenotype, which indicates the induction of neuroepithelial photoreceptors.

In embodiments, the initial cell is an iPSC and generating an induced photoreceptor cell is determined through loss of Tra1-60 expression. Tra1-60 is a iPSC marker that disappears from the initial cells upon induction of a photoreceptor phenotype.

Embodiments Relating to the Induced Photoreceptor Cells

The present invention further relates to an induced photoreceptor cell produced by the method of the present invention.

Furthermore, the invention relates to an induced photoreceptor cell obtainable by the method of the present invention. Accordingly, the invention relates to all kinds of induced photoreceptor cells that display an identical phenotype as the cells generated by the method of the invention, such as a specific gene expression signature, combination of surface markers, cellular shape and/or cellular function, which is different form naturally occurring photoreceptor cells and induced photoreceptor cells generated through methods of the state of the art.

The cells that are generated by the method of the present invention may not necessarily be best described by structural features, because for example the method of the invention can be performed by using different means of providing the TF of the present invention. For example, the TF may be provided by means of exogenous nucleic acids. However, these nucleic acids may disappear (be transient) from the cells later on. Accordingly, the cells cannot necessarily be defined by the presence of an exogenous nucleic acid. Similarly, in the context of the method of the invention, after provision of the TF, the cells can initiate expression of the endogenous TF, so that after a certain period it may not be possible to detect exogenous TF anymore, while the cells maintain the induced photoreceptor phenotype by expression of endogenous factors. However, a skilled person is able to analyze the cells of the present invention generated by the method of the invention, for example by analysis of their global expression profile, in order to distinguish them from physiologically occurring photoreceptor cells.

In some embodiment, the methods described herein induce photoreceptor cells that display the features of the induced photoreceptors described in the examples. The present invention further relates to the induced photoreceptor cells described in the examples disclosed herein. The cells of the present invention express at least one of the photoreceptor markers measured in the examples, including NCAM, OTX2, CRX, RCVRN, RHO, mCAR, OPN1SW and OPN1LW. In some embodiments, the induced photoreceptors of the invention do not express SOX2 or OCT4. In this context, in some embodiments, the expression of the respective factors may be judged by comparing the expression in the cells of the invention to the expression level of the respective factors in iPSC. For example, in some embodiments, lack of OCT4 or SOX2 can relate to an expression level that is about 10% or less than the expression in iPSC. On the contrary, in some embodiments, expression of the photoreceptor markers in the cells of the invention can be about 10 times higher than in iPSC.

The invention further relates to induced photoreceptor cells comprising at least one exogenous nucleic acid molecule comprising a sequence encoding GON4L, preferably under the control of a suitable regulatory nucleic acid sequence, such as a constitutive or inducible promoter or promoter/enhancer combination. The cells of the present invention may be generated using a kit of the invention as disclosed herein. In general, the features disclosed in the context of a method or kit of the invention also relate to and are herewith disclosed in the context of the cells of the present invention and vice versa.

The cells of the invention can be used for research and development purposes, for example for identifying, testing and screening of potential drugs affecting or acting on photoreceptor cells.

In addition, the invention relates to the cells of the invention for use as a medicament in the treatment of retinopathy, such as retinal degeneration. The cells can be transplanted to the retina of affected patients. The transplanted cells of the invention may be at different differentiation stages. For example, the induced photoreceptor cells may be at a photoreceptor precursor stage at the time point of transplantation and develop into mature photoreceptors after transplantation into the retina. Alternatively, or in addition, more mature or mature induced photoreceptor cells may be transplanted; however, this may depend on the individual patient needs and conditions.

It is a great advantage of the method of the invention that it enables provision of patient specific induced photoreceptor cells that may be used as a medicament in the treatment of the patient. Furthermore, through use of HLA-matched iPSC from iPSC banks enables provision of suitable induced photoreceptor cells generated from matching iPSC to a patient. This is particularly advantageous if the condition leading to the necessity of induced photoreceptor cell transplantation or treatment is genetic, because it is possible to provide matching photoreceptor cells without relying of the patients own cell donation, which may require correction of the genetic cause leading to the disease necessitating photoreceptor transplantation.

Further Embodiments of the Invention

The present invention also relates to a kit for producing induced photoreceptor cells from an initial cell according to the method disclosed herein. A kit of the invention comprises a. a vector system for providing GON4L, and optionally further TFs, preferably OTX2 and/or NEUROD1, and optionally miR-182 and/or miR-183 to the initial cell,
b. reagents for detecting induced photoreceptor cells generated from an initial cell, such as
i. a photoreceptor-specific reporter system,
ii. antibodies for detection of photoreceptor marker proteins, e.g. OPN1SW, OPN1 LW, recoverin and/or NCAM, and/or
iii. primers for detection of OTX, CRX, RCVRN, RHO, OPN1SW, OPN1MW and/or OPN1 LW mRNA by PCR, and
c. optionally a cell cycle inhibitor, preferably AraC.

Furthermore, the invention relates to an expression vector system comprising one or more nucleic acid sequences operably coupled to one or more promoters, wherein said sequences encode one or more transcription factors (TFs) comprising at least GON4L, OTX2 and NEUROD1, and optionally miR-182 and/or miR-183. Preferred embodiments of vectors are provided below.

The present invention also relates to a transcription factor combination comprising at least GON4L, OTX2 and NEUROD1. The combination may relate to a combination of TFs in protein form, a combination of TF encoding nucleic acids, the combination of TF encoding nucleic acids in a vector or other expressible format, or the combination of these TFs above levels of the initial cell, such as the iPSC, in a modified cell.

DETAILED DESCRIPTION OF THE INVENTION

All cited documents of the patent and non-patent literature are hereby incorporated by reference in their entirety.

The present invention is directed to a method for producing induced photoreceptor cells from an initial cell, the method comprising providing one or more transcription factors (TFs) comprising at least GON4L to the initial cell.

In the context of the invention the term induced photoreceptor cell relates to a cell with a phenotype resembling to a naturally occurring photoreceptor cell or a progenitor of such a photoreceptor cell, wherein the induced photoreceptor cell has developed or differentiated from an initial cell that is not a photoreceptor cell. An induced photoreceptor cell displays characteristics of photoreceptor cells and progenitors of photoreceptor cells such as expression of one or more genes and proteins that are specific to photoreceptor and their progenitors, at least in combination with each other, and/or display a photoreceptor-like morphology including neurite outgrowths. Such markers include without limitation recoverin (RCVRN), rhodopsin, cone-arrestin (arrestin-4), arrestin-1, NCAM, CRX, NEUROD1, NR2E1, NR2E3, NRL1, OTX2, ONECUT1, PAX6, RAX, RORB, RXRG, SIX3, SIX6, SOX2, THRB, VSX2, OTX, RHO, OPN1SW, OPN1 MW and/or OPN1 LW. Expression of such markers may exist to some extent in other cell types; however, such markers may be well known for being involved in photoreceptor differentiation. Furthermore, the development or induction of a photoreceptor cell from an initial cell may be monitored or detected by the absence of a marker of the initial cell. The absolute absence of such a repressed marker of the initial cell is not required for "repression" according to the present invention. It is possible that low levels remain present in the cell. Repression of markers of the initial cell may be characterised as reduced levels of expression compared to the initial cell. Reduced levels compared to an appropriate control may be used for determining "repression". Similarly, "activation" of gene expression of photoreceptor-specific genes can be determined by comparison to an appropriate control, such as the respective initial cell. Induced photoreceptors are characterized by their transcriptional profiles, which can be derived from a bulk population or from single cell RNA sequencing analysis. Such profiles can be used to differentiate induced photoreceptor cell of the present invention from naturally occurring photoreceptor cells.

Photoreceptor cells are a specialized type of neuroepithelial cell found in the retina that is capable of visual phototransduction. Photoreceptors convert light (visible electromagnetic radiation) into signals that can stimulate biological processes. Photoreceptor proteins in these cells absorb photons, triggering a change in the cell's membrane potential. Mammalian photoreceptor cells include rods, cones, and photosensitive retinal ganglion cells. The two classic photoreceptor cells are rods and cones. The rods are narrower than the cones and distributed differently across the retina, but the chemical process in each that supports phototransduction is similar. The photosensitive ganglion cells do not contribute to sight directly but are thought to support circadian rhythms and pupillary reflex.

Rods are extremely sensitive and can be triggered by a single photon. At very low light levels, visual experience is based solely on the rod signal, so that colors cannot be seen at low light levels. Cones require significantly brighter light (i.e., a larger number of photons) in order to produce a signal. In humans, there are three different types of cone cell, distinguished by their pattern of response to different wavelengths of light. Color experience is calculated from these three distinct signals. The three types of cone cell respond (roughly) to light of short, medium, and long wavelengths. The human retina contains about 120 million rod cells, and 6 million cone cells. The number and ratio of rods to cones varies among species, dependent on whether an animal is primarily diurnal or nocturnal. In the human visual system, in addition to the photosensitive rods & cones, there are about 2.4 million to 3 million ganglion cells, with 1 to 2% of them being photosensitive. The axons of ganglion cells form the two optic nerves.

The method of the invention relates to providing one or more transcription factors. Providing a transcription factor or other factor, such as a micro-RNA, in the context of the present invention relates to provision or making available or contacting a TF with the initial cell or introducing the TF within the cell, or having the TF produced from within or in close proximity to the initial cell. The TF may be provided at the protein level or in the form of a nucleic acid encoding a TF. Accordingly, in case of delivery of an exogenous nucleic acid molecule encoding the TF, the TF is provided upon expression of the protein from the exogenous nucleic acid molecule. A TF can be provided through expression from any given nucleic acid molecule. This includes activation of expression of the respective TF from an endogenous or an exogenous nucleic acid molecule. Furthermore, the TF can be delivered to the cell directly, for example by protein transfection. Preferably, the expression of a TF occurs in amounts greater than the initial cell, e.g. iPSCs.

TF provision can occur by expression from a nucleic acid molecule, such as an exogenous nucleic acid molecule. As used herein "nucleic acid" shall mean any nucleic acid molecule, including, without limitation, DNA, RNA and hybrids or modified variants thereof. An "exogenous nucleic acid" or "exogenous genetic element" relates to any nucleic acid introduced into the cell, which is not a component of the cells "original" or "natural" genome. Exogenous nucleic acids may be integrated or non-integrated in the genetic material of the target mesenchymal stem cell or relate to stably transduced nucleic acids. Delivery of an exogenous nucleic acid may lead to genetic modification of the initial cell through permanent integration of the exogenous nucleic acid molecule in the initial cell. However, delivery of the exogenous nucleic acid may also be transient, meaning that the delivered genetic material for provision of the one or more TF disappears form the cell after a certain time.

Nucleic acid molecule delivery and potentially genetic modification of an initial cell, such as a mammalian or human cell, preferably a human iPSC, can be performed and determined by a skilled person using commonly available techniques. For example, for detecting genetic modification sequencing of the genome or parts thereof of an initial cell is possible, thereby identifying if exogenous nucleic acids are present. Alternatively, other molecular biological techniques may be applied, such as the polymerase chain reaction (PCR), to identify/amplify exogenous genetic material. Exogenous nucleic acids may be detected by vector sequences, or parts of vector sequences remaining at the site of genetic modification. In cases where vector sequences (for example vector sequences flanking a therapeutic transgene) can be removed from the genome, the addition of a therapeutic transgene may still be detected by sequencing efforts by detecting genomic sequences incorporating a therapeutic gene at a "non-natural" position in the genome.

Any given gene delivery method for delivery of nucleic acid molecules is encompassed by the invention and preferably relates to viral or non-viral vectors, as well as biological or chemical methods of transfection. The methods can yield either stable or transient gene expression in the system used. Furthermore, any method known to the person skilled in the art for delivery of proteins to a mammalian cell is encompassed by the present invention when referring to provision of one or more transcription factors and/or microRNAs or other factors. All known methods for delivery of nucleic acid molecules and proteins as well as other biological and chemical molecules that can act as factors in the context of the method of the invention are encompassed. This includes in particular microinjection, transfection, transduction, vesicle fusion and electroporation.

Genetically modified viruses have been widely applied for the delivery of genes into mammalian cells and in particular stem cells. A viral vector may be employed in the context of the present invention.

Preferred viral vectors for genetic modification of the initial cells described herein relate to retroviral vectors, in particular to gamma retroviral vectors. The gamma retrovirus (sometimes referred to as mammalian type C retroviruses) is a sister genus to the lentivirus clade, and is a member of the Orthoretrovirinae subfamily of the retrovirus family. The Murine leukemia virus (MLV or MuLV), the Feline leukemia virus (FeLV), the Xenotropic murine leukemia virus-related virus (XMRV) and the Gibbon ape leukemia virus (GALV) are members of the gamma retrovirus genus. A skilled person is aware of the techniques required for utilization of gamma retroviruses in genetic modification of MSCs. For example, the vectors described Maetzig et al (Gammaretroviral vectors: biology, technology and application, 2001, Viruses Jun; 3(6):677-713) or similar vectors may be employed. For example, the Murine Leukemia Virus (MLV), a simple gammaretrovirus, can be converted into an efficient vehicle of genetic therapeutics in the context of creating gamma retrovirus-modified MSCs and expression of a therapeutic transgene from said MSCs after delivery to a subject.

Lentiviruses are members of Retroviridae family of viruses (M. Scherr et al., Gene transfer into hematopoietic stem cells using lentiviral vectors. Curr Gene Ther. 2002 February; 2(1):45-55). Lentivirus vectors are generated by deletion of the entire viral sequence with the exception of the LTRs and cis acting packaging signals. The resultant vectors have a cloning capacity of about 8 kb. One distinguishing feature of these vectors from retroviral vectors is their ability to transduce dividing and non-dividing cells as well as terminally differentiated cells.

The invention encompasses further the administration of expression vectors to a subject in need thereof. A "vector" is any means for the transfer of a nucleic acid into a host cell. A preferred vector relates to a replicon to which another DNA segment may be attached so as to bring about the replication of the attached segment. The term "vector" as used herein specifically refers to means for introducing the nucleic acid into a cell in vitro, ex vivo or in vivo. Viral vectors include, without limitation, retrovirus, adeno-associated virus, pox, baculovirus, vaccinia, herpes simplex, Epstein-Barr and adenovirus vectors.

Adenoviruses may be applied, or RNA viruses such as Lentiviruses, or other retroviruses. Adenoviruses have been used to generate a series of vectors for gene transfer cellular engineering. The initial generation of adenovirus vectors were produced by deleting the E1 gene (required for viral replication) generating a vector with a 4kb cloning capacity. An additional deletion of E3 (responsible for host immune response) allowed an 8kb cloning capacity. Further generations have been produced encompassing E2 and/or E4 deletions.

Non-integrating viral systems, such as adeno-associated viral vectors (AAV), represent a preferred embodiment for the gene therapy approaches described herein due to a number of advantageous benefits (see Asokan et al., Molecular Therapy vol. 20 no. 4, 699-708). For example, AAV are of particular interest in gene therapy due to their very limited capacity to induce immune responses in humans, a factor which positively influences vector transduction efficiency while reducing the risk of any immune-associated pathology. The AAV genome is typically built of single-stranded deoxyribonucleic acid (ssDNA), either positive- or negative-sensed, which is about 4.7 kilobases long. The AAV genome comprises inverted terminal repeats (ITRs) at both ends of the DNA strand, and two open reading frames (ORFs): rep and cap. Development of AAVs as gene therapy vectors has eliminated the integrative capacity of the vector by removal of the rep and cap from the DNA of the vector. Any given desired gene, together with a promoter to drive transcription of the gene (for example the inventive TGIF2 as described herein), is inserted between the inverted terminal repeats (ITR) that aid concatamer formation in the nucleus after the single-stranded vector DNA is converted by host cell DNA polymerase complexes into double-stranded DNA. AAV-based gene therapy vectors typically form episomal concatamers in the host cell nucleus. In non-dividing cells, these concatemers remain intact for the life of the host cell. In dividing cells, AAV DNA is lost through cell division, since the episomal DNA is not replicated along with the host cell DNA.

As regards viruses, these are preferably previously purified (e.g., by centrifugation on a cesium chloride gradient, column chromatography, plaque purification, and the like). They may be packaged at the rate of $10^4$ to $10^{15}$ particles per ml, preferably $10^1$ to $10^{12}$.

Non-viral methods may also be employed, such as alternative strategies that include conventional plasmid transfer and the application of targeted gene integration through the use of integrase or transposase technologies. These represent approaches for vector transformation that have the advantage of being both efficient, and often site-specific in their integration. Physical methods to introduce vectors into cells are known to a skilled person. One example relates to electroporation, which relies on the use of brief, high voltage electric pulses which create transient pores in the membrane by overcoming its capacitance. One advantage of this method is that it can be utilized for both stable and transient gene expression in most cell types. Alternative methods relate to the use of liposomes or protein transduction domains. Appropriate methods are known to a skilled person and are not intended as limiting embodiments of the present invention. Furthermore, delivery of RNA molecules such as mRNA transfection is included in the context of the method of the invention for provision of a TF from an exogenous nucleic acid.

Furthermore, delivery of exogenous nucleic acid molecules for provision of a factor may be achieved by means of a transposable element. For example, the Sleeping Beauty, Tol2 and/or PiggyBac transposon system or similar systems may be used. The PiggyBac (PB) transposon is a mobile genetic element that efficiently transposes between vectors and chromosomes via a "cut and paste" mechanism. During transposition, the PB transposase recognizes transposon-specific inverted terminal repeat sequences (ITRs) located on both ends of the transposon vector and efficiently moves the contents from the original sites and efficiently integrates them into TTAA chromosomal sites. The powerful activity of the PiggyBac transposon system enables genes of interest between the two ITRs in the PB vector to be easily mobilized into target genomes. The TTAA-specific transposon PiggyBac is a highly useful transposon for genetic engineering of a wide variety of cells, including mammalian and human cells, in particular stem cells and iPSC.

Provision of the TFs and other factors used in the method of the invention may be transient or permanent. For example, if provision is achieved by expression from a nucleic acid molecule, TF expression may be permanently active under the control of a constitutive promoter or a promoter that is active in the initial cell as well as in induced photoreceptor cells. Alternatively, expression and therefore provision of the TF may be transient, either because the nucleic acid molecule that encodes the TF is removed or disappears from the cell or because expression is controllable and can be turned on and off, for example by using controlled transcriptional activation. In the context of the present invention, transient expression refers to only temporal expression of a factor from a nucleic acid molecule in contrast to permanent expression. Transient expression can be based on expression from a delivered mRNA molecule, which gets degraded over time in the cell and therefore expression only occurs as long as the delivered mRNA has not been degraded.

Transient expression can in other examples occur through induction of gene expression from an exogenous DNA molecule comprising controllable genetic elements driving expression of the encoded gene, and therefore comprises inducible gene expression. In such systems gene expression can be externally controlled, for example through administration of a compound, such as a chemical compound, for example an antibiotic molecule or drug that leads to activation of gene expression. Such systems are well described in the art and are known to the skilled person.

A gene expression system that may be used in the context of the invention is a system specifically designed for the production of a gene product of choice. This is normally a protein although may also be RNA, such as micro-RNA. An expression system consists of a gene, normally encoded by DNA, and the molecular machinery required to transcribe the DNA into mRNA and translate the mRNA into protein using the reagents provided. An expression system is therefore often artificial in some manner; however, certain parts of the machinery required for gene expression may be provided by the target cell.

For example, inducible and/or controlled gene expression can be achieved by the use of tetracycline-controlled transcriptional activation. Tetracycline-Controlled Transcriptional Activation is a method of inducible gene expression where transcription is reversibly turned on or off in the presence of the antibiotic tetracycline or one of its derivatives (e.g. doxycycline). Tetracycline-controlled gene expression is based upon the mechanism of resistance to tetracycline antibiotic treatment found in Gram-negative bacteria, where the Ptet promoter expresses TetR, the repressor, and TetA, the protein that pumps tetracycline antibiotic out of the bacterial cell. The difference between a Tet-On and Tet-Off system is not whether the transactivator turns a gene on or off, but rather, both proteins activate expression. The difference relates to their respective response to tetracycline or doxycycline (Dox, a more stable tetracycline analogue); Tet-Off activates expression in the absence of Dox, whereas Tet-On activates in the presence of Dox.

In the context of the invention the term transcription factor (TF) relates to a protein that controls the rate of transcription of genetic information from DNA to messenger RNA, by binding to a specific DNA sequence. The function of TFs is to regulate (turn on and off) genes in order to make sure that they are expressed in the right cell at the right time and in the right amount throughout the life of the cell and the organism. Groups of TFs function in a coordinated fashion to direct cell differentiation, cell division, cell growth, and cell death throughout life; cell migration and organization (body plan) during embryonic development; and intermittently in response to signals from outside the cell, such as a hormone. TFs work alone or with other proteins in a complex, by promoting (as an activator), or blocking (as a repressor) the recruitment of RNA polymerase (the enzyme that performs the transcription of genetic information from DNA to RNA) to specific genes. A defining feature of TFs is that they contain at least one DNA-binding domain (DBD), which attaches to a specific sequence of DNA adjacent to the genes that they regulate.

Transcription factors can be used for reprogramming or directed differentiation of mammalian cells to a different cell type. Induction of a different cell type in an initial cell/ staring cell can be achieved through provision of one or more TF. In the context of the present invention, the term "initial cell" relates to a cell that is used as a starting point for inducing a photoreceptor phenotype in this cell, wherein at least the TF GON4L is provided in the cell. In the context of the invention, any kind of cell, preferably a mammalian cell can be used as an initial cell. Preferably the initial cell is a human cell. A cell is the basic structural, functional, and biological unit of all known living organisms. A cell is the smallest unit of life. Cells are often called the "building blocks of life".

Preferable initial cells of the present invention are pluripotent or multipotent mammalian cells, including stem cells. Preferably the initial cell is a mammalian, preferably a human induced pluripotent stem cell (iPSC). iPSCs are a type of pluripotent stem cell that can be generated directly from adult cells. iPSC can propagate indefinitely in cell culture, as well as give rise to every other cell type in the body or the respective mammalian organism, such as the human organism, including neurons, heart cells, pancreatic cells, and liver cells, they represent a single source of cells that could be used to replace those lost to damage or disease. The most well-known type of pluripotent stem cell is the embryonic stem cell. However, since the generation of embryonic stem cells involves manipulation of the pre-implantation stage embryo, there has been much ethical controversy surrounding their use. Further, because embryonic stem cells can only be derived from embryos, it has so far not been feasible to create patient-matched embryonic stem cell lines. Since iPSCs can be derived directly from adult tissues, they not only bypass the need for embryos, but can be made in a patient-matched manner, which means that each individual could have their own pluripotent stem cell line. These unlimited supplies of autologous cells could be used to generate transplants without the risk of immune rejection. Furthermore, iPSC and iPSC derived cells can be used in personalized drug discovery efforts and understanding the patient-specific basis of disease. This also applies to the induced photoreceptor cells of the present invention that can be derived from human patient specific iPSC. iPSCs are typically derived by introducing products of specific sets of pluripotency-associated genes, or "reprogramming factors", into a given cell type. The original set of reprogramming factors are the transcription factors Oct4 (Pou5f1), Sox2, cMyc, and KIf4. While this combination is most conventional in producing iPSCs, each of the factors can be functionally replaced by related transcription factors, miRNAs, small molecules, or even non-related genes such as lineage specifiers. Such replacement of factors required for cellular reprogramming also applies to other cellular reprogramming efforts.

Further initial cells to be used in the context of the present invention are fibroblasts, retinal progenitor cell (RPCs), retinal pigment epithelium (RPE) cells, Mueller Glia cells and other cell types found in the eye or retina that are no photoreceptors in the sense of the present invention.

The method of the invention includes the provision of the TF GON4L to the initial cell. GON4L is a protein that in humans is encoded by the GON4L gene. It is a nuclear protein containing two serine phosphosites and a lysine-glutamine cross-link and is thought to be a transcription factor. Homologs of GON4L have conserved roles in cell cycle regulation and/or embryonic patterning in plants, worms, flies, mice, and fish. However, the contribution of GON4L or any other chromatin factor to morphogenesis is particularly poorly understood.

Furthermore, the present invention preferably relates to the provision of one or more TFs selected from CRX, NEUROD1, NR2E1, NR2E3, NRL1, OTX2, ONECUT1, PAX6, RAX, RORB, RXRG, SIX3, SIX6, SOX2, THRB and VSX2. These TFs have been described to be highly relevant during differentiation and development of photoreceptor cells.

OTX2 is a protein that in humans is encoded by the OTX2 gene. This gene encodes a member of the bicoid sub-family of homeodomain-containing transcription factors. The encoded protein acts as a transcription factor and may play a role in brain and sensory organ development. A similar protein in mice is required for proper forebrain development. Two transcript variants encoding distinct isoforms have been identified for this gene. Other alternative splice variants may exist, but their full-length sequences have not been determined.

NEUROD1/NeuroD1 (Neurogenic differentiation 1), also called p32, is a transcription factor of the NeuroD-type. It is encoded by the human gene NEUROD1. It is a member of the NeuroD family of basic helix-loop-helix (bHLH) transcription factors. The protein forms heterodimers with other bHLH proteins and activates transcription of genes that contain a specific DNA sequence known as the E-box. It regulates expression of the insulin gene, and mutations in this gene result in type II diabetes mellitus. NeuroD1 is found to convert reactive glial cells into functional neurons in the mouse brain in vivo.

In the context of the invention, the one or more TF may be provided at the protein level or in the form of a nucleic acid encoding a TF.

Preferred amino acid sequences of GON4L, NEUROD1 and OTX2 are listed under Table 1.

TABLE 1

| Amino acid sequences of preferred TF of the invention. | |
|---|---|
| SEQ ID NO 1:<br>Amino acid (AA) sequence<br>of human GON4L protein<br>GenBank: AAI17558.1 | MYPELLPVCSLKAKNPQDKIVFTKAEDNLLALGLKHFEGTEFPNP<br>LISKYLLTCKTAHQLTVRIKNLNMNRAPDNIIKFYKKTKQLPVLGKC<br>CEEIQPHQWKPPIEREEHRLPFWLKASLPSIQEELRHMADGARE<br>VGNMTGTTEINSDRSLEKDNLELGSESRYPLLLPKGVVLKLKPVA<br>TRFPRKAWRQKRSSVLKPLLIQPSPSLQPSFNPGKTPARSTHSE<br>APPSKMVLRIPHPIQPATVLQTVPGVPPLGVSGGESFESPAALPA<br>VPPEARTSFPLSESQTLLSSAPVPKVMLPSLAPSKFRKPYVRRRP<br>SKRRGVKASPCMKPAPVIHHPASVIFTVPATTVKIVSLGGGCNMI<br>QPVNAAVAQSPQTIPITTLLVNPTSFPCPLNQSLVASSVSPLIVSG<br>NSVNLPIPSTPEDKAHVNVDIACAVADGENAFQGLEPKLEPQELS<br>PLSATVFPKVEHSPGPPLADAECQEGLSENSACRWTVVKTEEG<br>RQALEPLPQGIQESLNNPTPGDLEEIVKMEPEEAREEISGSPERDI<br>CDDIKVEHAVELDTGAPSEELSSAGEVTKQTVLQKEEERSQPTK<br>TPSSSQEPPDEGTSGTDVNKGSSKNALSSVDPEVRLSSPPGKPE<br>DSSSVDGQSVGTPVGPETGGEKNGPEEEEEEDFDDLTQDEEDE<br>MSSASEESVLSVPELQETMEKLTWLASERRMSQEGESEEENSQ<br>EENSEPEEEEEEAEGMESLQKEDEMTDEAVGDSAEKPPTFAS<br>PETAPEVETSRTPPGESIKAAGKGRNNHRARNKRGSRARASKDT<br>SKLLLLYDEDILERDPLREQKDLAFAQAYLTRVREALQHIPGKYED<br>FLQVIYEFESSTQRRTAVDLYKSLQILLQDWPQLLKDFAAFLLPEQ<br>ALACGLFEEQQAFEKSRKFLRQLEICFAENPSHHQKIIKVLQGCA<br>DCLPQEITELKTQMWQLLKGHDHLQDEFSIFFDHLRPAASRMGD<br>FEEINWTEEKEYEFDGFEEVALPDVEEEEEPPKIPTASKNKRKKEI<br>GVQNHDKETEWPDGAKDCACSCHEGGPDSKLKKSKRRSCSHC<br>SSKVRKVSRVPRVSELLGDCLLPRIVPY |
| SEQ ID NO 2:<br>Amino acid (AA) sequence<br>of human GON4L isoform<br>A<br>GenBank: AAR01260.1 | MLPCKKRRTTVTESLQHKGNQEENNVDLESAVKPESDQVKDLS<br>SVSLSWDPSHGRVAGFEVQSLQDAGNQLGMEDTSLSSGMLTQ<br>NTNVPILEGVDVAISQGITLPSLESFHPLNIHIGKGKLHATGSKRGK<br>KMTLRPGPVTQEDRCDHLTLKEPFSGEPSEEVKEEGGKPQMNS<br>EGEIPSLPSGSQSAKPVSQPRKSTQPDVCASPQEKPLRTLFHQP<br>EEEIEDGGLFIPMEEQDNEESEKRRKKKKGTKRKRDGRGQEGTL<br>AYDLKLDDMLDRTLEDGAKQHNLTAVNVRNILHEVITNEHVVAM<br>MKAAISETEDMPMFEPKMTRSKLKEVVEKGVVIPTWNISPIKKAN<br>EIKPPQFVDIHLEEDDSSDEEYQPDDEEEDETAEESLLESDVEST<br>ASSPRGAKKSRLRQSSEMTETDEESGILSEAEKVTTPAIRHISAE<br>VVPMGPPPPPKPKQTRDSTFMEKLHAVDEELASSPVCMDSFQP<br>MDDSLIAFRTRSKMPLKDVPLGQLEAELQAPDITPDMYDPNTAD<br>DEDWKMWLGGLMNDDVGNEDEADDDDDPEYNFLEDLDEPDTE<br>DFRTDRAVRITKKEVNELMEELFETFQDEMGFSNMEDDGPEEEE<br>CVAEPRPNFNTPQALRFEEPLANLLNEQHRTVKELFEQLKMKKS<br>SAKQLQEVEKVKPQSEKVHQTLILDPAQRKRLQQQMQQHVQLLT |

TABLE 1-continued

Amino acid sequences of preferred TF of the invention.

|  |  |
|---|---|
|  | QIHLLATCNPNLNPEATTTRIFLKELGTFAQSSIALHHQYNPKFQT<br>LFQPCNLMGAMQLIEDFSTHVSIDCSPHKTVKKTANEFPCLPKQV<br>AWILATSKVFMYPELLPVCSLKAKNPQDKIVFTKAEDNLLALGLKH<br>FEGTEFPNPLISKYLLTCKTAHQLTVRIKNLNMNRAPDNIIKFYKKT<br>KQLPVLGKCCEEIQPHQWKPPIEREEHRLPFWLKASLPSIQEELR<br>HMADGAREVGNMTGTTEINSDRSLEKDNLELGSESRYPLLLPKG<br>VVLKLKPVATRFPRKAWRQKRSSVLKPLLIQPSPSLQPSFNPGKT<br>PARSTHSEAPPSKMVLRIPHPIQPATVLQTVPGVPPLGVSGGESF<br>ESPAALPAVPPEARTSFPLSESQTLLSSAPVPKVMLPSLAPSKFR<br>KPYVRRRPSKRRGVKASPCMKPAPVIHHPASVIFTVPATTVKIVS<br>LGGGCNMIQPVNAAVAQSPQTIPITTLLVNPTSFPCPLNQSLVAS<br>SVSPLIVSGNSVNLPIPSTPEDKAHVNVDIACAVADGENAFQGLE<br>PKLEPQELSPLSATVFPKVEHSPGPPLADAECQEGLSENSACRW<br>TVVKTEEGRQALEPLPQGIQESLNNPTPGDLEEIVKMEPEEAREE<br>ISGSPERDICDDIKVEHAVELDTGAPSEELSSAGEVTKQTVLQKE<br>EERSQPTKTPSSSQEPPDEGTSGTDVNKGSSKNALSSMDPEVR<br>LSSPPGKPEDSSSVDGQSVGTPVGPETGGEKNGPEEEEEEDFD<br>DLTQDEEDEMSSASEESVLSVPELQETMEKLTWLASERRMSQE<br>GESEEENSQEENSEPEEEEEEEAEGMESLQKEDEMTDEAVGDS<br>AEKPPTFASPETAPEVETSRTPPGESIKAAGKGRNNHRARNKRG<br>SRARASKDTSKLLLLYDEDILERDPLREQKDLAFAQAYLTRVREA<br>LQHIPGKYEDFLQVIYEFESSTQRRTAVDLYKSLQILLQDWPQLLK<br>DFAAFLLPEQALACGLFEEQQAFEKSRKFLRQLEICFAENPSHHQ<br>KIIKVLQGCADCLPQEITELKTQMWQLLKGHDHLQDEFSIFFDHLR<br>PAASRMGDFEEINWTEEKEYEFDGFEEVALPDVEEEEEPPKIPTA<br>SKNKRKKEIGVQNHDKETEWPDGAKDCACSCHEGGPDSKLKKS<br>KRRSCSHCSSKVCDSKSYKSKEPHELVGSSPHREASPMPGAKE<br>AGQGKDMMEEEAPEERESTEATQSRTVRTTRKGEMPVSAGLAV<br>GSTLPSPREVTVTERLLLDGPPPHSPETPQFPPTTGAVLYTVKRN<br>QVGPEVRSCPKASPRLQKEREGQKAVSESEALMLVWDASETEK<br>LPGTVEPPASFLSPVSSKTRDAGRRHVSGKPDTQERWLPSSRA<br>RVKTRDRTCPVHESPSGIDTSETSPKAPRGGLAKDSGTQAKGPE<br>GEQQPKAAEATVCANNSKVSSTGEKVVLWTREADRVILTMCQE<br>QGAQPQTFNIISQQLGNKTPAEVSHRFRELMQLFHTACEASSED<br>EDDATSTSNADQLSDHGDLLSEEELDE |
| SEQ ID NO 3:<br>Amino acid (AA) sequence<br>of human GON4L isoform<br>B<br>GenBank: AAR01262.1 | MLPCKKRRTTVTESLQHKGNQEENNVDLESAVKPESDQVKDLS<br>SVSLSWDPSHGRVAGFEVQSLQDAGNQLGMEDTSLSSGMLTQ<br>NTNVPILEGVDVAISQGITLPSLESFHPLNIHIGKGKLHATGSKRGK<br>KMTLRPGPVTQEDRCDHLTLKEPFSGEPSEEVKEEGGKPQMNS<br>EGEIPSLPSGSQSAKPVSQPRKSTQPDVCASPQEKPLRTLFHQP<br>EEEIEDGGLFIPMEEQDNEESEKRRKKKKGTKRKRDGRGQEGTL<br>AYDLKLDDMLDRTLEDGAKQHNLTAVNVRNILHEVITNEHVVAM<br>MKAAISETEDMPMFEPKMTRSKLKEVVEKGVVIPTWNISPIKKAN<br>EIKPPQFVDIHLEEDDSSDEEYQPDDEEEDETAEESLLESDVEST<br>ASSPRGAKKSRLRQSSEMTETDEESGILSEAEKVTAPAIRHISAE<br>VVPMGPPPPPKPKQTRDSTFMEKLHAVDEELASSPVCMDSFQP<br>MDDSLIAFRTRSKMPLKDVPLGQLEAELQAPDITPDMYDPNTAD<br>DEDWKMWLGGLMNDDVGNEDEADDDDDPEYNFLEDLDEPDTE<br>DFRTDRAVRITKKEVNELMEELFETFQDEMGFSNMEDDGPEEEE<br>CVAEPRPNFNTPQALRFEEPLANLLNEQHRTVKELFEQLKMKKS<br>SAKQLQEVEKVKPQSEKVHQTLILDPAQRKRLQQQMQQHVQLLT<br>QIHLLATCNPNLNPEATTTRIFLKELGTFAQSSIALHHQYNPKFQT<br>LFQPCNLMGAMQLIEDFSTHVSIDCSPHKTVKKTANEFPCLPKQV<br>AWILATSKVFMYPELLPVCSLKAKNPQDKIVFTKAEDNLLALGLKH<br>FEGTEFPNPLISKYLLTCKTAHQLTVRIKNLNMNRAPDNIIKFYKKT<br>KQLPVLGKCCEEIQPHQWKPPIEREEHRLPFWLKASLPSIQEELR<br>HMADGAREVGNMTGTTEINSDRSLEKDNLELGSESRYPLLLPKG<br>VVLKLKPVATRSPRKAWRQKRSSVLKPLLIQPSPSLQPSFNPGKT<br>PARSTHSEAPPSKMVLRIPHPIQPATVLQTVPGVPPLGVSGGESF<br>ESPAALPAVPPEARTSFPLSESQTLLSSAPVPKVMLPSLAPSKFR<br>KPYVRRRPSKRRGVKASPCMKPAPVIHHPASVIFTVPATTVKIVS<br>LGGGCNMIQPVNAAVAQSPQTIPITTLLVNPTSFPCPLNQSLVAS<br>SVSPLIVSGNSVNLPIPSTPEDKAHVNVDIACAVADGENAFQGLE<br>PKLEPQELSPLSATVFPKVEHSPGPPLADAECQEGLSENSACRW<br>TVVKTEEGRQALEPLPQGIQESLNNPTPGDLEEIVKMEPEEAREE<br>ISGSPERDICDDIKVEHAVELDTGAPSEELSSAGEVTKQTVLQKE<br>EGRSQPTKTPSSSQEPPDEGTSGTDVNKGSSKNALSSMDPEVR<br>LSSPPGKPEDSSSVDGQSVGTPVGPETGGEKNGPEEEEEEDFD<br>DLTQDEEDEMSSASEESVLSVPELQVRAGEYSQVFRGLSNMYH<br>LLICHLLACCTMDSPKIICI |
| SEQ ID NO 4:<br>Amino acid (AA) sequence<br>of human GON4L isoform<br>C<br>GenBank: AAR01261.1 | MLPCKKRRTTVTESLQHKGNQEENNVDLESAVKPESDQVKDLS<br>SVSLSWDPSHGRVAGFEVQSLQDAGNQLGMEDTSLSSGMLTQ<br>NTNVPILEGVDVAISQGITLPSLESFHPLNIHIGKGKLHATGSKRGK<br>KMTLRPGPVTQEDRCDHLTLKEPFSGEPSEEVKEEGGKPQMNS<br>EGEIPSLPSGSQSAKPVSQPRKSTQPDVCASPQEKPLRTLFHQP<br>EEEIEDGGLFIPMEEQDNEESEKRRKKKKGTKRKRDGRGQEGTL |

TABLE 1-continued

Amino acid sequences of preferred TF of the invention.

|  |  |
|---|---|
|  | AYDLKLDDMLDRTLEDGAKQHNLTAVNVRNILHEVITNEHVVAM MKAAISETEDMPMFEPKMTRSKLKEVVEKGVVIPTWNISPIKKAN EIKPPQFVDIHLEEDDSSDEEYQPDDEEEDETAEESLLESDVEST ASSPRGAKKSRLRQSSEMTETDEESGILSEAEKVTTPAIRHISAE VVPMGPPPPPKPKQTRDSTFMEKLHAVDEELASSPVCMDSFQP MDDSLIAFRTRSKMPLKDVPLGQLEAELQAPDITPDMYDPNTAD DEDWKMWLGGLMNDDVGNEDEADDDDDPEYNFLEDLDEPDTE DFRTDRAVRITKKEVNELMEELFETFQDEMGFSNMEDDGPEEEE CVAEPRPNFNTPQALRFEEPLANLLNEQHRTVKELFEQLKMKKS SAKQLQEVEKVKPQSEKVHQTLILDPAQRKRLQQQMQQHVQLLT QIHLLATCNPNLNPEATTTRIFLKELGTFAQSSIALHHQYNPKFQT LFQPCNLMGAMQLIEDFSTHVSIDCSPHKTVKKTANEFPCLPKQV AWILATSKVFMYPELLPVCSLKAKNPQDKIVFTKAEDNLLALGLKH FEGTEFPNPLISKYLLTCKTAHQLTVRIKNLNMNRAPDNIIKFYKKT KQLPVLGKCCEEIQPHQWKPPIEREEHRLPFWLKASLPSIQEELR HMADGAREVGNMTGTTEINSDRSLEKDNLELGSESRYPLLLPKG VVLKLKPVATRFPRKAWRQKRSSVLKPLLIQPSPSLQPSFNPGKT PARSTHSEAPPSKMVLRIPHPIQPATVLQTVPGVPPLGVSGGESF ESPAALPAVPPEARTSFPLSESQTLLSSAPVPKVMLPSLAPSKFR KPYVRRRPSKRRGVKASPCMKPAPVIHHPASVIFTVPATTVKIVS LGGGCNMIQPVNAAVAQSPQTIPITTLLVNPTSFPCPLNQSLVAS SVSPLIVSGNSVNLPIPSTPEDKAHVNVDIACAVADGENAFQGLE PKLEPQELSPLSATVFPKVEHSPGPPLADAECQEGLSENSACRW TVVKTEEGRQALEPLPQGIQESLNNPTPGDLEEIVKMEPEEAREE ISGSPERDICDDIKVEHAVELDTGAPSEELSSAGEVTKQTVLQKE EERSQPTKTPSSSQEPPDEGTSGTDVNKGSSKNALSSMDPEVR LSSPPGKPEDSSSVDGQSVGTPVGPETGGEKNGPEEEEEEDFD DLTQDEEDEMSSASEESVLSVPELQETMEKLTWLASERRMSQE GESEEENSQEENSEPEEEEEEEAEGMESLQKEDEMTDEAVGDS AEKPPTFASPETAPEVETSRTPPGESIKAAGKGRNNHRARNKRG SRARASKDTSKLLLLYDEDILERDPLREQKDLAFAQAYLTRVREA LQHIPGKYEDFLQVIYEFESSTQRRTAVDLYKSLQILLQDWPQLLK DFAAFLLPEQALACGLFEEQQAFEKSRKFLRQLEICFAENPSHHQ KIIKVLQGCADCLPQEITELKTQMWQLLKGHDHLQDEFSIFFDHLR PAASRMGDFEEINWTEEKEYEFDGFEEVALPDVEEEEEPPKIPTA SKNKRKKEIGVQNHDKETEWPDGAKDCACSCHEGGPDSKLKKS KRRSCSHCSSKVCDSKSYKSKEPHELVGSSPHREASPMPGAKE AGQGKDMMEEEAPEERESTEATQSRTVRTTRKGEMPVSAGLAV GSTLPSPREVTVTERLLLDGPPPHSPETPQFPPTTGAVLYTVKRN QVGPEVRSCPKASPRLQKEREGQKAVSESEALMLVWDASETEK LPGTVEPPASFLSPVSSKTRDAGRRHVSGKPDTQERWLPSSRA RVKTRDRTCPVHESPSGIDTSETSPKAPRGGLAKDSGTQAKGPE GEQQPKAAEATVCANNSKVSSTGEKVVLWTREADRVILTMCQE QGAQPQTFNIISQQLGNKTPAEVSHRFRELMQLFHTACEASSED EDDATSTSNADQLSDHGDLLSEEELDE |
| SEQ ID NO 5: Amino acid (AA) sequence of human NEUROD1 GenBank: BAJ84018.1 | MTKSYSESGLMGEPQPQGPPSWTDECLSSQDEEHEADKKEDD LEAMNAEEDSLRNGGEEEDEDEDLEEEEEEEEDDDQKPKRRG PKKKKMTKARLERFKLRRMKANARERNRMHGLNAALDNLRKVV PCYSKTQKLSKIETLRLAKNYIWALSEILRSGKSPDLVSFVQTLCK GLSQPTTNLVAGCLQLNPRTFLPEQNQDMPPHLPTASASFPVHP YSYQSPGLPSPPYGTMDSSHVFHVKPPPHAYSAALEPFFESPLT DCTSPSFDGPLSPPLSINGNFSFKHEPSAEFEKNYAFTMHYPAAT LAGAQSHGSIFSGTAAPRCEIPIDNIMSFDSHSHHERVMSAQLNAI FHD |
| SEQ ID NO 6: Amino acid (AA) sequence of human OTX2 Isoform A NCBI Reference Sequence: NP_068374.1 | MMSYLKQPPYAVNGLSLTTSGMDLLHPSVGYPGPWASCPAATP RKQRRERTTFTRAQLDVLEALFAKTRYPDIFMREEVALKINLPES RVQVWFKNRRAKCRQQQQQQQNGGQNKVRPAKKKTSPAREV SSESGTSGQFTPPSSTSVPTIASSSAPVSIWSPASISPLSDPLSTS SSCMQRSYPMTYTQASGYSQGYAGSTSYFGGMDCGSYLTPMH HQLPGPGATLSPMGTNAVTSHLNQSPASLSTQGYGYASSLGFNS TTDCLDYKDQTASWKLNFNADCLDYKDQTSSWKFQVL |
| SEQ ID NO 7: Amino acid (AA) sequence of human OTX2 Isoform B NCBI Reference Sequence: NP_001257453.1 | MMSYLKQPPYAVNGLSLTTSGMDLLHPSVGYPATPRKQRRERT TFTRAQLDVLEALFAKTRYPDIFMREEVALKINLPESRVQVWFKN RRAKCRQQQQQQQNGGQNKVRPAKKKTSPAREVSSESGTSGQ FTPPSSTSVPTIASSSAPVSIWSPASISPLSDPLSTSSSCMQRSYP MTYTQASGYSQGYAGSTSYFGGMDCGSYLTPMHHQLPGPGAT LSPMGTNAVTSHLNQSPASLSTQGYGASSLGFNSTTDCLDYKDQ TASWKLNFNADCLDYKDQTSSWKFQVL |

In the context of the present invention, the provision of GON4L isoform B according to SEQ ID NO 3 and/or OTX2 isoform A according to SEQ ID NO 6 is particularly advantageous.

The invention further relates to functionally analogous sequences of the respective TF. Protein modifications to the TF of the present invention, which may occur through substitutions in amino acid sequence, and nucleic acid sequences encoding such molecules, are also included within the scope of the invention. Substitutions as defined herein are modifications made to the amino acid sequence of the protein, whereby one or more amino acids are replaced with the same number of (different) amino acids, producing a protein which contains a different amino acid sequence than the primary protein. In some embodiments this amendment will not significantly alter the function of the protein. Like additions, substitutions may be natural or artificial. It is well known in the art that amino acid substitutions may be made without significantly altering the protein's function. This is particularly true when the modification relates to a "conservative" amino acid substitution, which is the substitution of one amino acid for another of similar properties. Such "conserved" amino acids can be natural or synthetic amino acids which because of size, charge, polarity and conformation can be substituted without significantly affecting the structure and function of the protein. Frequently, many amino acids may be substituted by conservative amino acids without deleteriously affecting the protein's function.

In general, the non-polar amino acids Gly, Ala, Val, Ile and Leu; the non-polar aromatic amino acids Phe, Trp and Tyr; the neutral polar amino acids Ser, Thr, Cys, Gln, Asn and Met; the positively charged amino acids Lys, Arg and His; the negatively charged amino acids Asp and Glu, represent groups of conservative amino acids. This list is not exhaustive. For example, it is well known that Ala, Gly, Ser and sometimes Cys can substitute for each other even though they belong to different groups.

As explained herein, in the context of the invention the one or more TF may be provided at the protein level or in the form of a nucleic acid encoding a TF.

Nucleic acid sequences of the invention include the nucleic acid sequences encoding GON4L, NEUROD1 and OTX2 protein sequences according to Table 1 and functionally analogous sequences. Preferred nucleic acid sequence encoding GON4L, NEUROD and OTX2 protein are listed under Table 2.

The TF of the invention may include proteins tags that allow easy identification of the provided TF in the cell through standard techniques, for example by using antibodies directed against the protein tag. A preferred protein-tag that can be encoded by a nucleic acid sequence of the invention is a V5-tag. Alternative tags may be used instead of a V5-tag. Such alternatives are well known in the art and can be selected by a skilled person.

TABLE 2

Nucleic acid sequences of preferred TF of the invention.

| | |
|---|---|
| SEQ ID NO 8:<br>sequence of human<br>Coding nucleic acid<br>GON4L isoform B | ATGTTGCCCTGTAAGAAGAAGAACTACAGTGACAGAGTCC<br>CTACAGCATAAAGGCAATCAAGAGGAAAACAACGTAGACCTA<br>GAATCAGCCGTTAAACCAGAATCTGACCAGGTTAAGGACTTGA<br>CTGGCTTCGAAGTACAGTCTTTGCAGGATGCAGGAAATCAGC<br>GTTCGGTGTCACTATCCTGGGATCCAAGTCATGGCAGAGTAG<br>TTGGTATGGAGGATACATCTCTGAGCTCTGGAATGCTCACCCA<br>GAACACAAATGTACCAATTCTAGAAGGTGTTGATGTGGCCATC<br>TCTCAGGGAATCACCCTACCTTCCTTGGAGTCTTTTCACCCCC<br>TTAATATACACATTGGTAAAGGAAAACTCCACGCTACTGGCTC<br>AAAGAGAGGGAAAAAAATGACACTCAGGCCTGGGCCAGTTAC<br>CCAAGAAGACAGATGTGATCATCTTACCCTAAAGGAGCCTTTT<br>TCAGGAGAGCCTAGTGAAGAAGTCAAGGAAGAAGGAGGGAAA<br>CCTCAAATGAATTCTGAAGGGGAGATACCTTCCCTGCCATCAG<br>GCAGCCAATCTGCAAAACCAGTAAGCCAGCCCAGGAAATCAA<br>CCCAGCCAGATGTTTGTGCCTCTCCTCAAGAAAAGCCACTCA<br>GGACTCTGTTTCACCAACCTGAGGAAGAGATAGAAGATGGTG<br>GACTCTTCATTCCAATGGAAGAACAAGACAATGAAGAAAGTGA<br>GAAAAGGAGAAAAAAGAAAAAGGGTACCAAGAGGAAACGAGA<br>TGGAAGGGGTCAAGAAGGGACCTTGGCATATGACCTGAAACT<br>GGATGACATGCTTGACCGTACCTTGGAGGATGGTGCCAAGCA<br>GCACAATCTAACAGCAGTCAATGTCCGAAACATCCTTCATGAA<br>GTAATCACAAATGAACACGTGGTAGCTATGATGAAAGCAGCCA<br>TCAGTGAGACGGAAGATATGCCAATGTTTGAGCCTAAAATGAC<br>ACGCTCTAAACTGAAGGAAGTAGTGGAAAAAGGAGTGGTAATT<br>CCAACATGGAATATTTCACCAATTAAGAAGGCCAATGAAATTA<br>AGCCTCCTCAGTTTGTGGATATCCACCTTGAAGAAGATGATTC<br>CTCAGATGAAGAATACCAGCCGGATGATGAAGAAGAAGATGA<br>AACTGCTGAAGAGAGCTTATTGGAAAGTGATGTTGAAAGCACT<br>GCTTCATCTCCACGTGGGGCAAAGAAATCCAGATTGAGGCAG<br>TCTTCTGAGATGACTGAAACAGATGAGGAGAGTGGCATATTAT<br>CAGAGGCTGAGAAAGTCACCACACCAGCCATCAGGCACATCA<br>GTGCTGAGGTAGTGCCCATGGGGCCCCCGCCCCCTCCAAAG<br>CCGAAACAGACCAGAGATAGTACTTTCATGGAGAAGTTACATG<br>CGGTAGATGAGGAGCTGGCTTCCAGTCCAGTCTGCATGGATT<br>CTTTCCAGCCCATGGATGACAGTCTCATTGCATTTCGAACGCG<br>TTCTAAGATGCCCCTGAAAGATGTTCCCCTGGGCCAATTAGAG<br>GCAGAGCTCCAAGCTCCAGACATCACTCCAGATATGTATGAC<br>CCCAATACGGCAGATGATGAGGACTGGAAGATGTGGCTGGG<br>GGGACTTATGAATGATGATGTGGGGAATGAAGATGAAGCAGA<br>TGATGATGATGATCCAGAATATAATTTCCTGGAAGACCTCGAT<br>GAACCAGACACAGAGGATTTCCGGACTGACCGGGCAGTGAGA<br>ATCACCAAAAAGGAAGTAAATGAGCTGATGGAAGAGCTGTTTG<br>AAACTTTCCAAGATGAGATGGGATTCTCCAACATGGAAGATGA |

TABLE 2-continued

Nucleic acid sequences of preferred TF of the invention.

| | |
|---|---|
| | TGGCCCAGAAGAGGAGGAGTGTGTAGCTGAGCCTCGTCCTAA |
| | CTTTAACACCCCTCAAGCTCTACGGTTTGAGGAACCACTGGCC |
| | AACCTGTTAAATGAACAACATCGGACAGTGAAGGAGCTATTTG |
| | AACAGCTGAAGATGAAGAAATCTTCAGCCAAACAGCTGCAGG |
| | AAGTAGAGAAGGTTAAACCCCAGAGTGAGAAAGTTCATCAGA |
| | CTCTGATTCTGGACCCAGCACAGAGGAAGAGACTCCAGCAGC |
| | AGATGCAGCAGCACGTTCAGCTCTTGACCCAAATCCACCTTCT |
| | TGCCACCTGCAACCCCAACCTCAATCCGGAGGCCACTACCAC |
| | CAGGATATTTCTTAAAGAGCTGGGAACCTTTGCTCAAAGCTCC |
| | ATCGCCCTTCACCATCAGTACAACCCCAAGTTTCAGACCCTGT |
| | TCCAACCCTGTAACTTGATGGGAGCTATGCAGCTGATTGAAGA |
| | CTTCAGCACACATGTCAGCATTGACTGCAGCCCTCATAAAACT |
| | GTCAAGAAGACTGCGAATGAATTTCCCTGTTTGCCAAAGCAAG |
| | TGGCTTGGATTCTGGCCACAAGCAAGGTTTTCATGTATCCAGA |
| | GTTACTTCCAGTGTGTTCCCTGAAGGCAAAGAATCCCCAGGAT |
| | AAGATCGTCTTCACCAAGGCTGAGGACAATTTGTTAGCTTTAG |
| | GACTGAAGCATTTTGAAGGAACTGAGTTTCCTAATCCTCTAAT |
| | CAGCAAGTACCTTCTAACCTGCAAAACTGCCCACCAACTGACA |
| | GTGAGAATCAAGAACCTCAACATGAACAGAGCTCCTGACAACA |
| | TCATTAAATTTTATAAGAAGACCAAACAGCTGCCAGTCCTAGG |
| | AAAATGCTGTGAAGAGATCCAGCCACATCAGTGGAAGCCACC |
| | TATAGAGAGAAGAACACCGGCTCCCATTCTGGTTAAAGGC |
| | CAGTCTGCCATCCATCCAGGAAGAACTGCGGCACATGGCTGA |
| | TGGTGCTAGAGAGGTAGGAAATATGACTGGAACCACTGAGAT |
| | CAACTCAGATCGAAGCCTAGAAAAAGACAATTTGGAGTTGGG |
| | GAGTGAATCTCGGTACCCACTGCTATTGCCTAAGGGTGTAGT |
| | CCTGAAACTGAAGCCAGTTGCCACCCGTTTCCCCAGGAAGGC |
| | TTGGAGACAGAAGCGTTCATCAGTCCTGAAGCCCCTCCTTATC |
| | CAACCCAGCCCCTCTCTCCAGCCCAGCTTCAACCCTGGGAAA |
| | ACACCAGCCCGATCAACTCATTCAGAAGCCCCTCCGAGCAAA |
| | ATGGTGCTCCGGATTCCTCACCCAATACAGCCAGCCACTGTTT |
| | TACAGACAGTTCCAGGTGTCCCTCCACTGGGGGTCAGTGGAG |
| | GTGAGAGTTTTGAGTCTCCTGCAGCACTGCCTGCTGTGCCCC |
| | CTGAGGCCAGGACAAGCTTCCCTCTGTCTGAGTCCCAGACTT |
| | TGCTCTCTTCTGCCCCTGTGCCCAAGGTAATGCTGCCCTCCCT |
| | TGCCCCTTCTAAGTTTCGAAAGCCATATGTGAGACGGAGACC |
| | CTCAAAGAGAAGAGGGAGTCAAGGCCTCTCCCTGTATGAAACC |
| | TGCCCCTGTTATCCACCACCCTGCATCTGTTATCTTCACTGTT |
| | CCTGCTACCACTGTGAAGATTGTGAGCCTTGGCGGTGGCTGT |
| | AACATGATCCAGCCTGTCAATGCGGCTGTGGCCCAGAGTCCC |
| | CAGACTATTCCCATCACTACCCTCTTGGTTAACCCTACTTCCTT |
| | CCCCTGTCCATTGAACCAGTCCCTTGTGGCCTCCTCTGTCTCA |
| | CCCTTAATTGTTTCTGGCAATTCTGTGAATCTTCCTATACCATC |
| | CACCCCTGAAGATAAGGCCCACGTGAATGTGGACATTGCTTG |
| | TGCTGTGGCTGATGGGGAAAATGCCTTTCAGGGCCTAGAACC |
| | CAAATTAGAGCCCCAGGAACTATCTCCTCTCTCTGCTACTGTT |
| | TTCCCGAAAGTGGAACATAGCCCAGGGCCTCCACTAGCAGAT |
| | GCAGAGTGCCAAGAAGGATTGTCAGAGAATAGTGCCTGTCGC |
| | TGGACCGTTGTGAAAACAGAGGAGGGGAGGCAAGCTCTGGA |
| | GCCGCTCCCTCAGGGCATCCAGGAGTCTCTAAACAACCCTAC |
| | CCCTGGGGATTTAGAGGAAATTGTCAAGATGGAACCTGAAGA |
| | AGCTAGAGAGGAAATCAGTGGATCCCCTGAGCGTGATATTTG |
| | TGATGACATCAAAGTGGAACATGCTGTGGAATTGGACACTGGT |
| | GCCCCAAGCGAGGAGTTGAGCAGTGCTGGAGAAGTAACGAAA |
| | CAGACAGTCTTACAGAAGGAAGAGGAGAGGAGTCAGCCAACT |
| | AAAACCCCTTCATCTTCTCAAGAGCCCCCTGATGAAGGAACCT |
| | CAGGGACAGATGTGAACAAAGGATCATCAAAGAATGCTTTGTC |
| | CTCAATGGATCCTGAAGTGAGGCTTAGTAGCCCCCCAGGGAA |
| | GCCAGAAGATTCATCCAGTGTTGATGGTCAGTCAGTGGGGAC |
| | TCCAGTTGGGCCAGAAACTGGAGGAGAGAAGAATGGGCCAG |
| | AAGAAGAGGAAGAAGAGGACTTTGATGACCTCACCCAAGATG |
| | AGGAAGATGAAATGTCATCAGCTTCTGAGGAATCTGTGCTTTC |
| | TGTCCCAGAACTCCAGGTGAGAGCTGGAGAATATTCTCAAGTA |
| | TTTCGTGGACTCAGTAATATGTATCACTTATTGATATGCCACCT |
| | GCTTGCTTGCTGCACTATGGATAGTCCTAAAATCATTTGTATT |
| SEQ ID NO 9:<br>Coding nucleic acid<br>sequence of human<br>GON4L isoform B V5<br>(comprising a V5-<br>tag at the<br>3' end) | ATGTTGCCCTGTAAGAAGAGAAGAACTACAGTGACAGAGTCC<br>CTACAGCATAAAGGCAATCAAGAGGAAAACAACGTAGACCTA<br>GAATCAGCCGTTAAACCAGAATCTGACCAGGTTAAGGACTTGA<br>GTTCGGTGTCACTATCCTGGGATCCAAGTCATGGCAGAGTAG<br>CTGGCTTCGAAGTACAGTCTTTGCAGGATGCAGGAAATCAGC<br><br>TTGGTATGGAGGATACATCTCTGAGCTCTGGAATGCTCACCCA<br>GAACACAAATGTACCAATTCTAGAAGGTGTTGATGTGGCCATC<br>TCTCAGGGAATCACCCTACCTTCCTTGGAGTCTTTTCACCCCC<br>TTAATATACACATTGGTAAAGGAAAACTCCACGCTACTGGCTC<br>AAAGAGAGGGAAAAAAATGACACTCAGGCCTGGGCCAGTTAC<br>CCAAGAAGACAGATGTGATCATCTTACCCTAAAGGAGCCTTTT |

TABLE 2-continued

Nucleic acid sequences of preferred TF of the invention.

TCAGGAGAGCCTAGTGAAGAAGTCAAGGAAGAAGGAGGGAAA
CCTCAAATGAATTCTGAAGGGGAGATACCTTCCCTGCCATCAG
GCAGCCAATCTGCAAAACCAGTAAGCCAGCCCAGGAAATCAA
CCCAGCCAGATGTTTGTGCCTCTCCTCAAGAAAAGCCACTCA
GGACTCTGTTTCACCAACCTGAGGAAGAGATAGAAGATGGTG
GACTCTTCATTCCAATGGAAGAACAAGACAATGAAGAAAGTGA
GAAAAGGAGAAAAAAGAAAAAGGGTACCAAGAGGAAACGAGA
TGGAAGGGGTCAAGAAGGGACCTTGGCATATGACCTGAAACT
GGATGACATGCTTGACCGTACCTTGGAGGATGGTGCCAAGCA
GCACAATCTAACAGCAGTCAATGTCCGAAACATCCTTCATGAA
GTAATCACAAATGAACACGTGGTAGCTATGATGAAAGCAGCCA
TCAGTGAGACGGAAGATATGCCAATGTTTGAGCCTAAAATGAC
ACGCTCTAAACTGAAGGAAGTAGTGGAAAAAGGAGTGGTAATT
CCAACATGGAATATTTCACCAATTAAGAAGGCCAATGAAATTA
AGCCTCCTCAGTTTGTGGATATCCACCTTGAAGAAGATGATTC
CTCAGATGAAGAATACCAGCCGGATGATGAAGAAGAAGATGA
AACTGCTGAAGAGCTTATTGGAAAGTGATGTTGAAAGCACT
GCTTCATCTCCACGTGGGGCAAAGAAATCCAGATTGAGGCAG
TCTTCTGAGATGACTGAAACAGATGAGGAGAGTGGCATATTAT
CAGAGGCTGAGAAAGTCACCACACCAGCCATCAGGCACATCA
GTGCTGAGGTAGTGCCCATGGGGCCCCGCCCCCTCCAAAG
CCGAAACAGACCAGAGATAGTACTTTCATGGAGAAGTTACATG
CGGTAGATGAGGAGCTGGCTTCCAGTCCAGTCTGCATGGATT
CTTTCCAGCCCATGGATGACAGTCTCATTGCATTTCGAACGCG
TTCTAAGATGCCCCTGAAAGATGTTCCCCTGGGCCAATTAGAG
GCAGAGCTCCAAGCTCCAGACATCACTCCAGATATGTATGAC
CCCAATACGGCAGATGATGAGGACTGGAAGATGTGGCTGGG
GGGACTTATGAATGATGATGTGGGGAATGAAGATGAAGCAGA
TGATGATGATGATCCAGAATATAATTTCCTGGAAGACCTCGAT
GAACCAGACACAGAGGATTTCCGGACTGACCGGGCAGTGAGA
ATCACCAAAAAGGAAGTAAATGAGCTGATGAAGAGCTGTTTG
AAACTTTCCAAGATGAGATGGATTCTCCAACATGGAAGATGA
TGGCCCAGAAGAGGAGGAGTGTGTAGCTGAGCCTCGTCCTAA
CTTTAACACCCCTCAAGCTCTACGGTTTGAGGAACCACTGGCC
AACCTGTTAAATGAACAACATCGGACAGTGAAGGAGCTATTTG
AACAGCTGAAGATGAAGAAATCTTCAGCCAAACAGCTGCAGG
AAGTAGAGAAGGTTAAACCCCAGAGTGAGAAAGTTCATCAGA
CTCTGATTCTGGACCCAGCACAGAGGAAGAGACTCCAGCAGC
AGATGCAGCAGCACGTTCAGCTCTTGACCCAAATCCACCTTCT
TGCCACCTGCAACCCCAACCTCAATCCGGAGGCCACTACCAC
CAGGATATTTCTTAAAGAGCTGGGAACCTTTGCTCAAAGCTCC
ATCGCCCTTCACCATCAGTACAACCCCAAGTTTCAGACCCTGT
TCCAACCCTGTAACTTGATGGGAGCTATGCAGCTGATTGAAGA
CTTCAGCACACATGTCAGCATTGACTGCAGCCCTCATAAAACT
GTCAAGAAGACTGCGAATGAATTTCCCTGTTTGCCAAAGCAAG
TGGCTTGGATTCTGGCCACAAGCAAGGTTTTCATGTATCCAGA
GTTACTTCCAGTGTGTTCCCTGAAGGCAAAGAATCCCCAGGAT
AAGATCGTCTTCACCAAGGCTGAGGACAATTTGTTAGCTTTAG
GACTGAAGCATTTTGAAGGAACTGAGTTTCCTAATCCTCTAAT
CAGCAAGTACCTTCTAACCTGCAAAACTGCCCACCAACTGACA
GTGAGAATCAAGAACCTCAACATGAACAGAGCTCCTGACAACA
TCATTAAATTTTATAAGAAGACCAAACAGCTGCCAGTCCTAGG
AAAATGCTGTGAAGAGATCCAGCCACATCAGTGGAAGCCACC
TATAGAGAGAGAAGAACACCGGCTCCCATTCTGGTTAAAGGC
CAGTCTGCCATCCATCCAGGAAGAACTGCGGCACATGGCTGA
TGGTGCTAGAGAGGTAGGAAATATGACTGGAACCACTGAGAT
CAACTCAGATCGAAGCCTAGAAAAAGACAATTTGGAGTTGGG
GAGTGAATCTCGGTACCCACTGCTATTGCCTAAGGGTGTAGT
CCTGAAACTGAAGCCAGTTGCCACCCGTTTCCCCAGGAAGGC
TTGGAGACAGAAGCGTTCATCAGTCCTGAAGCCCCTCCTTATC
CAACCCAGCCCCTCTCTCCAGCCCAGCTTCAACCCTGGGAAA
ACACCAGCCCGATCAACTCATTCAGAAGCCCCTCCGAGCAAA
ATGGTGCTCCGGATTCCTCACCCAATACAGCCAGCCACTGTTT
TACAGACAGTTCCAGGTGTCCCTCCACTGGGGGTCAGTGGAG
GTGAGAGTTTTGAGTCTCCTGCAGCACTGCCTGCTGTGCCCC
CTGAGGCCAGGACAAGCTTCCCTCTGTCTGAGTCCCAGACTT
TGCTCTCTTCTGCCCCTGTGCCCAAGGTAATGCTGCCCTCCCT
TGCCCCTTCTAAGTTTCGAAAGCCATATGTGAGACGGAGACC
CTCAAAGAGAAGAGGAGTCAAGGCCTCTCCCTGTATGAAACC
TGCCCCTGTTATCCACCACCCTGCATCTGTTATCTTCACTGTT
CCTGCTACCACTGTGAAGATTGTGAGCCTTGGCGGTGGCTGT
AACATGATCCAGCCTGTCAATGCGGCTGTGGCCCAGAGTCCC
CAGACTATTCCCATCACTACCCTCTTGGTTAACCCTACTTCCTT
CCCCTGTCCATTGAACCAGTCCCTTGTGGCCTCCTCTGTCTCA
CCCTTAATTGTTTCTGGCAATTCTGTGAATCTTCCTATACCATC
CACCCCTGAAGATAAGGCCCACGTGAATGTGGACATTGCTTG
TGCTGTGGCTGATGGGGAAAATGCCTTTCAGGGCCTAGAACC
CAAATTAGAGCCCCAGGAACTATCTCCTCTCTCTGCTACTGTT

TABLE 2-continued

Nucleic acid sequences of preferred TF of the invention.

| | |
|---|---|
| | TTCCCGAAAGTGGAACATAGCCCAGGGCCTCCACTAGCAGAT<br>GCAGAGTGCCAAGAAGGATTGTCAGAGAATAGTGCCTGTCGC<br>TGGACCGTTGTGAAAACAGAGGAGGGGAGGCAAGCTCTGGA<br>GCCGCTCCCTCAGGGCATCCAGGAGTCTCTAAACAACCCTAC<br>CCCTGGGGATTTAGAGGAAATTGTCAAGATGGAACCTGAAGA<br>AGCTAGAGAGGAAATCAGTGGATCCCCTGAGCGTGATATTTG<br>TGATGACATCAAAGTGGAACATGCTGTGGAATTGGACACTGGT<br>GCCCCAAGCGAGGAGTTGAGCAGTGCTGGAGAAGTAACGAAA<br>CAGACAGTCTTACAGAAGGAAGAGGAGAGGAGTCAGCCAACT<br>AAAACCCCTTCATCTTCTCAAGAGCCCCCTGATGAAGGAACCT<br>CAGGGACAGATGTGAACAAAGGATCATCAAAGAATGCTTTGTC<br>CTCAATGGATCCTGAAGTGAGGCTTAGTAGCCCCCCAGGGAA<br>GCCAGAAGATTCATCCAGTGTTGATGGTCAGTCAGTGGGAC<br>TCCAGTTGGGCCAGAAACTGGAGGAGAGAAGAATGGGCCAG<br>AAGAAGAGGAAGAAGAGGACTTTGATGACCTCACCCAAGATG<br>AGGAAGATGAAATGTCATCAGCTTCTGAGGAATCTGTGCTTTC<br>TGTCCCAGAACTCCAGGTGAGAGCTGGAGAATATTCTCAAGTA<br>TTTCGTGGACTCAGTAATATGTATCACTTATTGATATGCCACCT<br>GCTTGCTTGCTGCACTATGGATAGTCCTAAAATCATTTGTATTC<br>TCGAGGGTAAGCCTATCCCTAACCCTCTCCTCGGTCTCGATTC<br>TACGTAATGA |
| SEQ ID NO 10:<br>Coding nucleic acid<br>sequence of human<br>NEUROD1 | ATGACCAAATCGTACAGCGAGAGTGGGCTGATGGGCGAGCCT<br>CAGCCCCAAGGTCCTCCAAGCTGGACAGACGAGTGTCTCAGT<br>TCTCAGGACGAGGAGCACGAGGCAGACAAGAAGGAGGACGA<br>CCTCGAAGCCATGAACGCAGAGGAGGACTCACTGAGGAACG<br>GGGGAGAGGAGGAGGACGAAGATGAGGACCTGGAAGAGGAG<br>GAAGAAGAGGAAGAGGAGGATGACGATCAAAAGCCCAAGAGA<br>CGCGGCCCCAAAAAGAAGAAGATGACTAAGGCTCGCCTGGAG<br>CGTTTTAAATTGAGACGCATGAAGGCTAACGCCCGGGAGCGG<br>AACCGCATGCACGGACTGAACGCGGCGCTAGACAACCTGCG<br>CAAGGTGGTGCCTTGCTATTCTAAGACGCAGAAGCTGTCCAA<br>AATCGAGACTCTGCGCTTGGCCAAGAACTACATCTGGGCTCT<br>GTCGGAGATCCTGCGCTCAGGCAAAAGCCCAGACCTGGTCTC<br>CTTCGTTCAGACGCTTTGCAAGGGCTTATCCCAACCCACCACC<br>AACCTGGTTGCGGGCTGCCTGCAACTCAATCCTCGGACTTTT<br>CTGCCTGAGCAGAACCAGGACATGCCCCCCCACCTGCCGAC<br>GGCCAGCGCTTCCTTCCCTGTACACCCCTACTCCTACCAGTC<br>GCCTGGGCTGCCCAGTCCGCCTTACGGTACCATGGACAGCTC<br>CCATGTCTTCCACGTTAAGCCTCCGCCGCACGCCTACAGCGC<br>AGCGCTGGAGCCCTTCTTTGAAAGCCCTCTGACTGATTGCAC<br>CAGCCCTTCCTTTGATGGACCCCTCAGCCCGCCGCTCAGCAT<br>CAATGGCAACTTCTCTTTCAAACACGAACCGTCCGCCGAGTTT<br>GAGAAAAATTATGCCTTTACCATGCACTATCCTGCAGCGACAC<br>TGGCAGGGGCCCAAAGCCACGGATCAATCTTCTCAGGCACCG<br>CTGCCCCTCGCTGCGAGATCCCCATAGACAATATTATGTCCTT<br>CGATAGCCATTCACATCATGAGCGAGTCATGAGTGCCCAGCT<br>CAATGCCATATTTCATGAT |
| SEQ ID NO 11:<br>Coding nucleic acid<br>sequence of human<br>NEUROD1 V5 (comprising<br>a V5-tag at the 3' end) | ATGACCAAATCGTACAGCGAGAGTGGGCTGATGGGCGAGCCT<br>CAGCCCCAAGGTCCTCCAAGCTGGACAGACGAGTGTCTCAGT<br>TCTCAGGACGAGGAGCACGAGGCAGACAAGAAGGAGGACGA<br>CCTCGAAGCCATGAACGCAGAGGAGGACTCACTGAGGAACG<br>GGGGAGAGGAGGAGGACGAAGATGAGGACCTGGAAGAGGAG<br>GAAGAAGAGGAAGAGGAGGATGACGATCAAAAGCCCAAGAGA<br>CGCGGCCCCAAAAAGAAGAAGATGACTAAGGCTCGCCTGGAG<br>CGTTTTAAATTGAGACGCATGAAGGCTAACGCCCGGGAGCGG<br>AACCGCATGCACGGACTGAACGCGGCGCTAGACAACCTGCG<br>CAAGGTGGTGCCTTGCTATTCTAAGACGCAGAAGCTGTCCAA<br>AATCGAGACTCTGCGCTTGGCCAAGAACTACATCTGGGCTCT<br>GTCGGAGATCCTGCGCTCAGGCAAAAGCCCAGACCTGGTCTC<br>CTTCGTTCAGACGCTTTGCAAGGGCTTATCCCAACCCACCACC<br>AACCTGGTTGCGGGCTGCCTGCAACTCAATCCTCGGACTTTT<br>CTGCCTGAGCAGAACCAGGACATGCCCCCCCACCTGCCGAC<br>GGCCAGCGCTTCCTTCCCTGTACACCCCTACTCCTACCAGTC<br>GCCTGGGCTGCCCAGTCCGCCTTACGGTACCATGGACAGCTC<br>CCATGTCTTCCACGTTAAGCCTCCGCCGCACGCCTACAGCGC<br>AGCGCTGGAGCCCTTCTTTGAAAGCCCTCTGACTGATTGCAC<br>CAGCCCTTCCTTTGATGGACCCCTCAGCCCGCCGCTCAGCAT<br>CAATGGCAACTTCTCTTTCAAACACGAACCGTCCGCCGAGTTT<br>GAGAAAAATTATGCCTTTACCATGCACTATCCTGCAGCGACAC<br>TGGCAGGGGCCCAAAGCCACGGATCAATCTTCTCAGGCACCG<br>CTGCCCCTCGCTGCGAGATCCCCATAGACAATATTATGTCCTT<br>CGATAGCCATTCACATCATGAGCGAGTCATGAGTGCCCAGCT<br>CAATGCCATATTTCATGATCTCGAGGGTAAGCCTATCCCTAAC<br>CCTCTCCTCGGTCTCGATTCTACGTAATGA |

TABLE 2-continued

Nucleic acid sequences of preferred TF of the invention.

| | |
|---|---|
| SEQ ID NO 12:<br>Coding nucleic acid<br>sequence of human OTX2<br>Isoform A | ATGATGTCTTATCTTAAGCAACCGCCTTACGCAGTCAATGGC<br>TGAGTCTGACCACTTCGGGTATGGACTTGCTGCACCCCTCCG<br>TGGGCTACCCGGGGCCCTGGGCTTCTTGTCCCGCAGCCACC<br>CCCCGGAAACAGCGCCGGGAGAGGACGACGTTCACTCGGGC<br>GCAGCTAGATGTGCTGGAAGCACTGTTTGCCAAGACCCGGTA<br>CCCAGACATCTTCATGCGAGAGGAGGTGGCACTGAAAATCAA<br>CTTGCCCGAGTCGAGGGTGCAGGTATGGTTTAAGAATCGAAG<br>AGCTAAGTGCCGCCAACAACAGCAACAACAGCAGAATGGAGG<br>TCAAAACAAAGTGAGACCTGCCAAAAAGAAGACATCTCCAGCT<br>CGGGAAGTGAGTTCAGAGAGTGGAACAAGTGGCCAATTCACT<br>CCCCCCTCTAGCACCTCAGTCCCGACCATTGCCAGCAGCAGT<br>GCTCCTGTGTCTATCTGGAGCCCAGCTTCCATCTCCCCACTGT<br>CAGATCCCTTGTCCACCTCCTCTTCCTGCATGCAGAGGTCCTA<br>TCCCATGACCTATACTCAGGCTTCAGGTTATAGTCAAGGATAT<br>GCTGGCTCAACTTCCTACTTTGGGGGCATGGACTGTGGATCA<br>TATTTGACCCCTATGCATCACCAGCTTCCCGGACCAGGGGCC<br>ACACTCAGTCCCATGGGTACCAATGCAGTCACCAGCCATCTC<br>AATCAGTCCCCAGCTTCTCTTTCCACCCAGGGATATGGAGCTT<br>CAAGCTTGGGTTTTAACTCAACCACTGATTGCTTGGATTATAA<br>GGACCAAACTGCCTCCTGGAAGCTTAACTTCAATGCTGACTGC<br>TTGGATTATAAAGATCAGACATCCTCGTGGAAATTCCAGGTTT<br>TG |
| SEQ ID NO 13:<br>Coding nucleic acid<br>sequence of human OTX2<br>Isoform A V5 (comprising a<br>V5-tag at the 3' end) | ATGATGTCTTATCTTAAGCAACCGCCTTACGCAGTCAATGGC<br>TGAGTCTGACCACTTCGGGTATGGACTTGCTGCACCCCTCCG<br>TGGGCTACCCGGGGCCCTGGGCTTCTTGTCCCGCAGCCACC<br>CCCCGGAAACAGCGCCGGGAGAGGACGACGTTCACTCGGGC<br>GCAGCTAGATGTGCTGGAAGCACTGTTTGCCAAGACCCGGTA<br>CCCAGACATCTTCATGCGAGAGGAGGTGGCACTGAAAATCAA<br>CTTGCCCGAGTCGAGGGTGCAGGTATGGTTTAAGAATCGAAG<br>AGCTAAGTGCCGCCAACAACAGCAACAACAGCAGAATGGAGG<br>TCAAAACAAAGTGAGACCTGCCAAAAAGAAGACATCTCCAGCT<br>CGGGAAGTGAGTTCAGAGAGTGGAACAAGTGGCCAATTCACT<br>CCCCCCTCTAGCACCTCAGTCCCGACCATTGCCAGCAGCAGT<br>GCTCCTGTGTCTATCTGGAGCCCAGCTTCCATCTCCCCACTGT<br>CAGATCCCTTGTCCACCTCCTCTTCCTGCATGCAGAGGTCCTA<br>TCCCATGACCTATACTCAGGCTTCAGGTTATAGTCAAGGATAT<br>GCTGGCTCAACTTCCTACTTTGGGGGCATGGACTGTGGATCA<br>TATTTGACCCCTATGCATCACCAGCTTCCCGGACCAGGGGCC<br>ACACTCAGTCCCATGGGTACCAATGCAGTCACCAGCCATCTC<br>AATCAGTCCCCAGCTTCTCTTTCCACCCAGGGATATGGAGCTT<br>CAAGCTTGGGTTTTAACTCAACCACTGATTGCTTGGATTATAA<br>GGACCAAACTGCCTCCTGGAAGCTTAACTTCAATGCTGACTGC<br>TTGGATTATAAAGATCAGACATCCTCGTGGAAATTCCAGGTTT<br>TGCTCGAGGGTAAGCCTATCCCTAACCCTCTCCTCGGTCTCG<br>ATTCTACGTAATGA |

In another aspect, the invention encompasses the use of one or more TF, and in particular one or more nucleic acid molecules encoding GON4lL and optionally NEUROD1 and OTX2, selected from the group comprising:
a) one or more nucleic acid molecules comprising a nucleotide sequence which encodes human GON4L, preferably according to SEQ ID No. 8, and optionally nucleotide sequences encoding NEUROD1, preferably according to SEQ ID No. 10, and OTX2, preferably according to SEQ ID No. 12;
b) one or more nucleic acid molecules which are complementary to the nucleotide sequences in accordance with a);
c) one or more nucleic acid molecules which undergo hybridization with the nucleotide sequences according to a) or b) under stringent conditions;
d) one or more nucleic acid molecules comprising a nucleotide sequence having sufficient sequence identity to be functionally analogous the nucleotide sequences according to a), b) or c);
e) one or more nucleic acid molecules which, as a consequence of the genetic code, are degenerated into nucleotide sequences according to a) through d); and
f) one or more nucleic acid molecules according the nucleotide sequences of a) through e) which are modified by deletions, additions, substitutions, translocations, inversions and/or insertions and functionally analogous to a nucleotide sequence according to a) through e)

Accordingly, the invention encompasses nucleic acid molecules with at least 60%, preferably 70%, more preferably 80%, especially preferably 90% sequence identity to the nucleic acid molecule encoding GON4L, and preferably NEUROD1 and OTX2.

Sequence variants of the claimed nucleic acids and/or proteins, for example defined by the provided % sequence identity, that maintain the said properties of the invention are also included in the scope of the invention. Such variants, which show alternative sequences, but maintain essentially the same properties, such as GON4L function and optionally NEUROD1 and OTX2 function, as the specific sequences provided are known as functional analogues, or as functionally analogous. Sequence identity relates to the percentage of identical nucleotides or amino acids when carrying out a sequence alignment, for example using software such as BLAST.

It will be appreciated by those of ordinary skill in the art that, as a result of the degeneracy of the genetic code, there are many nucleotide sequences that encode a polypeptide as described herein. Some of these polynucleotides bear minimal homology or sequence identity to the nucleotide sequence of any native gene. Nonetheless, polynucleotides that vary due to differences in codon usage are specifically contemplated by the present invention. Deletions, substitutions and other changes in sequence that fall under the described sequence identity are also encompassed in the invention.

In the context of the invention the term "micro-RNA" or microRNA/miRNA refers to a small non-coding RNA molecule found in plants, animals and some viruses, that functions in RNA silencing and post-transcriptional regulation of gene expression. miRNAs function via base-pairing with complementary sequences within mRNA molecules. As a result, these mRNA molecules are silenced, by one or more of the following processes: (1) Cleavage of the mRNA strand into two pieces, (2) Destabilization of the mRNA through shortening of its poly(A) tail, and (3) Less efficient translation of the mRNA into proteins by ribosomes. miRNAs are abundant in many mammalian cell types and appear to target about 60% of the genes of humans and other mammals. In the context of the present invention, the provision of human miR-182 (Gene ID: 406958) and miR-183 (Gene ID: 406959) may be particularly advantageous.

The term cell cycle inhibitor relates to molecules of any kind, such as a small chemical molecule, but also proteins, nucleic acids or other molecules, which slow or stop cell cycle progression through various mechanisms. Cell cycle arrest can be induced at different stages, decreasing the rate of cell division and the number of actively cycling cells.

In the context of the present invention, the use of the cell cycle inhibitor AraC is particularly preferred. AraC is also termed cytarabine or cytosine arabinoside and is used as a chemotherapy medication to treat acute myeloid leukemia (AML), acute lymphocytic leukemia (ALL), chronic myelogenous leukemia (CML), and non-Hodgkin's lymphoma. Many cell cycle inhibitors are known in the art and can be identified by a person skilled in the art, including without limitation Pladienolide B, Methotrexate, Roscovitine, Daidzein, Baicalein, Indirubin-3'-oxime, Epothilone B, Narciclasine, AZD 5438, ABT 751, YC 1, 10058-F4, 8-Chloroadenosine, DIM, Plumbagin, Pyridostatin pentahydrochloride, SKPin C1, CPI 203, CGP 60474, XL 413 hydrochloride, CHMFL-FLT3-122, Potent and selective FLT3 inhibitor, WYE 687 dihydrochloride, NSC 23005 sodium.

Administration of a cell cycle inhibitor relates to addition of the molecule to the cell culture medium, in cases where the molecule becomes available to the cells in this way. The term administration also comprises all kinds of provision of a factor, as described herein in the sense of making the factor available inside the cell to be treated, such as the initial cell of the invention. A provided factor may therefore also be a cell cycle inhibitor.

In embodiments of the method of the invention, the initial cells are cultivated on a basement membrane-like matrix, such as for example Matrigel or another gelatinous protein mixture, such as specific collagen or laminin molecules that support development or maintenance of photoreceptor cells.

Matrigel a gelatinous protein mixture secreted by Engelbreth-Holm-Swarm (EHS) mouse sarcoma cells. Matrigel resembles the complex extracellular environment found in many tissues and is used by cell biologists as a substrate (basement membrane matrix) for culturing cells. Similarly, it is possible to provide different gelatinous protein mixtures for specific cell culture systems that provide a favorable microenvironment for the cultured cells, in the case of the present invention an environment that promotes differentiation of the initial cells towards a photoreceptor-like phenotype. This may be achieved by providing a matrix comprising specific laminins or other extracellular matrix proteins that are abundant in the retina extracellular matrix. In particular, the matrix for culturing the cells of the invention and performing the method of the invention may comprise poly-L-Ornithine, poly-L-Lysine, poly-D-Lysine and/or laminins (ln), preferably laminins with a ß-2 chain like ln323, ln423, ln523 and/or ln521.

In the context of the invention, the term "photoreceptor reporter system" relates to any kind of system that can be used to determine development of a photoreceptor-like phenotype indicating differentiation of the initial cell to a photoreceptor cell or progenitor thereof. Such systems usually employ exogenous nucleic acid sequences encoding for a report gene or a marker gene. Such reporter genes can preferably code fluorescent proteins, which can be easily detected upon expression by standard techniques such as microscopy, cytometry or others. The expression of such reporter or marker genes may be under the control of a genetic element, such as a promoter sequence of a gene that is typically expressed in a photoreceptor cell or a progenitor thereof, or parts of such a sequence. Examples such photoreceptor specific genes, whose genetic control elements may be used in the context of a photoreceptor reporter system, comprise the genes coding for cone-arrestin, rhodopsin, recoverin, NCAM, OTX, CRX, RCVRN, RHO, OPN1SW, OPN1 MW and/or OPN1 LW. The skilled person can identify further suitable promoter sequences by identifying photoreceptor-specific genes or combination of such genes by looking at typical gene expression profiles of photoreceptor cells that are available in the art. Design of cell type specific reporter system is a well-defined technology known to the skilled person. Marker genes can also encode for proteins that provide resistance to a chemical compound, such as an antibiotic, making it possible to select cells from a mixed culture system that express such a marker under the control of a photoreceptor-specific promoter sequence in the presence of the chemical compound, while the other cells cannot survive in the presence of the respective chemical compound.

Further ways of identifying induced photoreceptor cells in a mixed culture comprising the initial cells may be detection of loss of markers of the initial cell, for example loss of Tra1-60 expression in case of iPSC as initial cells. Cells may be characterized and induced photoreceptor cells may be identified and isolated by means of flow cytometry using expression of fluorescence marker proteins and/or typical surface protein expression patterns of photoreceptor cells and their progenitors in comparison to surface marker patterns of the initial cells.

In the context of the present invention, the term retinopathy relates to any damage to the retina of the eyes, which may cause vision impairment. Retinopathy often refers to retinal vascular disease, or damage to the retina caused by abnormal blood flow. Age-related macular degeneration is included under the umbrella term retinopathy. Retinopathy includes retinal vascular disease and can be broadly categorized into proliferative and non-proliferative types. Frequently, retinopathy is an ocular manifestation of systemic disease as seen in diabetes or hypertension.

Retinopathy further relates to macular degeneration, also known as age-related macular degeneration (AMD or ARMD), which is a medical condition that may result in blurred or no vision in the center of the visual field. Over time, patients may experience a gradual worsening of vision that may affect one or both eyes. While it does not result in complete blindness, loss of central vision can make it hard to recognize faces, drive, read, or perform other activities of daily life. Visual hallucinations may also occur but these do not represent a mental illness. Macular degeneration typically occurs in older people, while genetic factors and smoking also play a role. It appears to be due to damage to the macula of the retina. The severity is divided into early, intermediate, and late types, which may all be treated by use of the cells of the invention. The late type is additionally divided into "dry" and "wet" forms with the dry form making up 90% of cases, wherein all types may be treated by transplantation of cells of the invention.

Retinal degeneration is a retinopathy which consists in the deterioration of the retina caused by the progressive death of its cells. There are several reasons for retinal degeneration, including artery or vein occlusion, diabetic retinopathy, R.L.F./R.O.P. (retrolental fibroplasial retinopathy of prematurity), or disease (usually hereditary), which may present in many different ways such as impaired vision, night blindness, retinal detachment, light sensitivity, tunnel vision, and loss of peripheral vision to total loss of vision. Of the retinal degenerative diseases retinitis pigmentosa (RP) is a very important example. Inherited retinal degenerative disorders in humans exhibit genetic and phenotypic heterogeneity in their underlying causes and clinical outcomes. A wide variety of causes have been attributed to retinal degeneration, such as disruption of genes that are involved in phototransduction, biosynthesis and folding of the rhodopsin molecule, and the structural support of the retina. Mutations in the rhodopsin gene account for about 25% to 30% of all cases of autosomal dominant retinitis pigmentosa (adRP) in North America. There are many mechanisms of retinal degeneration attributed to rhodopsin mutations or mutations that involve or affect the function of rhodopsin. One mechanism of retinal degeneration is rhodopsin overexpression. Another mechanism, whereby a mutation caused a truncated rhodopsin, was found to affect rod function and increased the rate of photoreceptor degeneration.

Cell transplantation is a novel therapeutic strategy to restore visual responses to the degenerate adult neural retina and it has been shown that transplanted postmitotic photoreceptor precursors are able to functionally integrate into the adult mouse neural retina.

FIGURES

The invention is further described by the following figures. These are not intended to limit the scope of the invention but represent preferred embodiments or aspects of the invention provided for greater illustration.

BRIEF DESCRIPTION OF THE FIGURES

FIG. 6: Photoreceptor-specific gene profile of fluorescent cells expressing GON4L.

DETAILED DESCRIPTION OF THE FIGURES

Figure 1:
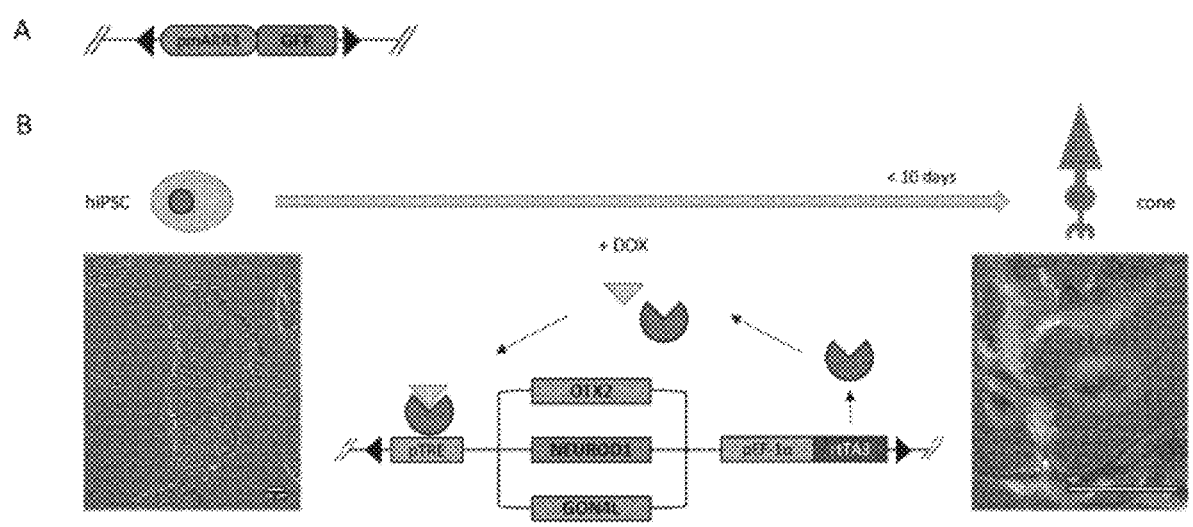
FIG. 1: In vitro photoreceptor differentiation from hiPSCs by over-expressing transcription factors.

FIG. 1: (A) Scheme of the cone reporter cassette introduced into human iPSCs. GFP is under the cone-arrestin promoter, active only in cone photoreceptors. (B) Scheme of the cone differentiation protocol. TFs are under the doxycycline (DOX)-inducible promotor pTRE. When DOX is present, it binds to the transactivator rtTA3 and initiates TFs expression. Less than 10 days of DOX treatment is enough to obtain cone photoreceptors in our 2D cultures. Scale bars, 50 µm.

Figure 2:
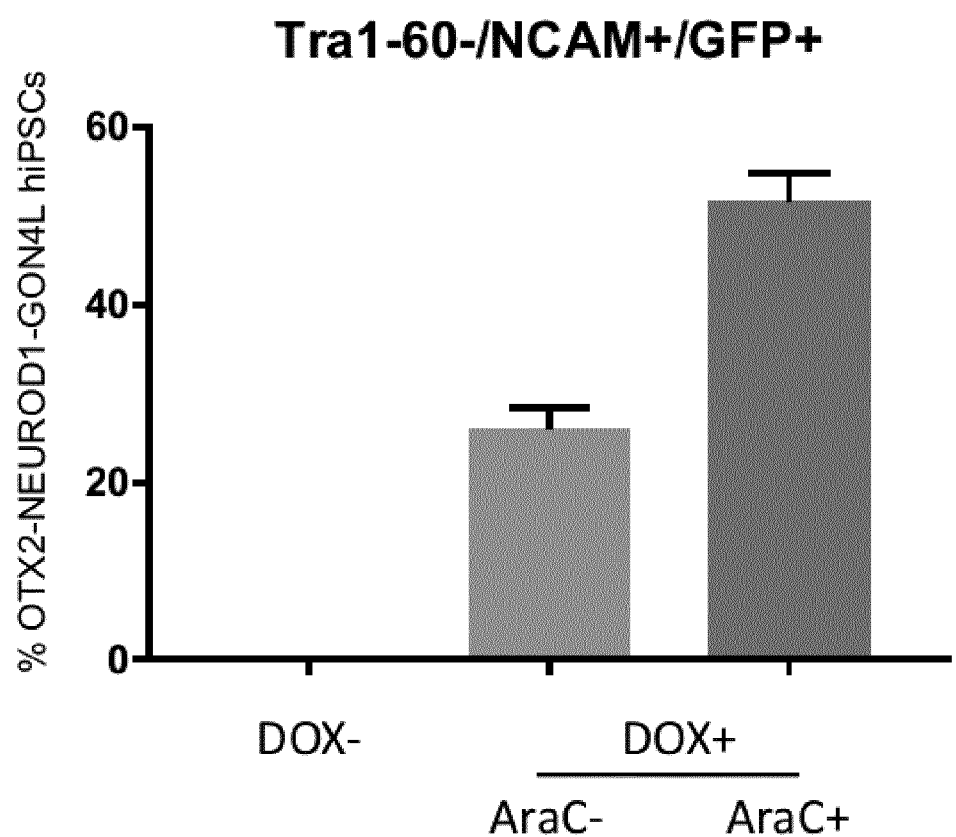
FIG. 2: Flow cytometry analysis of overexpression of a transcription factor combination OTX2, NEUROD1 and GON4L in human iPSC.

FIG. 2: Overexpression of a transcription factor combination OTX2, NEUROD1 and GON4L for 10 days leads to a differentiation of human induced pluripotent stem cells into 26.1% cone photoreceptor-like cells. By treating them with a cell cycle inhibitor AraC at day 5, we are able to remove a pool of proliferating progenitors and increase the differentiation efficiency to 51.6% (mean, n=3).

Figure 3:
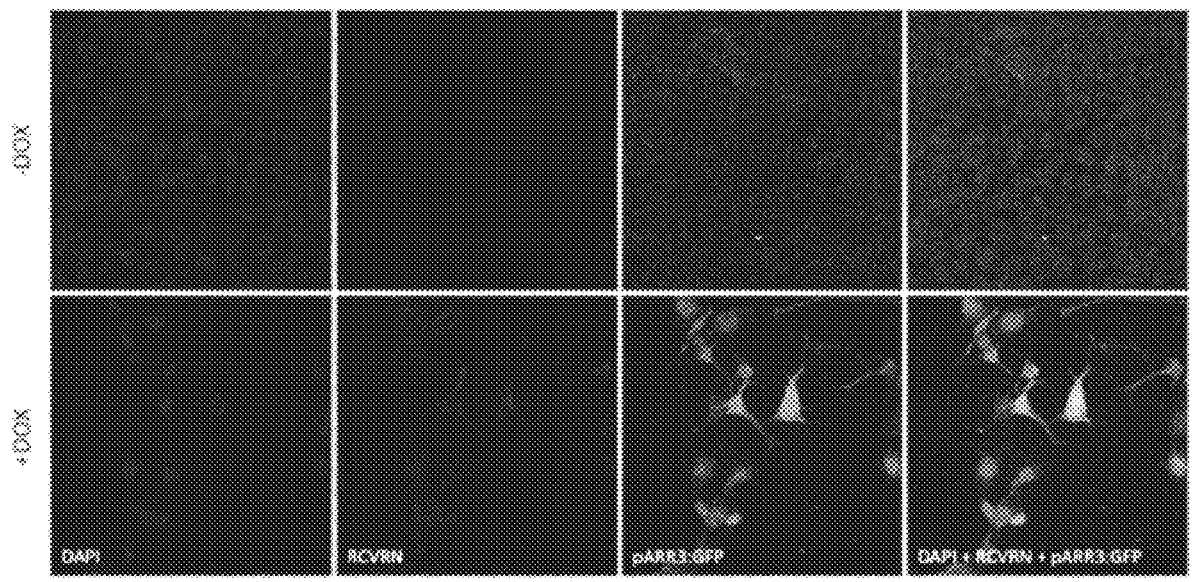
FIG. 3: Microscopy analysis of overexpression of a transcription factor combination OTX2, NEUROD1 and GON4L in human iPSC. S37 and S36.

FIG. 3: Overexpression of the transcription factor combination OTX2, NEUROD1 and GON4L (ONG) for 7 days in the presence of doxycycline (+DOX) in human induced pluripotent stem cells leads to the upregulation of photoreceptor specific markers. Cells positive for GFP (driven by the cone-arrestin promoter) co-express the photoreceptor precursor marker recoverin (RCVRN, red), indicating their differentiation towards cone photoreceptor-like cells. In our protocol, cells are cultured on Matrigel (protein mixture secreted by mouse sarcoma cells), although photoreceptor-specific laminins might be required to obtain an improved photoreceptor-specific cell morphology.

Nonetheless, using the present culture conditions neurite outgrowth, which is a core feature of developing neurons, was observed.

Figure 4:
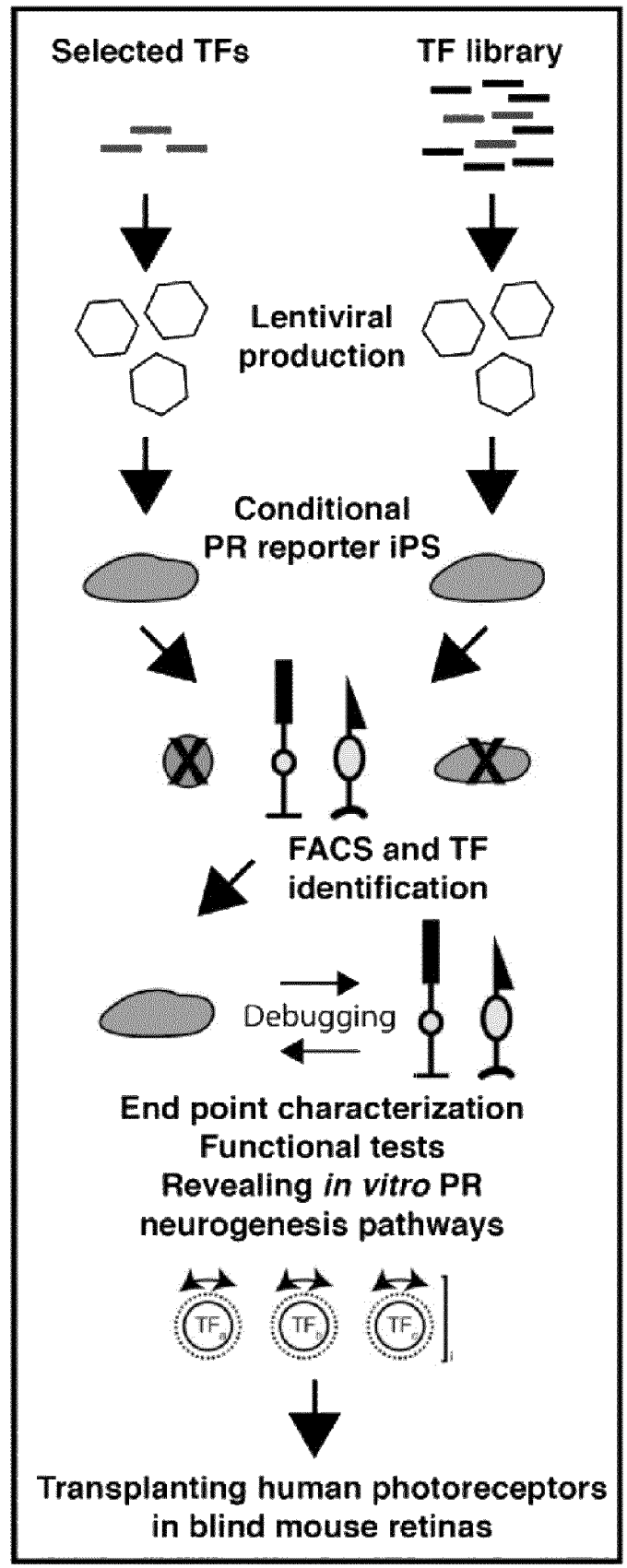
FIG. 4: Scheme of generating induced photoreceptors through TF induction.

FIG. 4: Selected sets (left) or a library of TFs (right) were induced in human iPS cell lines bearing photoreceptor (PR)-specific fluorescent reporters. In-depth analysis and comparison with in vivo PRs allows a sophisticated assessment of the generated induced PR.

Figure 5:
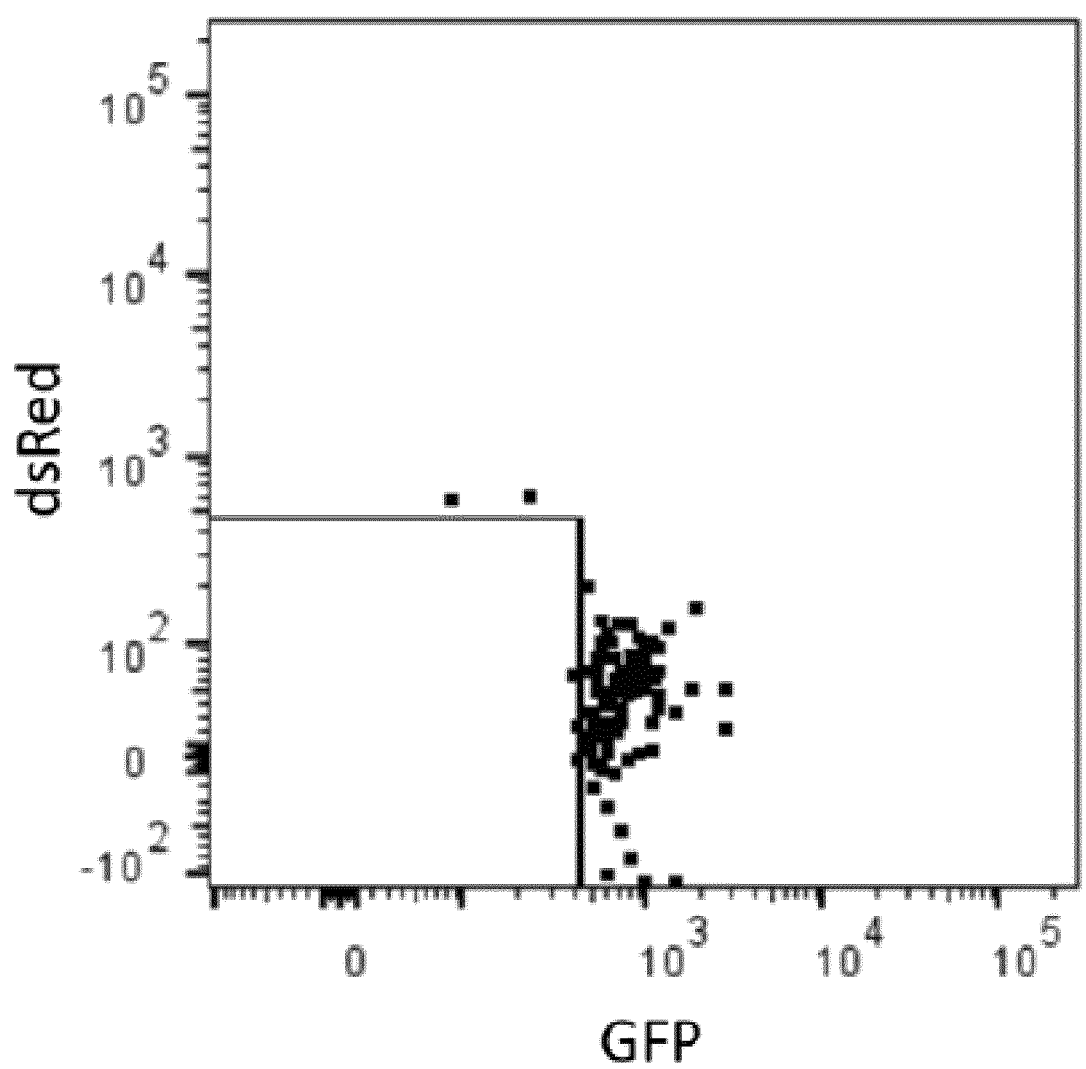
FIG. 5: Fluorescence-activated cell sorting plot of induced photoreceptor cells.

FIG. 5: Fluorescence-activated cell sorting plot of induced photoreceptor cells. Out of 87 fluorescent cells, 85 showed green and 2 cells red fluorescence.

FIG. 6: All cells expressing GON4L were positive for photoreceptor progenitor and precursor markers CRX and OTX2, 8 cells were positive for pan-photoreceptor marker RCVRN, and one FACS sorted cell was positive for late cone marker OPN1 SW. Cells were co-expressing different transcription factors from the biased group, among which 6 were co-expressing OTX2 and 3 were found to co-express NEUROD1.

Figure 7:
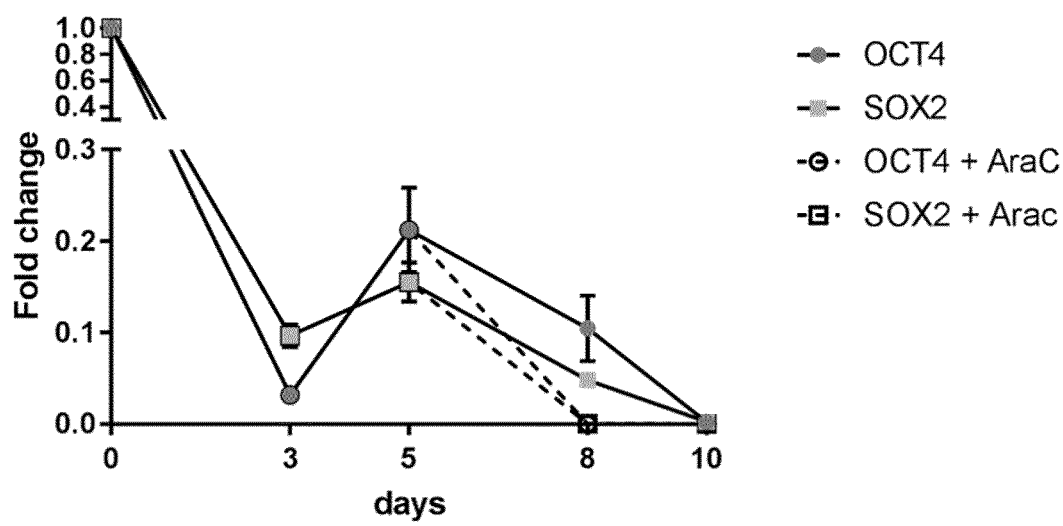
FIG. 7: PGP1cR-ONG cells downregulate stem cell markers (A) and upregulate photoreceptor-specific markers (B) as analyzed by qPCR.
Figure 7:
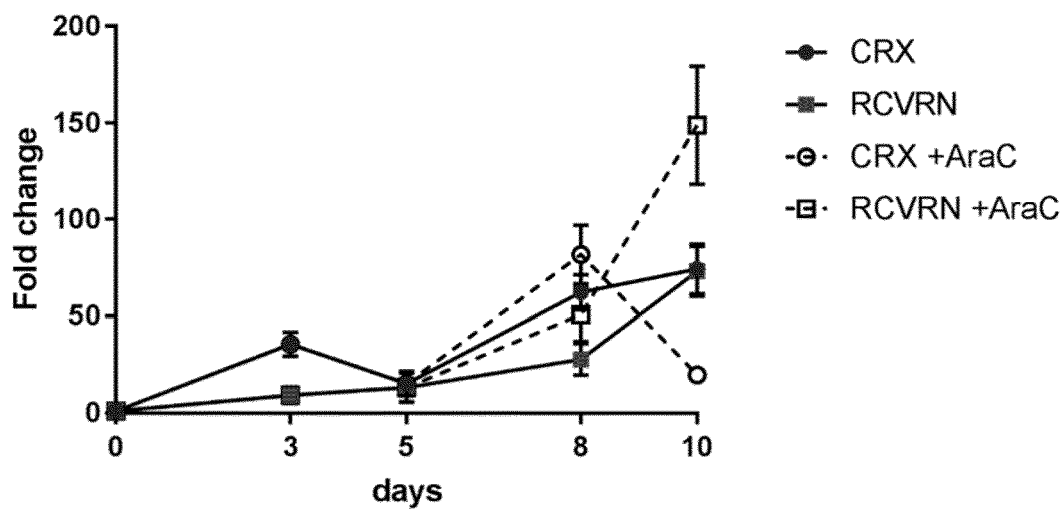

FIG. 7: PGP1cR-ONG cells downregulate stem cell markers (A) and upregulate photoreceptor-specific markers (B) during the 10-day differentiation protocol. (A) Stem cell markers OCT4 and SOX2 are heavily downregulated already after 3 days of OTX2, NEUROD1 and GON4L overexpression indicating that most of the cells are leaving the cell cycle. After 10 days of DOX treatment, or after 8 days if treated with the cell cycle inhibitor AraC, stem cell markers expression levels are mostly undetectable and cells are fully differentiated. (B) Photoreceptor markers CRX and RCVRN are getting upregulated during the course of differentiation and are reaching the expression peak at the day 10. If AraC is added, the remaining cells are upregulating the late photoreceptor marker RCVRN at the expense of the early photoreceptor marker CRX.

Figure 8:
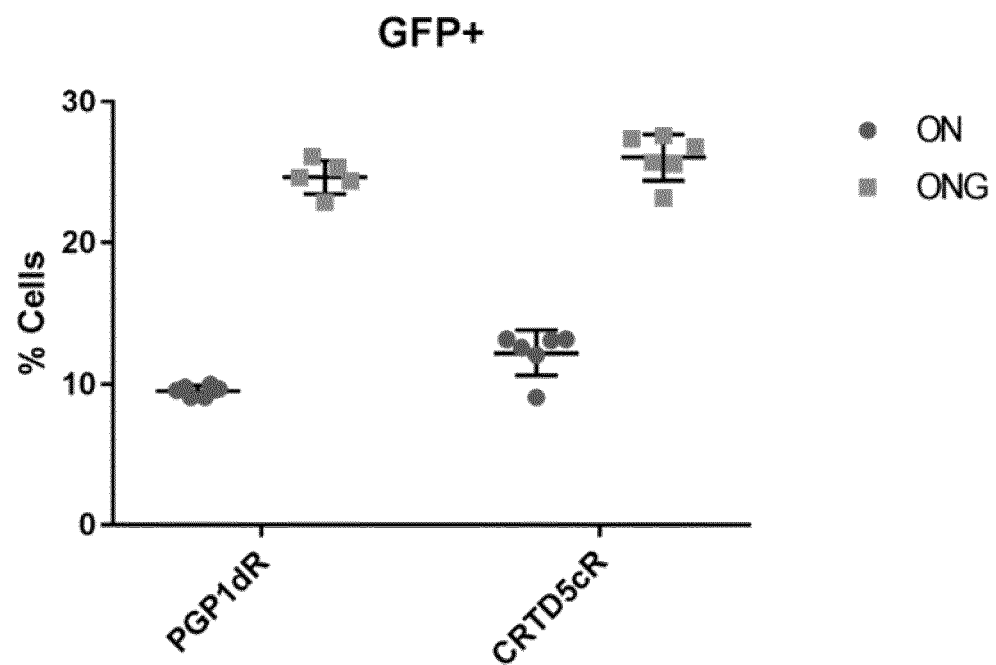
FIG. 8: Flow cytometry analysis of Tra1-60-/NCAM+/GFP+ cells after 5 days of OTX2-NEUROD1 or OTX2-NEUROD1-GON4L overexpression in PGP1 and CRTD5 cone reporter hiPSC lines.

FIG. 8: Flow cytometry analysis of Tra1-60-/NCAM+/GFP+ cells after 5 days of OTX2-NEUROD1 (ON) or OTX2-NEUROD1-GON4L (ONG) overexpression in PGP1 and CRTD5 cone reporter hiPSC lines. The TF combination OTX2-NEUROD1 leads to GFP expression from the cone arrestin promoter in ~10% of the differentiated cells. The photoreceptor differentiation efficiency rises to ~25% if GON4L is present. The same differentiation efficiencies can be reproduced in CRTD5cR cells, another cone reporter hiPSC line.

Figure 9:
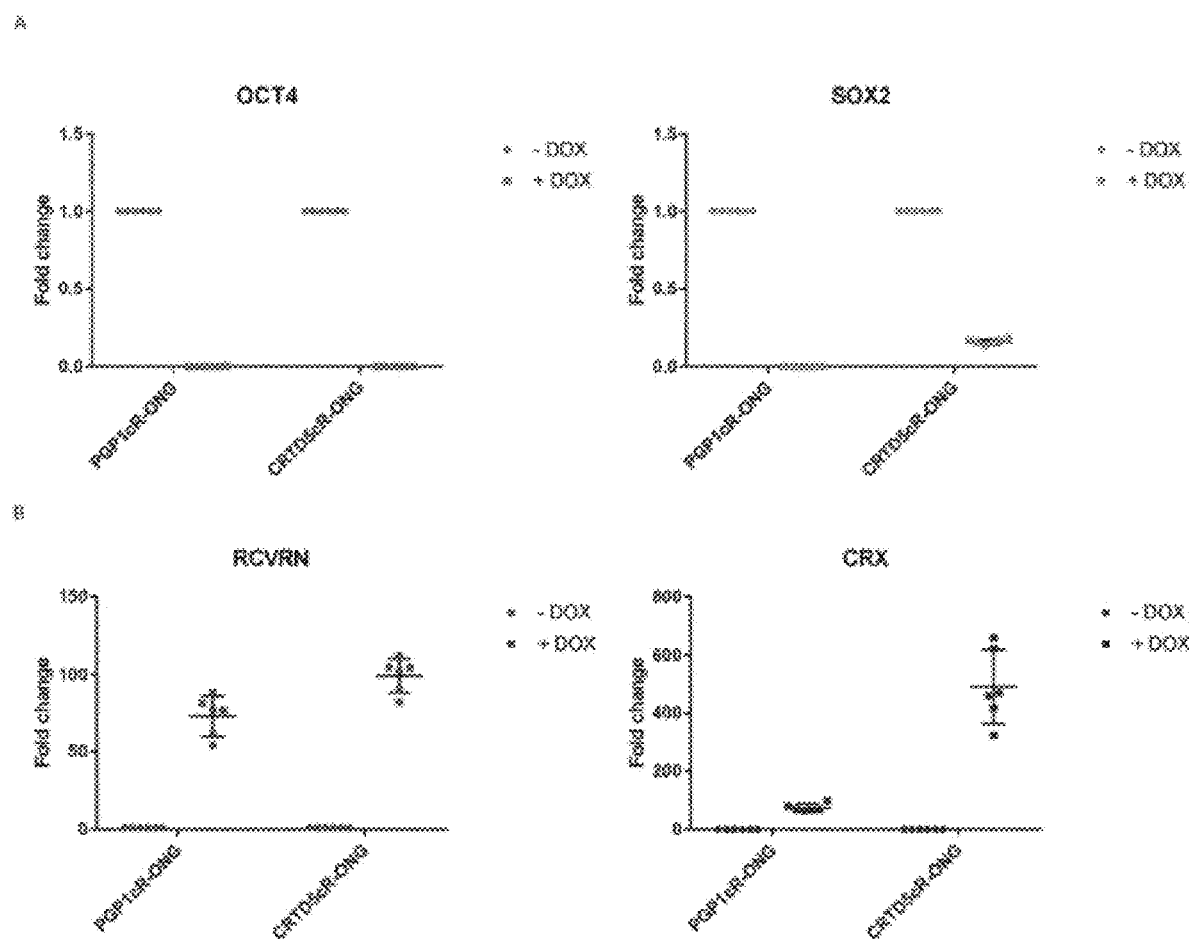
FIG. 9: Overexpression of the TF combination OTX2-NEUROD1-GON4L in hiPSC lines leads to downregulation of pluripotency markers and upregulation of photoreceptor-specific markers as analyzed by qPCR.

FIG. 9: Overexpression of the TF combination OTX2-NEUROD1-GON4L for 10 days leads to downregulation of pluripotency markers OCT4 and SOX2 (A) and upregulation of photoreceptor-specific markers RCVRN and CRX (B) both in PGP1 and CRTD5 cone reporter hiPSC line. Expression levels of pluripotency markers and the late photoreceptor marker RCVRN are comparable between the two hiPSC lines.

Figure 10:
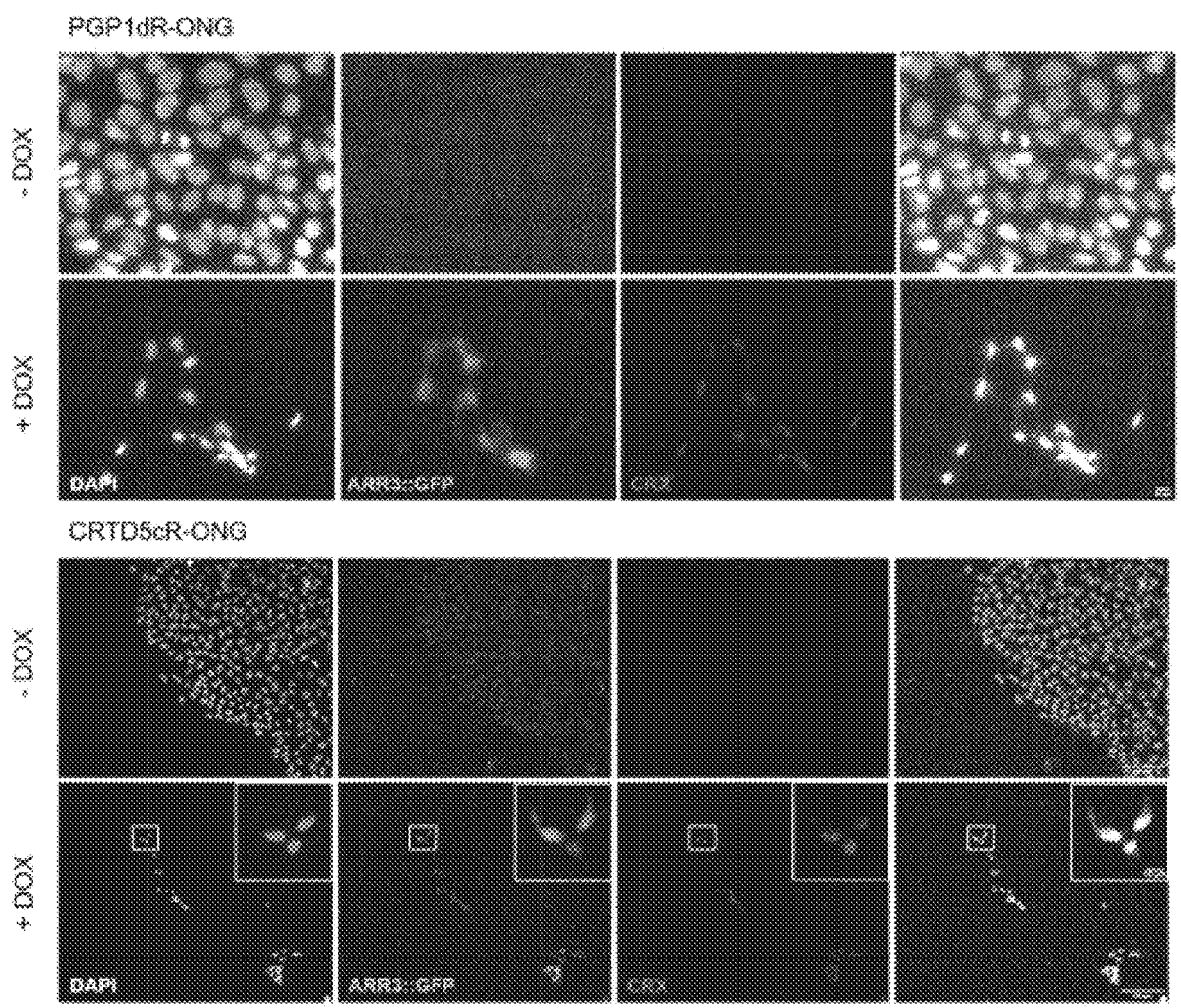
FIG. 10: Overexpression of the TF combination OTX2-NEUROD1-GON4L leads to the upregulation of photoreceptor specific markers as analyzed by immuno-fluorescence.

FIG. 10: Overexpression of the TF combination OTX2-NEUROD1-GON4L for 10 days in PGP1 and CRTD5 cone reporter hiPSCs leads to the upregulation of photoreceptor specific markers. Cells positive for GFP (driven by the cone arrestin promoter) co-express the photoreceptor precursor marker CRX (magenta), indicating their differentiation towards cone photoreceptor-like cells. Neurite outgrowth, which is a core feature of developing neurons, was observed.

Figure 11:
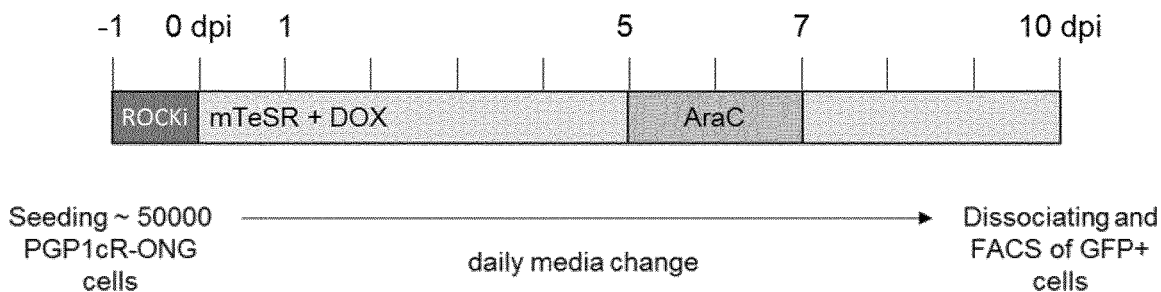
FIG. 11: 10-day differentiation protocol for obtaining cells for transplantation experiments.
Figure 11:
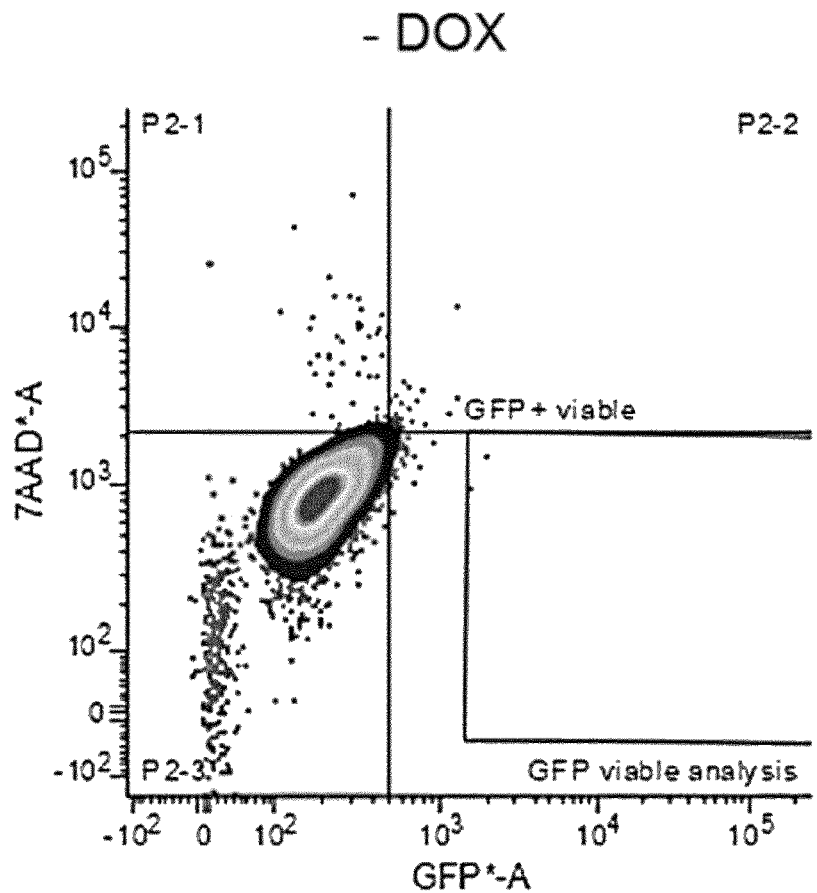
Figure 11:
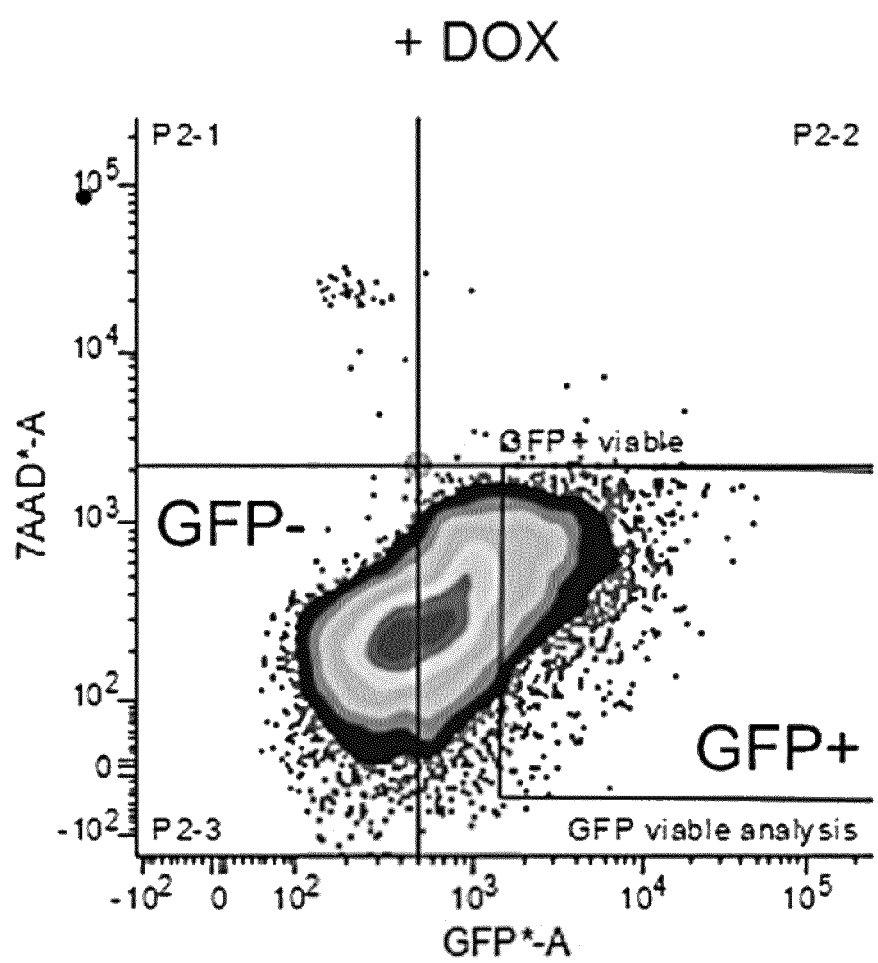

FIG. 11: 10-day differentiation protocol for obtaining cells for transplantation experiments. (A) Cells are seeded in mTeSR with ROCKi. DOX is added the following day to start the OTX2-NEUROD1-GON4L overexpression and photoreceptor differentiation. The cell cycle inhibitor AraC is added from 5 dpi to 7 dpi to remove any potentially proliferating cells. At 10 dpi, cells are collected using the papain dissociation kit (Worthington Biochemical Corporation) and (B) FACS sorted for live (7-AAD-) GFP+ cells. 150000 cells are then transplanted subretinally following the published protocol (Santos-Ferreira et al. *Daylight vision repair by cell transplantation*. Stem Cells. 2015 January; 33(1):79-90. doi: 10.1002/stem.1824).

EXAMPLES

The invention is further described by the following examples. These are not intended to limit the scope of the invention but represent preferred embodiments or aspects of the invention provided for greater illustration.

While it is possible to obtain photoreceptors by direct reprogramming from fibroblasts in low quantities, efficient 2D protocols to generate photoreceptors in vitro from human induced pluripotent stem cells (hiPSCs) needs to be established. Forward programming relies on a transcription factors' (TF) abilities to activate distinct differentiation pathways in stem cells. Aiming at finding a TF combination that drives efficient differentiation of stem cells into photoreceptors, we performed a TF-library on library screen.

Methods

General Procedure

A TF library consisting of 1748 human TFs was used to generate specific retinal cell types: rod and cone photoreceptors. Photoreceptor-specific reporter constructs were used that become activated at specific states of photoreceptor development (examples: retina and anterior neural fold homeobox (RX), cone-rod homeobox (CRX), cone arrestin-3 (CAR), rhodopsin (RHO)) and induce the expression of fluorescent proteins and a selection marker from a different ubiquitous promoter. In some cases, multiple reporter cassettes were integrated into one iPS cell line via lentiviral gene transfer. Further reporter cell lines were generated by introduction of reporter cassettes using the PiggyBac system. Also, corresponding knock-in cell lines were generated. These reporter human iPS cell lines were tested in retinal organoids for expression, and the best-performing cell line was selected to apply the TF library. Upon TF induction, we screened for fluorescently labeled photoreceptors (CAR and RHO) and/or their precursor cells (RX and CRX) (FIG. 4, right). In parallel, we use the existing knowledge of TFs acting during photoreceptor development, and specifically applied these selected TFs in a biased approach (FIG. 4, left). For the latter experiment, we induced RX, SIX3, SIX6, LHX2, TLL, OTX2, PAX6, SOX1, SOX2, CRX, ONECUT1, VSX2, NRL, TRB2, NEUROD1, NR2E3, RXRG, and RORB (8): these were PCR-amplified from the library pool and were applied individually and also in combinations. We also combined the two library approaches. We generated transcriptomic data from both approaches to minimize the risks of failure and to identify limiting developmental steps. We compare the transcriptomic profiles and genetic programs which result in photoreceptors. Profiles from intermediate but stalled photoreceptor precursor cells are particularly interesting for identifying and debugging critical developmental steps and the pitfalls of stem cell-derived photoreceptor generation.

Rod and cone photoreceptors can be easily distinguished by their specific gene expression profiles. In general, these cell types are well characterized in vivo and, therefore, we can perform comparative troubleshooting. For cellular characterization, we apply specific antibodies against phototransduction cascade members, as well as functional patch-clamp recordings, to characterize the induced photoreceptors. We have previously shown that the upregulation of two microRNAs (miR-182 and miR-183) in photoreceptors of stem cell-derived retinas is sufficient to promote the formation of light-sensitive compartments (outer segments) (11). Hence, the overexpression of these non-coding RNAs is beneficial for functional maturation of photoreceptors.

Specific Experiment

A reporter hiPSC line was transduced with the lentiviral library of 16 known TFs and subsequently with a comprehensive library consisting of 1748 human TFs. hiPSCs with no TFs were killed by selection using a marker that was included in the lentiviral cassettes. A fraction of the cells was used for TF induction through treatment with doxycycline (dox) for 10 days. Of the transduced and induced cells, 87 were fluorescently labelled and sorted into individual wells (FIG. 5). The RNA of the single cells was extracted, split for single cell qPCR analysis and for the detection of the overexpressed TFs. In particular OTX, CRX, RCVRN, RHO, OPN1SW and OPN1 LW, were identified by using specific RT primer for the overexpressed TFs. TF detection was performed by amplifying the TF from cDNA by PCR, loading a gel and excising and sequencing the amplified DNA-bands. Based on the identification of the overexpressed TFs, the preferred TF of the present invention, in particular GON4L, NEUROD1 and OTX2 were identified as being particularly efficient for inducing a cone-phenotype (FIG. 6). TF combinations were validated in the hiPSC reporter line using flow cytometry detecting the loss of a pluripotency marker (Tra1-60) and upregulation of neuronal markers (NCAM) and fluorescence from the reporter cassette.

Nucleic Acid Sequences Encoding the TFs Used

Nucleic acid sequences encoding the TF GON4L, NEUROD1 and OTX2 as used in the presented experiments are the sequences according to SEQ ID No. 9, SEQ ID No. 11 and SEQ ID No.13, as listed in Table 2. Please note that all three TFs have a V5 tag at their 3' end.

Cell Culture

PGP1 (GM23338, Coriell), ATCC DYS0100 (ATCC® ACS-1019™, ATCC) and CRTD5 (reprogrammed at CRTD iPSC facility, Kutsche et al. Cell Systems 2018, Oct. 24; 7(4):438-452) human induced pluripotent stem cells (hiPSCs) were cultured in mTeSR1 media (05850, StemCell Technologies). Before adding hiPSCs, regular tissue culture well plates were coated with hESC-qualified Matrigel matrix (354277, Corning) and incubated for 60 min at room temperature. The hiPSCs were cultured under standard conditions (5% CO2, 37° C.) and mTeSR1 media was exchanged daily. For passaging, hiPSCs were dissociated from the wells by adding TrypLE Express (12604013, Thermo Fisher Scientific), washed with phosphate-buffered saline (PBS, pH 7.2; 14190169, Thermo Fisher Scientific), spun down at 400× g and added to fresh Matrigel-coated tissue culture wells in mTeSR1 media with 3 µg/ml InSolution Y-27632 rho kinase inhibitor (688001, Merck Millipore). Alternatively, cells were frozen in mFreSR media (05854, StemCell Technologies).

Stable integration of an inducible TF or photoreceptor reporter cassette was done by using the PiggyBac transposon system. All vector elements between the 5' core insulator and the SV40 polyA site of the PiggyBac vector backbone PB-TRE-dCas9-VPR13 (Addgene plasmid #63800; Chavez et al., 2015, Nat Methods. 2015 Mar. 2. doi: 10.1038/nmeth.3312) were replaced with corresponding DNA fragments. 10 µg of the plasmid were mixed with 2 µg of Super PiggyBac Transposase Expression Vector (PB210PA-1-S, Biocat) and electroporated to hiPSCs with the Lonza 4D X-unit, pulse CB-156 and the P3 Primary Cell 4D-Nucleofector Kit L (V4XP-3024, Lonza). According to the chosen selection cassette, Blasticidin (25 µg/ml), Puromycin (0.5-1 µg/ml) or Hygromycin B (250 µl/ml) were applied.

Standard lentiviral transduction was performed for the TF screen. Cell numbers and viral particles were adjusted to obtain a multiplicity of infection of 1. PGP1 iPSCs containing the photoreceptor reporter cassette were serially transduced with either the unbiased TF library (1748 TFs each included in the lentiviral pLIX_403 backbone (Addgene plasmid 41395)) or the library of selected TFs (backbone from Addgene plasmid 61473) and subsequently selected by corresponding selection markers.

TF Induction to Differentiate hiPSC:

Transcription from the TeTOn promoter was induced by the application of 0.5 µg/ml doxycycline (D9891, Sigma-Aldrich) into mTeSR1 media.

Details of the Photoreceptor Reporter System

The photoreceptor reporter system is based on the PiggyBac vector PB-TRE-dCas9-VPR13 (Addgene plasmid #63800; Chavez et al., 2015, Nat Methods. 2015 Mar. 2. doi: 10.1038/nmeth.3312). All vector elements between the 5' core insulator and the SV40 polyA site were replaced by an eGFP cassette driven from the mouse cone arrestin promoter (mCAR, Busskamp et al. Science 2010, Jul. 23; 329(5990): 413-7) or by a human Rhodopsin promoter (RHO, Busskamp et al. Science 2010, Jul. 23; 329(5990):413-7) driving the red-fluorescent protein dsRED. Downstream of the fluorescent proteins, a Woodchuck hepatitis virus post-transcriptional regulatory element (WPRE) and a blasticin selection cassette driven from the ubiquitin C promoter (both taken from Addgene plasmid 61473) were added. The corresponding vectors pb-mCAR-EGFP-UBC-Blasti and pb-Rho-dsRed-UBC-Blasti were co-nucleofected into PGP1 hiPSCs and selected for transgenic clones with both constructs integrated.

Concentrations of the Cell Cycle Inhibitor and Other Reagents Used in the Respective Experiments Cytosine β-D-arabinofuranoside hydrochloride (Ara-C, C6645, Sigma) was used at a final concentration of 5 µM for 24h to deplete dividing cells in neuronal cultures.

Results

87% of the sorted cells were qPCR-positive for at least one of the tested photoreceptor-specific genes indicating the cell-type-precision of our screen. Some of the tested TF combinations comprising GON4L and in some cases also OTX2 and NEUROD1 led to a significant loss of the pluripotency marker Tra1-60 and upregulation of a neuronal marker NCAM (hiPSCs: 0.47±0.07%, hiPSCs-TFs: 75.23±3.7%; mean±SEM, Welch's two-tailed t-test; p=0.002) after 5 days of overexpression, indicating that cells are differentiating towards the neuronal lineage. Furthermore, fluorescence microscopy and flow cytometry detected GFP-positive cells after 10 days suggesting the presence of cone photoreceptors.

CONCLUSION

We systematically screened TFs based from in vivo studies and a human TF library to find the combination that would help us reaching a final goal of engineering human photoreceptors in vitro. Our data suggest that the known factors were insufficient to drive photoreceptor differentiation, indicating that photoreceptor genesis from hiPSCs requires additional TFs, in particular GON4L. The combination of GON4L with OTX2 and NEUROD1 was particularly advantageous for efficient induction of photoreceptor differentiation. In-vitro-engineered photoreceptors might serve as a donor material for cell transplantation to treat blindness as sufficient quantities can be generated within 10 days compared to hundreds of days if dissociated from 3D human retinal organoids.

Transplanting Induced Human Photoreceptors into Blind Mouse Retinas

As previously mentioned, there are many approaches in which photoreceptors are transplanted into mouse models of retinal degeneration. For this purpose, mouse photoreceptor progenitors can be taken and injected into the subretinal space (12-14) of blind retinas. In addition, rod photoreceptor precursor cells derived from 3d organoids can be isolated and successfully transplanted (15). A low fraction of these mouse cells has been shown to functionally integrate into the retina of host mice. Induced human photoreceptors haven't been used before, and we will therefore be the first to use these cells as starting material for transplantation into the retinas of blind mice.

To visualize and functionally test transplanted photoreceptors, we plan to tag these cells prior to injection with fluorescent reporters that are fused to hyperpolarizing optogenetic tools (16, 17). In addition to fluorescent detection, we will trigger light sensitivity by stimulating the optogenetic tool with light, and subsequently record the light responses. Since intrinsic photoreceptors in disease mouse models are insensitive to light, all light responses can be tracked back to transplanted, and therefore functionally integrated, cells. The intrinsic phototransduction cascades of rods and cones are log-units more sensitive than the optogenetic sensors. Hence, by controlling the light levels for stimulation, discrimination between intrinsic and optogenetic photoresponses will be possible.

To measure the success of reactivation, we will perform patch-clamp recordings directly from the transplanted photoreceptors. To test whether the cones integrate into existing retinal circuits, we will record by patch clamp or MEA from retinal ganglion cells. Recovered vision will also be investigated using behavioral tests as shown before (16). In addition to the functional studies, we will perform immunohistochemical analyses followed by confocal and electron microscopy at the CRTD light microscopy facility. We will also study the transcriptomic profiles of successfully integrated human photoreceptors and compare them to the ones that failed, in order to determine the limiting biological parameters to improve cone integration.

REFERENCES

1. Ishii, T., Yin, C., Seko, Y., Umezawa, A. & Kaneda, M. Variation in the Phenotype of Photosensitive Cells Produced from Human Fibroblast Cell Lines. 1 Nippon Med Sch 85, 110-116 (2018).
2. Seko, Y. et al. Derivation of human differential photoreceptor cells from adult human dermal fibroblasts by defined combinations of CRX, RAX, OTX2 and NEUROD. Genes Cells 19, 198-208 (2014).
3. Gonzalez-Cordero, A. et al. Recapitulation of Human Retinal Development from Human Pluripotent Stern Cells Generates Transplantable Populations of Cone Photoreceptors. Stern Cell Reports 9, 820-837 (2017).
4. Slembrouck-Brec, A., Nanteau, C., Sahel, J. A., Goureau, 0. & Reichman, S. Defined Xeno-free and Feeder-free Culture Conditions for the Generation of Human IPSC-derived Retina!Cell Models. 1 Vis Exp (2018).
5. Volkner, M., Kurth, T. & Karl, M. O. The Mouse Retinal Organoid Trisection Recipe: Efficient Generation of 3D Retinal Tissue from Mouse Embryonic Stern Cells. Methods Mol Bio11834, 119-141 (2019).
6. Volkner, M. et al. Retinal Organoids from Pluripotent Stern Cells Efficiently Recapitulate Retinogenesis. Stern Cell Reports 6, 525-538 (2016).
7. Lakowski, 1. et al. Isolation of Human Photoreceptor Precursors via a Cell Surface Marker Panel from Stern Cell-Derived Retina!Organoids and Fetal Retinae. Stern Cells 36, 709-722 (2018).
8. Hennig, A. K., G. H. Peng, and S. Chen, Brain Res, 2008 Feb. 4; 1192:114-33.
9. Zuber, M. E., Curr Top Dev Biol, 2010; 93:29-60.
10. Zuber, M. E., et al., Development, 2003, November; 130(21):5155-67.
11. Busskamp, V., et al., Neuron, 2014, Aug. 6; 83(3):586-600.
12. MacLaren, R. E., et al., Nature, 2006, Nov. 9; 444(7116): 203-7.
13. Pearson, R. A., et al., Nature, 2012, May 3; 485(7396): 99-103.
14. Santos-Ferreira, T., et al., Stem Cells, 2015 January; 33(1):79-90.
15. Gonzalez-Cordero, A., et al., Nat Biotechnol, 2013 August; 31(8):741-7.
16. Busskamp, V., et al., Science, 2010, Jul. 23; 329(5990): 413-7.
17. Chuong, A. S., et al., Nat Neurosci, 2014, August; 17(8):1123-9.

The invention claimed is:

1. A method for producing an induced photoreceptor cell from an initial cell, the method comprising providing transcription factors (TFs) comprising GON4L, OTX2, and NEUROD1 to the initial cell, wherein the initial cell is one of a pluripotent or multipotent mammalian cell, a fibroblast, a retinal progenitor cell (RPC), a retinal pigment epithelium (RPE) cell, a Mueller Gilia cell or other cell found in the eye or retina with the proviso that the initial cell is not a photoreceptor cell; and
   allowing sufficient time to induce a reprogramming of the initial cell to the induced photoreceptor cell.

2. The method according to claim 1, wherein the initial cell is an induced pluripotent stem cell (iPSC).

3. The method according to claim 1, comprising providing one or more additional TFs selected from the group consisting of CRX, NR2E1, NR2E3, NRL1, ONECUT1, PAX6, RAX, RORB, RXRG, SIX3, SIX6, SOX2, THRB, and VSX2 to the initial cell.

4. The method according to claim 1, wherein the TFs are expressed from one or more exogenous nucleic acid molecules within the initial cell.

5. The method according to claim 4, wherein the TFs are expressed to a level greater than in an iPSC.

6. The method according to claim 4, wherein the TFs are expressed from one or more viral vectors.

7. The method according to claim 1, wherein the initial cell is provided with the TFs for at least 4 days.

8. The method according to claim 1, wherein the TFs are expressed transiently and/or expression is induced in the initial cell.

9. The method according to claim 1, comprising administering a cell cycle inhibitor to the initial cell.

10. The method according to claim 9, wherein the cell cycle inhibitor is AraC.

11. The method according to claim 1, wherein an induced photoreceptor cell produced from the initial cell is determined by a photoreceptor reporter system present in the initial cell.

12. The method according to claim 11, wherein the photoreceptor reporter system comprises one or more photoreceptor-specific promoter sequences and one or more reporter genes and/or selection markers.

13. The method according to claim 1, wherein generating an induced photoreceptor cell is determined by expression of endogenous NCAM, OTX, CRX, RCVRN, RHO, OPN1 SW and/or OPN1 LW.

14. The method according to claim 1, wherein the induced photoreceptor cell is a cone.

15. Induced photoreceptor cell obtainable by the method according to claim 1, wherein said cells comprise one or more exogenous nucleic acid molecules encoding the transcription factors (TFs) GON4L, OTX2 and NEUROD1.

16. A kit for producing induced photoreceptor cells from an initial cell according to the method of claim 1, comprising
   a vector system for providing GON4L, OTX2, and NEUROD1 and optionally further TFs to the initial cell,
   reagents for detecting induced photoreceptor cells generated from an initial cell, such as
      a photoreceptor-specific reporter system,
      antibodies for detection of photoreceptor marker proteins, and/or
      primers for detection of OTX, CRX, RCVRN, RHO, OPN1SW, OPN1 MW and/or OPN1LW mRNA by PCR, and
   optionally a cell cycle inhibitor.

17. The method according to claim 1, further comprising transplanting a plurality of the induced photoreceptor cells into the retina of a subject.

18. An expression vector system comprising one or more nucleic acid sequences operably coupled to one or more promoters, wherein said sequences encode one or more transcription factors (TFs) comprising at least GON4L, OTX2, NEUROD1, and optionally miR-182 and/or miR-183.

* * * * *